US012515833B2

(12) United States Patent
Taguchi et al.

(10) Patent No.: US 12,515,833 B2
(45) Date of Patent: Jan. 6, 2026

(54) BINDING MACHINE

(71) Applicant: MAX CO., LTD., Tokyo (JP)

(72) Inventors: Satoshi Taguchi, Tokyo (JP); Kenji Kobayashi, Tokyo (JP); Hajime Takemura, Tokyo (JP)

(73) Assignee: Max Co., Ltd., Tokyo (JP)

(*) Notice: Subject to any disclaimer, the term of this patent is extended or adjusted under 35 U.S.C. 154(b) by 993 days.

(21) Appl. No.: 16/998,623

(22) Filed: Aug. 20, 2020

(65) Prior Publication Data

US 2021/0053705 A1 Feb. 25, 2021

(30) Foreign Application Priority Data

Aug. 23, 2019 (JP) ................................ 2019-153304

(51) Int. Cl.

| | |
|---|---|
| ***B65B 13/02*** | (2006.01) |
| ***A01D 39/00*** | (2006.01) |
| ***B65B 13/16*** | (2006.01) |
| ***B65B 13/18*** | (2006.01) |
| ***B65H 16/00*** | (2006.01) |
| ***B65H 37/04*** | (2006.01) |

(52) U.S. Cl.

CPC ........... *B65B 13/025* (2013.01); *A01D 39/00* (2013.01); *B65B 13/16* (2013.01); *B65B 13/185* (2013.01); *B65H 16/005* (2013.01); *B65H 37/04* (2013.01); *B65H 2701/11332* (2013.01)

(58) Field of Classification Search

CPC ...... A01G 14/08; A01G 14/085; B65B 13/06; B65B 13/285; B65B 13/04; B65B 13/345; B65B 13/025; B65B 13/16; B65B 13/185; B65B 13/20

See application file for complete search history.

(56) References Cited

U.S. PATENT DOCUMENTS 4,849,064 A * 7/1989 Manusch ............ B65H 37/007 156/577
2005/0077413 A1 4/2005 Nakagawa et al.
2009/0283169 A1 11/2009 Itagaki et al.

(Continued)

FOREIGN PATENT DOCUMENTS

CN 201287987 Y 8/2009
CN 101746647 A 6/2010

(Continued)

OTHER PUBLICATIONS

Fukada et al. "JP 2005224197 machine translation" published 2005 (Year: 2005).*

(Continued)

*Primary Examiner* — Alex B Efta
(74) *Attorney, Agent, or Firm* — Banner & Witcoff, Ltd.

(57) ABSTRACT

A binding machine, includes: an accommodating portion configured to accommodate a wound binding tape; a main handle; and a clincher arm. The accommodating portion includes, with the wound binding tape in an accommodated state, a side wall portion that faces a side surface of the binding tape, and a circumferential portion that is continuous with the side wall portion, faces a front surface of the binding tape, and is provided with an opening for accommodating the binding tape in a part of the circumferential portion.

20 Claims, 68 Drawing Sheets

(56) References Cited

U.S. PATENT DOCUMENTS

| | | | | |
|---|---|---|---|---|
| 2015/0307216 | A1* | 10/2015 | Sato | B65B 13/327 53/589 |
| 2017/0335582 | A1* | 11/2017 | Machida | E04G 21/122 |
| 2017/0361957 | A1* | 12/2017 | Takemura | A01G 17/085 |
| 2017/0361959 | A1 | 12/2017 | Ishiguro et al. | |
| 2017/0361960 | A1 | 12/2017 | Taguchi et al. | |
| 2020/0010225 | A1 | 1/2020 | Taguchi et al. | |
| 2020/0156224 | A1* | 5/2020 | Suenaga | B25B 25/00 |

FOREIGN PATENT DOCUMENTS

| | | | | |
|---|---|---|---|---|
| CN | 203435479 | U | * | 2/2014 |
| CN | 106664817 | A | | 5/2017 |
| CN | 207322825 | U | | 5/2018 |
| EP | 3257362 | A1 | | 12/2017 |
| EP | 3292752 | A1 | | 3/2018 |
| JP | H05-006015 | A | | 1/1993 |
| JP | H05-006015 | U | | 1/1993 |
| JP | H06-042606 | U | | 6/1994 |
| JP | 09-240927 | A | | 9/1997 |
| JP | 2000-153809 | A | | 6/2000 |
| JP | 2003-175904 | A | | 6/2003 |
| JP | 2004-175377 | A | | 6/2004 |
| JP | 2004203430 | A | | 7/2004 |
| JP | 2004-224412 | A | | 8/2004 |
| JP | 2005224197 | A | * | 8/2005 |
| JP | 2006-076103 | A | | 3/2006 |
| JP | 2007-117055 | A | | 5/2007 |
| JP | 2008-253194 | A | | 10/2008 |
| JP | 2009-275488 | A | | 11/2009 |
| JP | 2015-042137 | A | | 3/2015 |
| JP | 2017-221149 | A | | 12/2017 |
| JP | 2017-222396 | A | | 12/2017 |
| JP | 2017-222399 | A | | 12/2017 |
| JP | 2017-222403 | A | | 12/2017 |
| JP | 2018-038386 | A | | 3/2018 |
| JP | 2019-007168 | A | | 1/2019 |
| KR | 200197463 | Y1 | | 7/2000 |
| KR | 20070046754 | A | | 5/2007 |
| KR | 20130078292 | A | | 7/2013 |
| KR | 101347857 | B1 | | 1/2014 |
| TW | 201823133 | A | | 7/2018 |
| WO | 2019/075799 | A1 | | 4/2019 |
| WO | 2020017613 | A1 | | 1/2020 |

OTHER PUBLICATIONS

The extended EP Search Report for 20191963.6 filed Feb. 19, 2021, (9 pages).

Oct. 23, 2023—(CN) Office Action—App No. 202010847701.4.

Oct. 9, 2025—(EP) Office Action—App No. 20191963.6.

* cited by examiner

BINDING MACHINE

CROSS REFERENCE TO RELATED APPLICATIONS

This application claims priority to Japanese Patent Application No. 2019-153304 filed on Aug. 23, 2019, the content of which is incorporated herein by reference.

TECHNICAL FIELD

The present invention relates to a binding machine.

BACKGROUND ART

A binding machine for gardening has been used for binding operations during cultivating of agricultural crops. For example, in cultivating of agricultural crops such as cucumbers, grapes, tomatoes, pears, and plums, a binding machine for gardening has been used in order to bind vines and stems of plants to support rods and nets. The binding machine includes a tape magazine portion that accommodates a tape reel around which a binding tape is wound (see, for example, JP2017-221149A, JP2005-224197A, JP2017-222396A, JP2004-175377A, JP2017-222403A, JP2004-224412A, and JP2017-222399A).

JP2017-221149A discloses an example of such a tape magazine portion. A tape magazine portion illustrated in FIG. 8 of JP2005-224197A includes an accommodating portion corresponding to a bobbin case that accommodates a tape reel, and a lid corresponding to a cover that is attached to a binding machine body so as to be openable and closable with an upper end edge of the housing portion as a fulcrum and that is capable of opening and closing an opening formed in the accommodating portion.

The tape magazine disclosed in JP2005-224197A includes an accommodating portion that is a bottomed cylindrical bobbin case conforming to a shape of a tape reel, and an opening and closing type top cover that is attached to the accommodating portion.

However, loading of the tape reel in the binding machines disclosed in these literatures requires complicated operations: opening the cover engaging with the accommodating portion for accommodating the tape reel, after that setting the tape reel in the accommodating portion, then closing the cover. Further, at the time of setting the tape reel in the accommodating portion, the accommodating portion has to be maintained horizontally with changing a manner of holding the binding machine so that the tape reel does not fall accidentally.

SUMMARY OF INVENTION

Illustrative aspects of the present invention provide a binding machine capable of easily setting a tape reel in an accommodating portion.

According to an aspect of the present invention, a binding machine, includes: an accommodating portion configured to accommodate a wound binding tape; a main handle configured to guide the binding tape accommodated in the accommodating portion such that a part of the binding tape is allowed to be pulled out from one end of the main handle; and a clincher arm rotatably provided to the main handle, the clincher arm including a holding portion configured to hold the part of the binding tape pulled out from the one end of the main handle, and a binding portion configured to wrap the part of the binding tape held by the holding portion around objects to be bound and bind the part of the binding tape. The accommodating portion includes, with the wound binding tape in an accommodated state, a side wall portion that faces a side surface of the binding tape, and a circumferential portion that is continuous with the side wall portion, faces a front surface of the binding tape, and is provided with an opening for accommodating the binding tape in a part of the circumferential portion.

According to another aspect of the present invention, a binding machine, includes: an accommodating portion configured to accommodate a wound binding tape; a main handle configured to guide the binding tape accommodated in the accommodating portion such that a part of the binding tape is allowed to be pulled out from one end of the main handle; and a clincher arm rotatably provided to the main handle, the clincher arm including a holding portion configured to hold the part of the binding tape pulled out from the one end of the main handle, and a binding portion configured to wrap the part of the binding tape held by the holding portion around objects to be bound and bind the part of the binding tape. The accommodating portion includes, with the wound binding tape being accommodated therein, a first inner wall surface that faces at least a part of a circular side surface of the binding tape, a second inner wall surface that faces at least a part of another circular side surface of the binding tape, and a third inner wall surface that connects the first inner wall surface and the second inner wall surface and that is provided with an opening for accommodating the binding tape.

According to another aspect of the present invention, a binding machine, includes: an accommodating portion provided, in a side surface thereof, with an opening for accommodating a wound binding tape; and an engaging portion protruding from another side surface of the accommodating portion toward the opening and configured to engage with the binding tape.

DESCRIPTION OF EMBODIMENTS

Hereinafter, embodiments of the present invention will be described with reference to the drawings. The following embodiments are examples for illustrating the present invention and the present invention is not intended to be limited to those embodiments.

Figure 1:
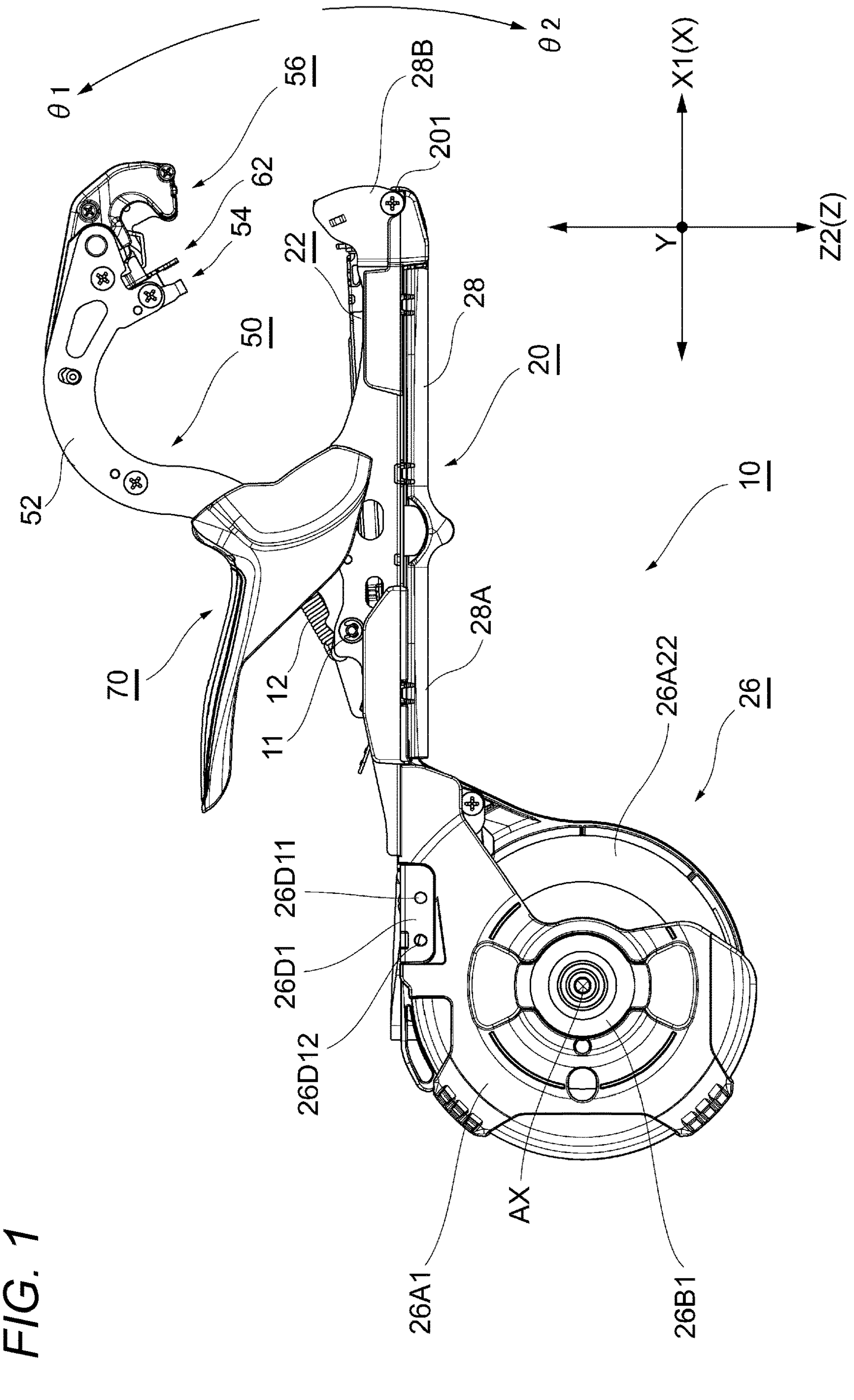
FIG. 1 is a right side view of a binding machine.
Figure 2:
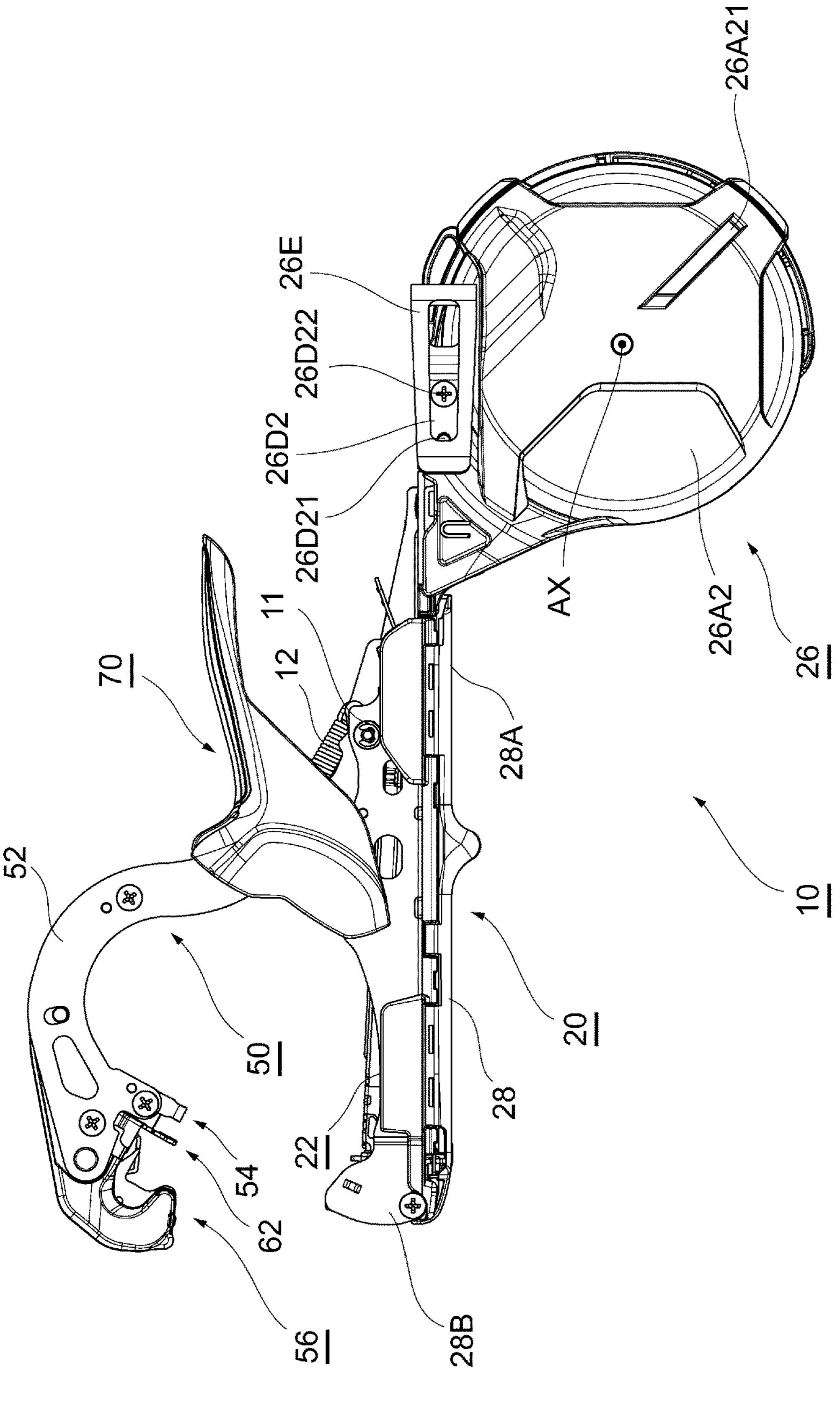
FIG. 2 is a left side view of the binding machine.
Figure 3:
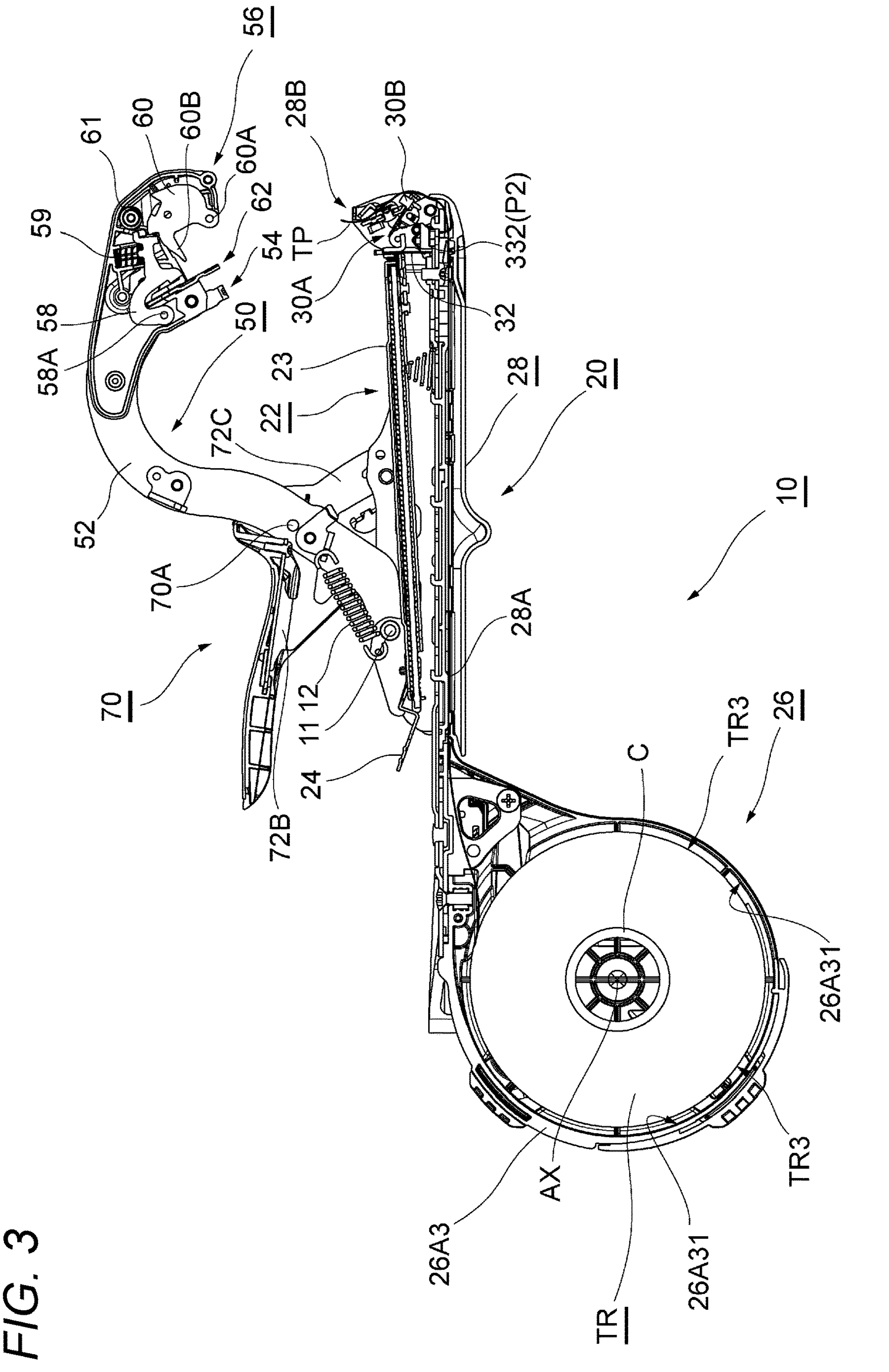
FIG. 3 is a cross-sectional view of the binding machine in a standby state.

FIGS. 1 and 2 are right and left side views of a binding machine 10 for gardening according to the present embodiment. FIG. 3 is a cross-sectional view of the binding machine 10 in FIG. 1.

In the present embodiment, for convenience, a side (a right side in FIG. 1 and a left side in FIG. 2) toward which a tape holder 28A extends from a tape magazine unit 26 in which the tape TP for binding is accommodated, heading for a tape guide 28B provided at a distal end of a binding machine 10 from which the tape TP is pulled out, may be referred to as a "front side", and an opposite side (a left side in FIG. 1 and a right side in FIG. 2) may be referred to as a "rear side". Further, a side (upper side in FIG. 1 and FIG. 2) toward which the tape TP is pulled out from the tape guide 28B, heading for a tape holding unit 56 in a standby state, may be referred to as an "upper side", and an opposite side (lower side in FIG. 1 and FIG. 2) may be referred to as a "lower side".

Hereinafter, a main configuration of the binding machine 10 will be outlined below. Thereafter, a characteristic structure of the binding machine 10 will be described in detail.

The binding machine 10 for gardening according to the present embodiment can be used, for example, in attraction binding operations on an agricultural crop (an example of an "object to be bound"). The binding machine 10 includes a main handle 20, a staple magazine unit 22 rotatably attached to the main handle 20, a clincher arm 50 rotatably attached to the main handle 20, and an operation handle 70 rotatably attached to the clincher arm 50.

The main handle 20 is a member formed in an elongated linear shape. The main handle 20 includes a tape transport unit 28, a tape cutting unit 30, and a staple driver 32. A tape magazine unit 26 is attached to a rear end portion of the main handle 20. The main handle 20 and the tape magazine unit 26 may be integrally formed.

The tape magazine unit 26 is a mechanism that accommodates the tape TP wound on a reel (hereinafter, the wound tape TP may be referred to as a tape reel TR (an example of a "wound binding tape")). As illustrated in FIG. 1 and the like, the tape magazine unit 26 is provided at the rear end portion of the main handle 20. A configuration of the tape magazine unit 26 will be described in detail later.

The tape transport unit 28 includes the tape holder 28A and the tape guide 28B. The tape holder 28A is a path for transporting the tape TP from the tape magazine unit 26 to the tape guide 28B, and is laid along a longitudinal direction of the main handle 20. The tape holder 28A includes a bottom portion facing one surface of the tape TP, and a lid portion facing the other surface of the tape TP (hereinafter, the other surface of the tape TP may be referred to as a "back surface"). The bottom portion and the lid portion are configured to be openable and closable with one side in the longitudinal direction as a fulcrum, for example.

The tape guide 28B (FIGS. 3 to 9) is a member that guides a tip of the tape TP upward from the tape guide 28B. The tape guide 28B is disposed on a front side of the tape holder 28A and is rotatably provided at a front end portion of the main handle 20. The tape guide 28B has wall surfaces facing at least a part of each of a front surface, a back surface, and both side portions of the tape TP, so as for the inserted tape TP not to come off easily.

The tape cutting unit 30 includes a cutting blade 30A that cuts the tape TP, and a lock mechanism 30B that locks and unlocks the cutting blade 30A. During replacement of the cutting blade 30A, the lock mechanism 30B releases locking of the cutting blade 30A and the cutting blade 30A is removed. The cutting blade 30A is provided rotatably and integrally with the tape guide 28B, and is biased by an elastic member (not illustrated) so as to face the rear side during a standby state and a holding operation. When performing a binding operation, the tape guide 28B is pressed against a tip portion 60B of a tape catch 60, the tape guide 28B and the cutting blade 30A rotate against a biasing force of the elastic member (not illustrated), and a tip portion of a blade edge of the cutting blade 30A moves so as to face the tape TP.

As a mechanism that cuts the tape TP, various mechanisms can be employed. For example, the tape TP may be rotated in conjunction with the tape guide 28B, thereby cutting the tape TP; the tape guide 28B and the cutting blade 30A may be configured to be movable in a straight advancing direction and the cutting blade 30A may be moved in a linear direction, thereby cutting the tape TP; and a member restraining the tape TP such as the tape guide 28B may be moved so as to cause the tape TP to be cut by the stationary cutting blade 30A.

The staple driver 32 is a plate that is attached to the main handle 20 so as to face a vicinity of a front end of a staple accommodating portion 23 of the staple magazine unit 22. The staple driver 32 is formed to have a thickness, for example, substantially the same as a width of a staple ST or smaller than the width of the staple ST so as to drive only one staple ST. When the clincher arm 50 to be described below rotates in a closing direction indicated by an arrow θ2 in FIG. 1 with respect to the main handle 20, the staple magazine unit 22 is pressed by the clincher arm 50 to rotate in a direction approaching the main handle 20. Therefore, an upper end of the staple driver 32 attached to the main handle 20 relatively enters a portion or a space in the staple accommodating portion 23 to drive a leading staple ST in the staple accommodating portion 23 upward. The driven staple ST is clinched by a clincher 54 after penetrating the tape TP. Two overlapped tapes TP can be held between bent leg portions of the staple ST and a crown portion of the staple ST. A configuration of the staple driver 32 will be described in detail later.

The staple magazine unit 22 is a member formed in an elongated linear shape. A rear end portion of the staple magazine unit 22 is attached to the rear end portion of the main handle 20 so as to be rotatable around a rotation shaft. However, since a rotation angle thereof is small, the staple magazine unit 22 may be expressed as being swingably attached to the main handle 20.

The staple magazine unit 22 includes the staple accommodating portion 23 that accommodates the staple ST, and a pusher unit 24. The staple accommodating portion 23 is disposed along the longitudinal direction of the main handle 20. In order to accommodate the staple ST therein, the staple accommodating portion 23 includes a bottom surface formed to be elongated along the longitudinal direction of the main handle 20, two sidewall surfaces standing from the bottom surface and facing each other, and a front wall surface against which a side surface of the leading staple ST is pressed. A configuration of the staple magazine unit 22 will be described in detail later.

In the staple accommodating portion 23, a plurality of staples ST can be accommodated. Adjacent staples ST can be connected to each other with an adhesive, for example, to form a column of a staple group as a whole. A configuration of the staple ST will be described in detail later.

The pusher unit 24 is, for example, a member removably attached to the staple accommodating portion 23 in order to push the staples ST accommodated in the staple accommodating portion 23 forward. The pusher unit 24 includes a compression spring that pushes staples ST at the rear end among the plurality of staples ST forward, and a cover that covers the staple accommodating portion 23 from above. By pulling out the pusher unit 24 from the staple accommodating portion 23 and opening the staple accommodating portion 23 to above, the staples ST can be set in the staple accommodating portion 23 from above.

The clincher arm 50 is attached by a rotation shaft portion 11 provided in the vicinity of a rear end portion thereof so as to be rotatable with respect to the main handle 20, and is biased by a tension spring 12 in an opening direction indicated by an arrow θ1 in FIG. 1 in which a gap between the clincher arm 50 and the main handle 20 increases. The clincher arm 50 includes an arm portion 52, the clincher 54, and the tape holding unit 56 (an example of a "holding unit").

The arm portion 52 has a shape that extends in a curved manner up to a tip portion so that a C-shaped opening can be formed between the arm portion 52 and the main handle 20.

The clincher 54 is a member that bends and clinches the leg portions of the staple ST. The clincher 54 is provided at a tip portion of the clincher arm 50 so as to face a tip of the staple driver 32 when the clincher arm 50 rotates in the closing direction. With such a configuration, the two leg portions of the staple ST driven by the staple driver 32 are clinched by the clincher 54 and bent inward. The configuration including the clincher 54 that is provided on the clincher arm 50 and that is for performing binding processing may be referred to as a "binding portion". A configuration of the clincher 54 will be described in detail later.

The tape holding unit 56 is a mechanism that holds an end portion of the tape TP pulled out from the tape guide 28B at a tip of the main handle 20. The tape holding unit 56 is provided at a tip of the arm portion 52 of the clincher arm 50. The tape holding unit 56 includes a lock plate 58, the tape catch 60, and a tape plate 62. The lock plate 58 is configured to be rotatable with a shaft portion 58A provided at one end side thereof serving as a fulcrum, and the other end side thereof is biased toward the tape catch 60 by a coil spring 59. The lock plate 58 locks the tape catch 60 by engaging with the tape catch 60 under the biasing of the coil spring 59, and can fix the tape catch 60 at a position separated from the tape plate 62. The tape catch 60 is provided so as to be rotatable with a shaft portion 60A serving as a fulcrum, and is biased toward the tape plate 62 by a torsion coil spring 61. The tape catch 60 is configured such that, when locking by the lock plate 58 is released at the time of pulling out of the tape, the tip portion 60B having a tapered shape is moved toward the tape plate 62 under the biasing of the torsion coil spring 61. The tape plate 62 is disposed to face the tape catch 60, and a tip portion thereof extends from the lock plate 58 toward the tape cutting unit 30. The extended portion of the tape plate 62 and the tip portion 60B of the tape catch 60 clamp the tape TP. When a user reduces a force of gripping the operation handle 70 while the tape TP is being held, the clincher arm 50 is rotated in the opening direction by the tension spring 12, and thus the tape TP can be pulled upward via the tape guide 28B.

The operation handle 70 is a portion to be gripped by the user. A shaft portion 70A at a substantially intermediate part thereof is rotatably attached to the clincher arm 50, and a front end portion of the operation handle 70 is attached to the main handle 20. With such a configuration, the clincher arm 50 is configured to be openable and closable relative to the main handle 20 according to an opening/closing operation of the operation handle 70, based on a principle of leverage using a portion to be gripped by a user as a force application point, a rotation shaft of the clincher arm 50 as a fulcrum, and the front end portion attached to the main handle 20 as an action point.

[Operation of Binding Machine 10]

Figure 4:
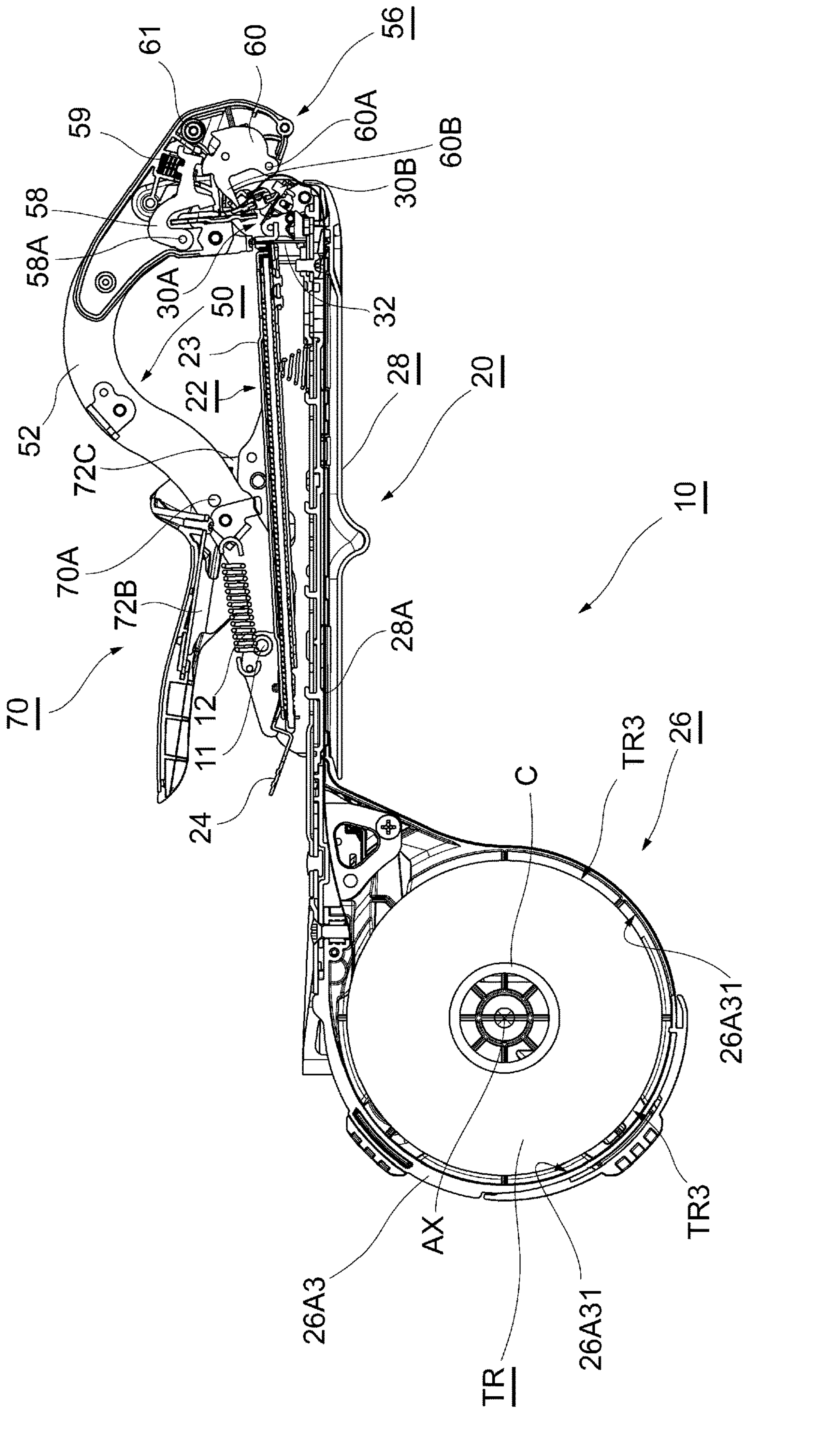
FIG. 4 is a cross-sectional view of the binding machine in a state where a tape is gripped.

The clincher arm 50 is constantly biased by the tension spring 12, and in a standby state illustrated in FIGS. 1 to 3, the clincher arm 50 is in an open state with respect to the main handle 20. When the user grips the operation handle 70 and the main handle 20 from this state, the clincher arm 50 is rotated in the closing direction with respect to the main handle 20 as illustrated in FIG. 4. Further, when the clincher arm 50 rotates in the closing direction to a predetermined position with respect to the main handle 20, the tape holding unit 56 of the clincher arm 50 holds the tape TP in order to pull out the tape TP (FIG. 5).

Figure 5:
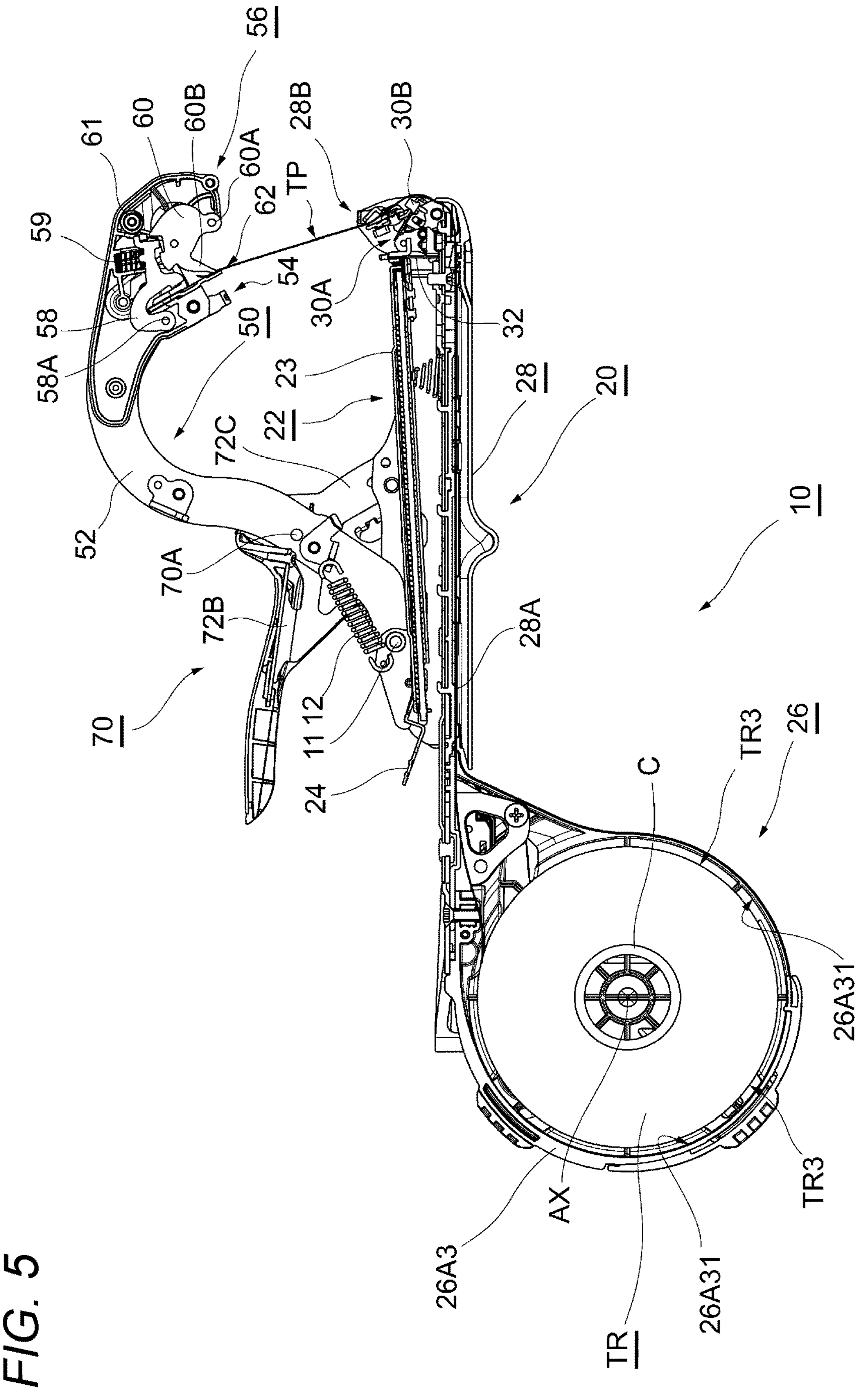
FIG. 5 is a cross-sectional view of the binding machine in a state where the tape is pulled out.

Thereafter, when gripping on the main handle 20 is loosened to rotate the clincher arm 50 in the opening direction with respect to the main handle 20, as illustrated in FIG. 5, the tape holding unit 56 of the clincher arm 50 and the tape guide 28B of the main handle 20 are separated from each other with the tape TP being held, and the tape TP is stretched between the clincher arm 50 and the main handle 20.

Figure 6:
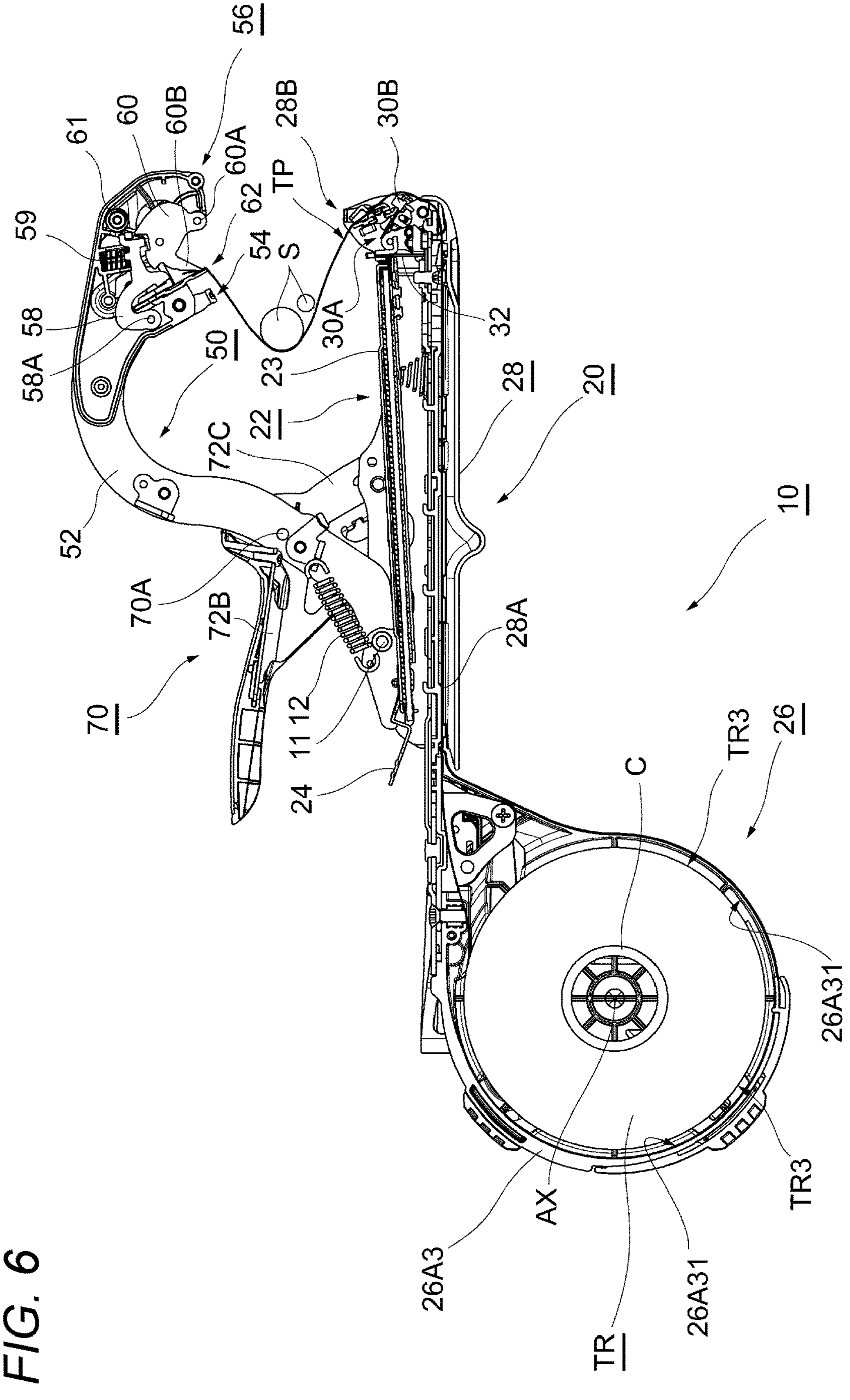
FIG. 6 is a cross-sectional view of the binding machine in a state where an object to be bound is inserted.
Figure 7:
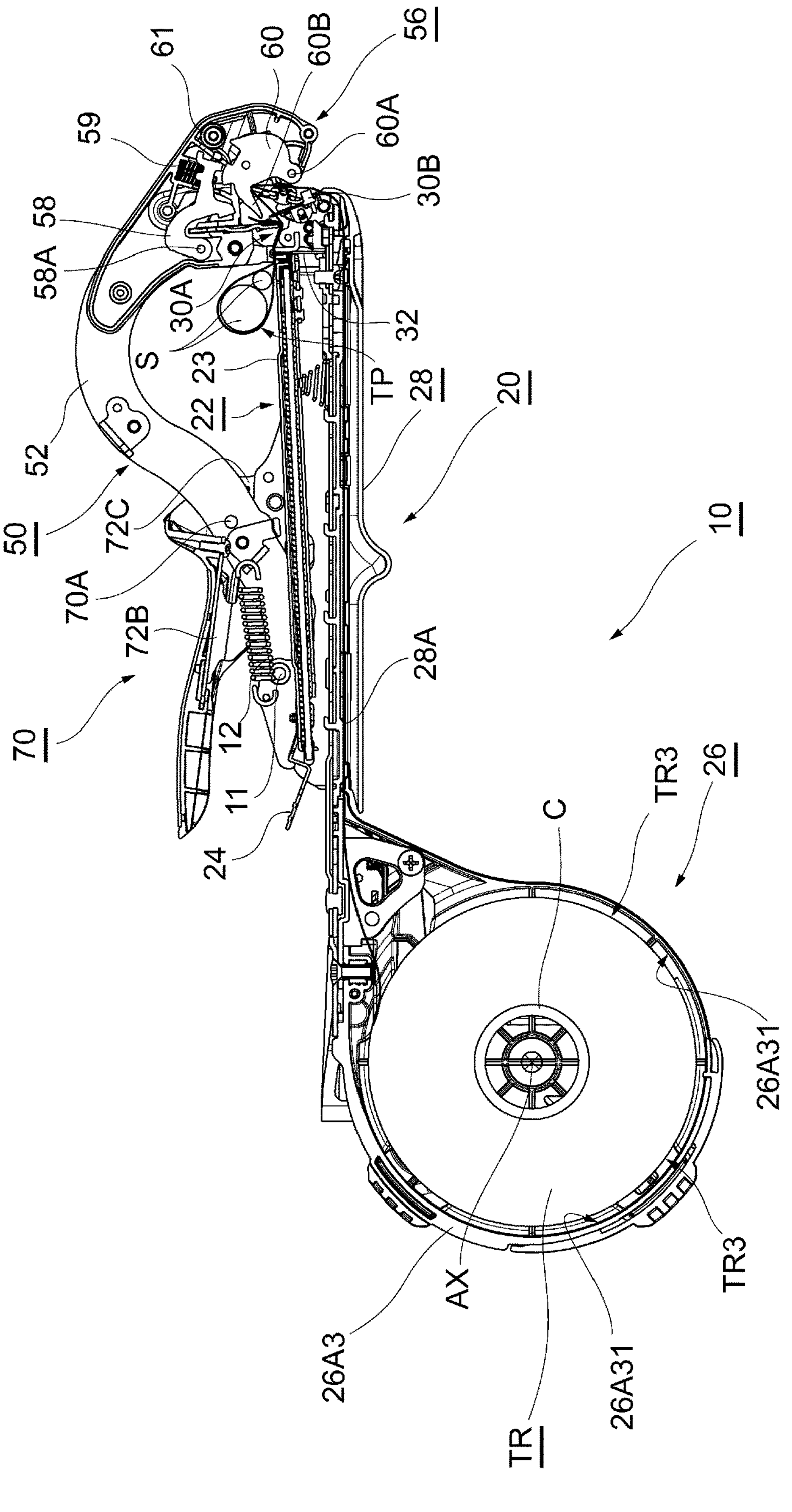
FIG. 7 is a cross-sectional view of the binding machine in a state where striking of a staple is started.
Figure 8:
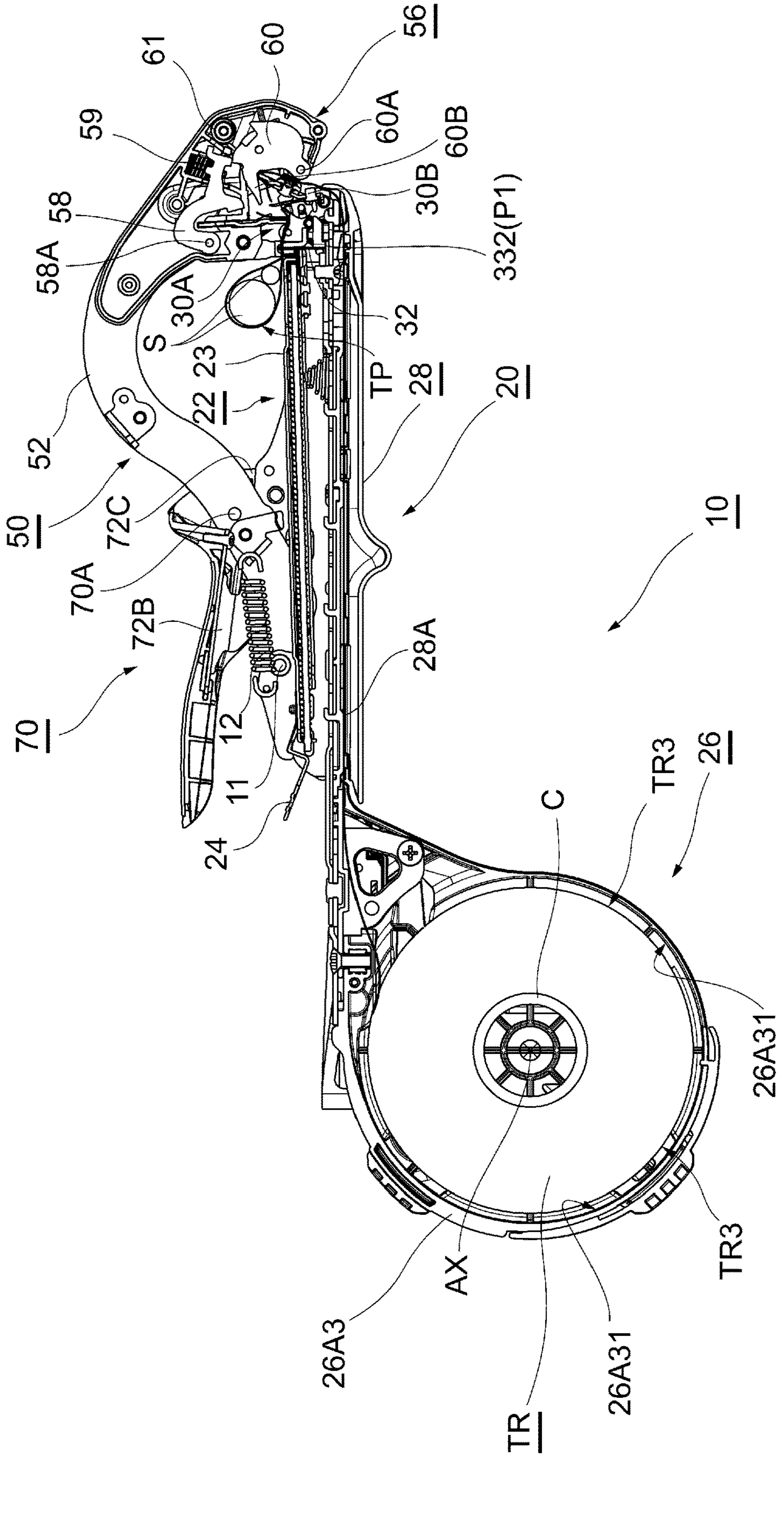
FIG. 8 is a cross-sectional view of the binding machine in a state where the staple is being struck.
Figure 9:
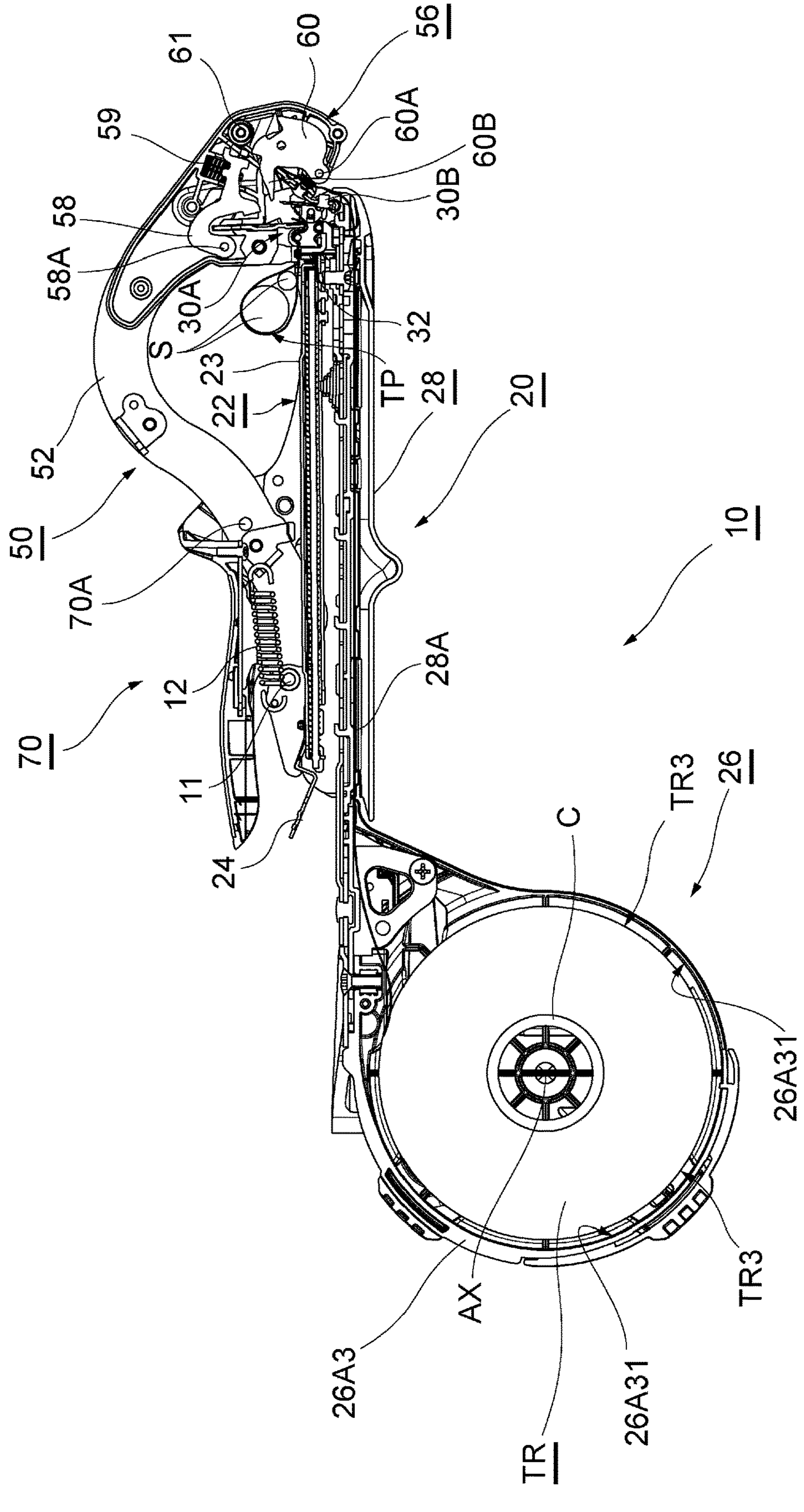
FIG. 9 is a cross-sectional view of the binding machine in a state where striking of the staple is completed.

As illustrated in FIG. 6, when an object S to be bound such as plantlets or branches is inserted from an outer side of the stretched tape TP in this state and the clincher arm 50 is rotated again in the closing direction, a tape loop of the tape TP which binds the object S to be bound is formed as illustrated in FIG. 7. Since the staple magazine unit 22 is rotated in the closing direction by being pressed by the clincher arm 50, the staple ST is driven by the staple driver 32. Accordingly, as illustrated in FIGS. 8 and 9, both ends of the tape loop for binding the object S to be bound are bound by the staple ST. Further, the tape TP is cut by the cutting blade 30A, and the binding operation is performed.

As described, the holding operation is performed in a first gripping operation, and the binding operation is performed in a second gripping operation. Further, by alternately performing the holding operation and the binding operation, the object S to be bound can be bound. In the present embodiment, although the staple ST is used as a member for binding both ends of the tape loop, the present invention is not limited thereto, and the tape loop may be bound by another member.

Hereinafter, the characteristic structure of the binding machine 10 will be described in detail.

[Tape Magazine Unit]

Figure 10:
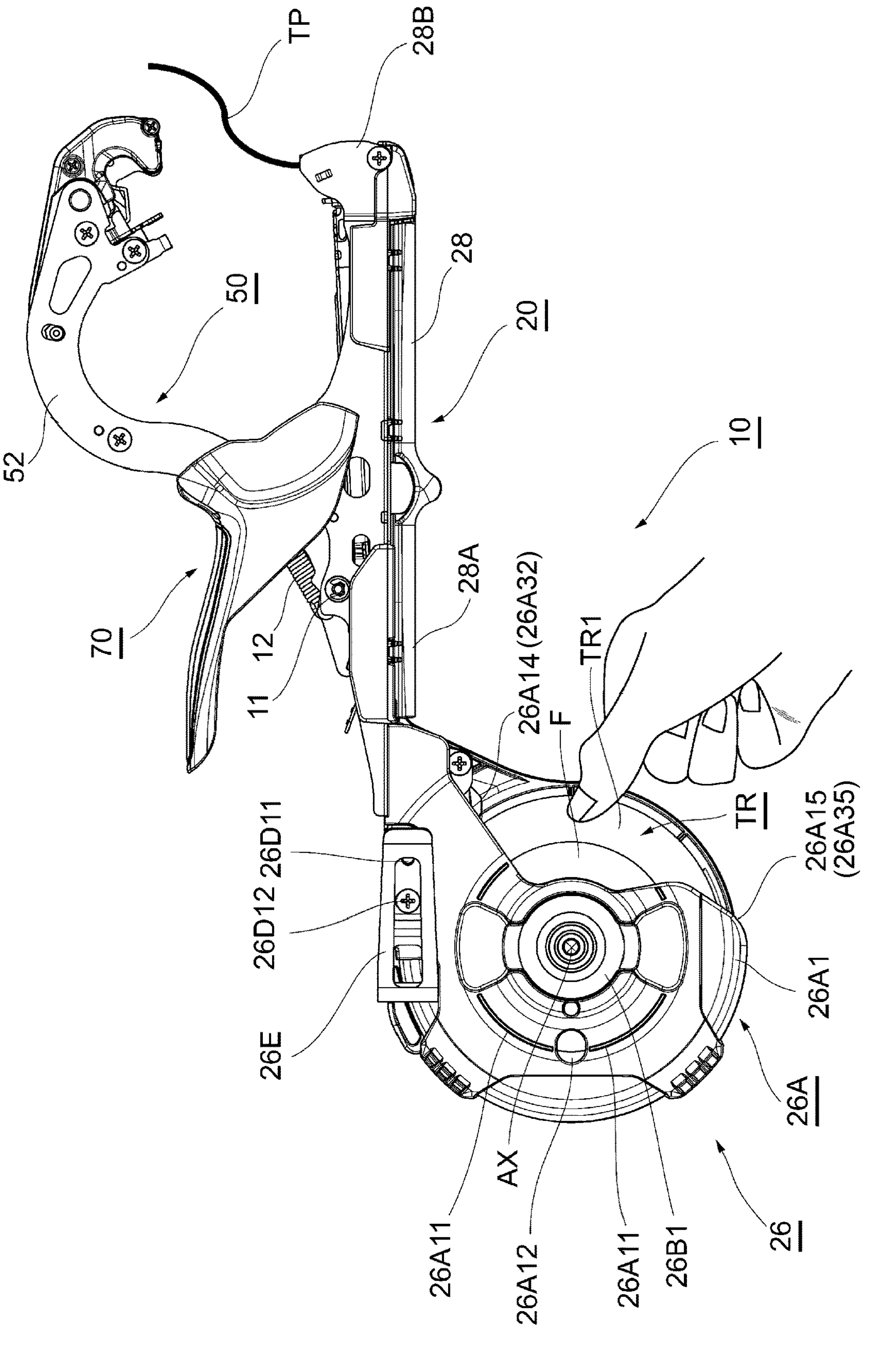
FIG. 10 is a diagram illustrating a state where a tape reel is mounted to the binding machine.
Figure 11A:
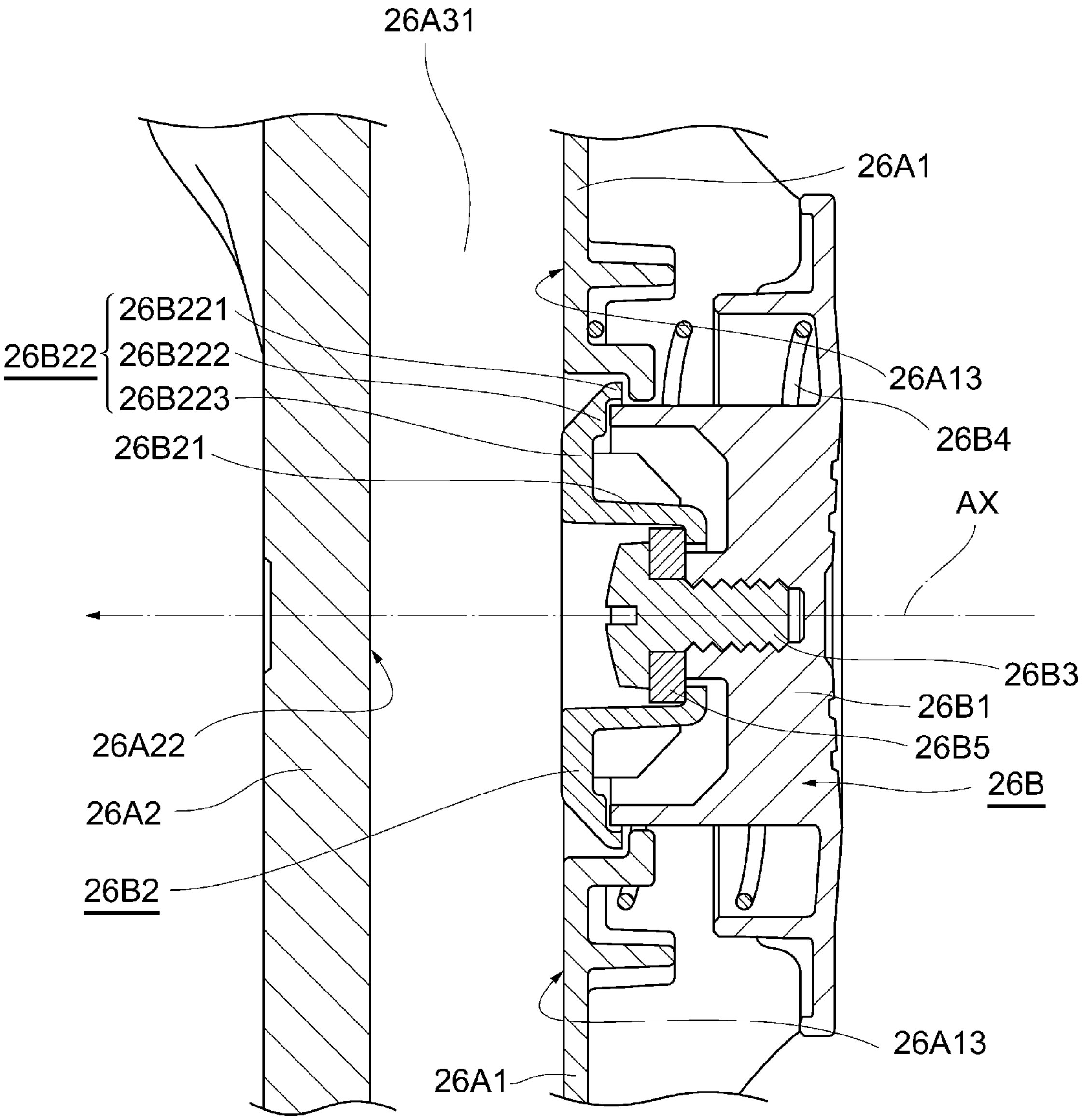
FIG. 11A is a cross-sectional view of a main part of a tape magazine unit.
Figure 11B:
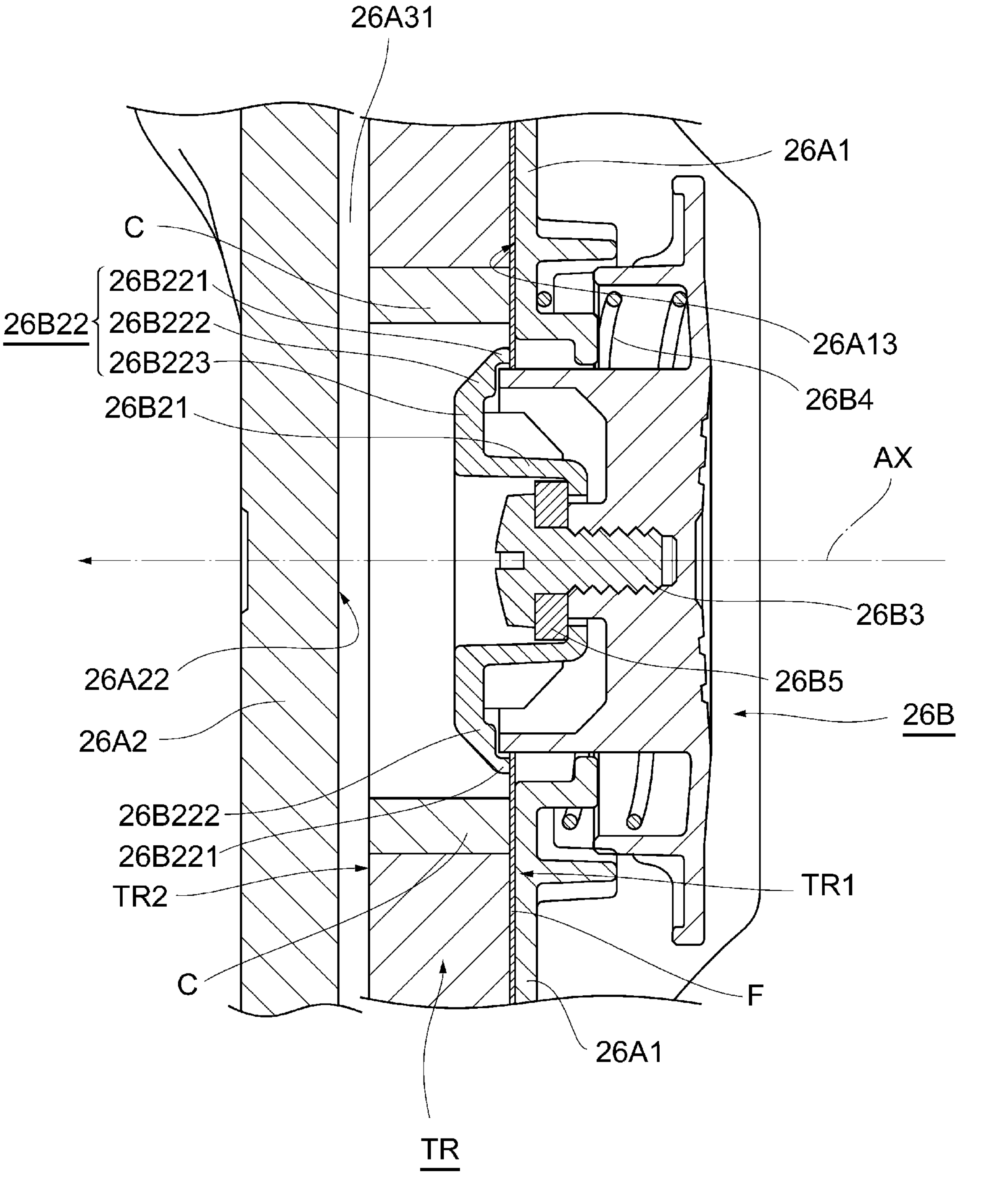
FIG. 11B is a cross-sectional view of the main part of the tape magazine unit when the tape reel is mounted.

FIG. 10 is a diagram illustrating a state at the time of mounting the tape reel TR to the tape magazine unit 26. FIG. 11A is a cross-sectional view of a main part which is obtained by cutting the tape magazine unit 26 in a section including an axis AX of the bobbin case 26A (an example of the "accommodating portion") in a state before mounting of the tape reel TR. FIG. 11B is a cross-sectional view illustrating a state at the time when the tape reel TR is mounted in FIG. 11A.

As illustrated in these drawings, the tape magazine unit 26 includes the bobbin case 26A and a holding unit 26B (an example of an "engaging portion") that holds the tape reel TR. The bobbin case 26A is formed in a substantially cylindrical shape with the axis AX as a center so as to accommodate a cylindrical tape reel TR having a height corresponding to a width of the tape TP. An axis AX direction refers to a direction parallel to the axis AX. For convenience, in the axis AX direction, a leftward direction (a direction from a front surface portion 26A1 to a back surface portion 26A2 which will be described below) in FIGS. 11A and 11B may be referred to as an axis AX positive direction, and a rightward direction (a direction from the back surface portion 26A2 to the front surface portion 26A1 which will be described below) in FIGS. 11A and 11B may be referred to as an axis AX negative direction.

The bobbin case 26A includes the front surface portion 26A1 (an example of a "sidewall portion") having a substantially circular shape with a part thereof cut out, the back surface portion 26A2 (an example of the "sidewall portion", FIG. 2) formed in a substantially circular shape, and a circumferential portion 26A3 connecting the front surface portion 26A1 and the back surface portion 26A2. The front surface portion 26A1, the back surface portion 26A2, and the circumferential portion 26A3 may be formed integrally, or may be formed of one or a plurality of separable components. For example, the front surface portion 26A1 and the circumferential portion 26A3 may be integrally formed, and the back surface portion 26A2 may be connected thereto to form the bobbin case 26A. A sidewall portion of the bobbin case 26A refers to a member having a sidewall facing a side surface TR1 or a side surface TR2 of the tape reel TR having a circular shape by being wound. The circumferential portion refers to a member that connects two sidewall portions provided to face the two side surfaces TR1 and TR2 of the tape reel TR and that faces a surface TR3 of an outermost tape TP of the tape reel TR.

On an outer surface of the front surface portion 26A1, ribs 26A11 composed of one or a plurality of concentric protrusions with the axis AX as a center are formed. The rib 26A11 may be, for example, an emboss formed by embossing. The rib 26A11 may be a circular arc extending in a circumferential direction. One of the ribs 26A11 is preferably a circular arc or a circle having a same diameter as a film F of the tape reel TR. In a region on a rear side of the outer surface of the front surface portion 26A1, a circular hole 26A12 having a small-diameter communicating with an inner region for accommodating the tape reel TR is formed so as to intersect with the rib having the same diameter as the film F of the tape reel TR. The holding unit 26B, which will be described later, is disposed in a central portion including the axis AX of the front surface portion 26A1. The holding unit 26B is accommodated in the front surface portion 26A1. However, a surface of a button 26B1 to be pressed by the user is exposed to the outside. As illustrated in FIGS. 11A and 11B, an inner wall surface of the front surface portion 26A1 has a first inner wall surface 26A13 (an example of a "sidewall") that faces a part of the side surface TR1 of the tape reel TR when the tape reel TR is mounted.

As illustrated in FIG. 1 and the like, a part of the front surface portion 26A1 is cut out, excluding the central portion including the axis AX in which the holding unit 26B is accommodated. Therefore, an opening is formed in the front surface portion 26A1. A size of the opening formed in the front surface portion 26A1 can be expressed by a maximum angle between one point on an opening edge and one point on another opening edge of the front surface portion 26A1 with the axis AX serving as a center in FIG. 10 as viewed in a direction facing the front surface portion 26A1 (a direction parallel to the axis AX of the bobbin case 26A), the two opening edges sandwiching the opening. In the present embodiment, when viewed from the direction facing the front surface portion 26A1 (the direction parallel to the axis AX of the bobbin case 26A), an angle between one point 26A15 on the opening edge and one point 26A14 on another opening edge with the axis AX serving as a center is about 120 degrees, the two opening edges sandwiching the opening. Since such an opening is formed, when the tape reel TR is mounted, a part of the circular side surface of the tape reel TR is exposed to the outside.

In an outer surface of the back surface portion 26A2 (FIG. 2), a slit 26A21 is formed that communicates with the inner region for accommodating the tape reel TR and that extends in a radial direction with respect to the axis AX from a position separated from the axis AX. As illustrated in FIGS. 11A and 11B, an inner wall surface of the back surface portion 26A2 has a second inner wall surface 26A22 (an example of the "sidewall") that faces a part of the circular side surface TR2 of the tape reel TR when the tape reel TR is mounted. Unlike the front surface portion 26A1, the back surface portion 26A2 is not cut out. Therefore, area of the second inner wall surface 26A22 facing the other side surface of the tape reel TR is larger than area of the first inner wall surface 26A13.

The circumferential portion 26A3 (FIG. 14) is a portion connecting the front surface portion 26A1 and the back surface portion 26A2. The circumferential portion 26A3 has a third inner wall surface 26A31 that faces a surface of the outermost tape reel TR when the tape reel TR is mounted. The third inner wall surface 26A31 may include a cylindrical surface with the axis AX as a center following a shape of an outer circumferential surface of the tape reel TR. Further, at least a part of an outer surface may include a cylindrical surface with the axis AX as a center.

An opening for accommodating the tape reel TR therein is formed in the circumferential portion 26A3. Therefore, as viewed from the axis AX direction, the front surface portion 26A1 and the back surface portion 26A2 are not connected by the circumferential portion 26A3 in all directions (360 degrees) with the axis AX as a center, and only parts thereof are connected. In the present embodiment, when viewed from the direction facing the front surface portion 26A1 (the direction parallel to the axis AX of the bobbin case 26A), the angle of the opening between one point on an opening edge and one point on another opening edge of the circumferential portion 26A3 with the axis AX serving as a center is, for example, about 120 degrees to about 180 degrees, the two opening edges sandwiching the opening. As will be described later, by forming in the circumferential portion 26A3 an opening having a length larger than a diameter of the tape reel TR before use, it is possible to accommodate the tape reel TR in the bobbin case 26A by moving the tape reel TR in a direction perpendicular to the axis AX.

As illustrated in FIGS. 11A and 11B, the holding unit 26B (an example of a "first protrusion") includes the button 26B1, a shaft 26B2, a male screw 26B3, and a compression spring 26B4. The button 26B1 has the surface exposed to the outside so as to be pressed by the user. The shaft 26B2 is held to be movable back and forth in the axis AX direction together with the button 26B1 by engaging with the button 26B1 on a side near the back surface portion 26A2, and is rotatably held by a mechanism such as a shaft bearing with the axis AX as a rotation axis. The male screw 26B3 screws into a female screw formed in the button 26B1 and presses the shaft 26B2 toward the button 26B1 to engage the haft 26B2 with the button 26B1. The compression spring 26B4 biases the shaft 26B2 in the axis AX negative direction (the axis AX direction, a direction heading for an outer surface in which the button 26B1 is exposed). In addition, a washer 26B5 is inserted between a head portion of the male screw 26B3 and the button 26B1.

The surface of the button 26B1 is supported to be movable back and forth in the axis AX direction when pressed by the user. The button 26B1 is formed with the female screw that opens toward the inner region side with the axis AX as an axis. The male screw 26B3 is screwed with the female screw. The button 26B1 and the shaft 26B2 are engaged so as to integrally move in the axis AX direction.

The shaft 26B2 includes a cylindrical portion 26B21 formed in a cylindrical shape coaxial with the axis AX, and an engaging portion 26B22 that is formed to spread radially outward from a tip of the cylindrical portion 26B21 and that is formed to be axially symmetrical with respect to the axis AX. The engaging portion 26B22 includes an enlarged diameter portion 26B223 that is connected to the cylindrical portion 26B21 and that extends radially outward from the cylindrical portion 26B21, an inclined surface portion 26B222 that is connected to the enlarged diameter portion 26B223 and that has an inclined surface inclined such that a distance from the axis AX increases as getting away from the second inner wall surface 26A22, and a bottom surface portion 26B221 that is connected to the inclined surface portion 26B222 and that protrudes in the axis AX negative direction. In the present embodiment, since the engaging portion 26B22 is formed to be axially symmetrical with respect to the axis AX, the inclined surface portion 26B222 is formed to have a side surface shape of a truncated cone, and the bottom surface portion 26B221 is formed in an annular shape. However, as will be described later, since the bottom surface portion 26B221 may include a surface facing the axis AX negative direction in order to press and hold the film F, the bottom surface portion 26B221 may not necessarily be formed in an annular shape.

A radius of the annular bottom surface portion 26B221 is smaller than an inner diameter of a winding core C of the tape reel TR which will be described later, and is larger than a hole diameter of the film F. The shaft 26B2 is biased in the axis AX negative direction by the compression spring 26B4. Therefore, by pressing the film of the tape reel TR toward the first inner wall surface 26A13 by using the annular bottom surface portion 26B221, the tape reel TR can be supported to be rotatable about the axis AX.

Note that a portion other than the film F of the tape reel TR may abut the bottom surface portion 26B221. For example, a side surface of the winding core C, which faces the second inner wall surface 26A22, may abut the annular bottom surface portion 26B221 so that the tape reel TR can be supported to be rotatable about the axis AX.

Even with a configuration other than the shaft 26B2, similarly the tape reel TR can be rotatably held by using a component that is configured to be biased toward the first inner wall surface 26A13 when the component protrudes from the first inner wall surface 26A13.

Hereinafter, an example of a configuration of the tape reel TR that can be used in the binding machine 10 of the present embodiment will be briefly described.

As illustrated in FIG. 11B, the tape reel TR includes the cylindrical winding core C (an example of a "tubular bobbin") and the tape TP wound around the winding core C as a center. For example, the film F is attached to one of circular side surfaces of the tape TP which appear when the tape TP is wound around such that both side portions thereof are stacked. An inner diameter of the film F is smaller than the inner diameter of the winding core C. Therefore, an inner diameter portion of the film F protrudes inward from the winding core C. The portion of the film F that protrudes inward from the winding core C is referred to as a rib R. An outer diameter of the film F is smaller than an outer diameter of the tape reel TR before use. Therefore, one side surface of the tape reel TR has an inner peripheral region to which the film F is attached, and an outer peripheral region where the film F is not attached and where a stacked side portion of the tape TP is exposed. However, the inner peripheral region refers to a region of the side surface of the tape reel TR before use, which is closer to the winding core C than to an outer periphery of the tape reel TR. The outer peripheral region refers to an opposite region, that is, a region of the side surface of the tape reel TR before use, which is closer to the outer periphery of the tape reel TR than to the winding core C. Therefore, when use of the tape reel TR is started, the tape TP in the outer peripheral region is initially used, and then the tape TP in the inner peripheral region is used. A part of the film F may extend to the outer peripheral region. Conversely, the film F may be attached only to a part of the inner peripheral region. In the present embodiment, the outer diameter of the film F is larger than a sum of a radius of the outer circumferential surface of the tape reel TR before use and a radius of an outer circumferential surface of the winding core C. Therefore, a part of the film F is attached to the whole inner peripheral region and a part of the outer peripheral region. Since the film F is not attached to the other side surface of the tape reel TR, a side portion of the tape TP is exposed over the entire side surface.

Next, a mounting method for mounting the tape reel TR to the tape magazine unit 26 will be described with reference to FIGS. 12A to 12D. FIGS. 12A to 12D are cross-sectional views of the bobbin case 26A of the tape magazine unit 26 taken along a cross section passing through the axis AX.

Figure 12A:
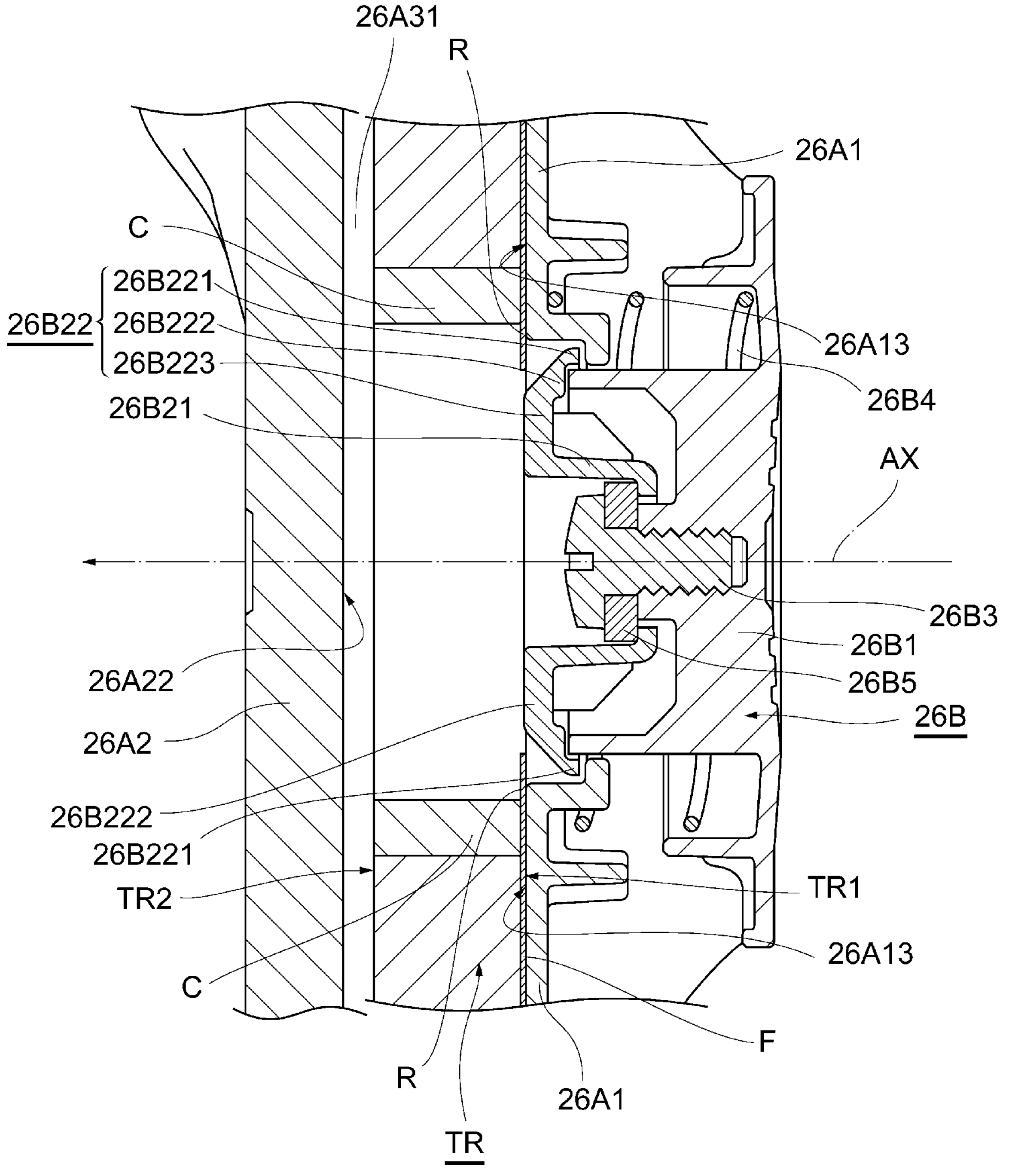
FIG. 12A is a cross-sectional view of the main part of the tape magazine unit before the tape reel is held.

First, the user opens the lid portion of the tape holder 28A (step S1). Next, the user moves the tape reel TR in a direction perpendicular to the axis AX of the bobbin case 26A, and accommodates the tape reel TR in the inner region of the bobbin case 26A from the opening formed in the circumferential portion 26A3 (step S2). For example, the user may grip the binding machine 10 such that the main handle 20 stands vertically upward and the opening of the circumferential portion 26A3 is directed vertically upward, and move the tape reel TR vertically downward so that the tape reel TR is accommodated in the inner region of the bobbin case 26A. When the tape reel TR is accommodated in the bobbin case 26A, as illustrated in FIG. 12A, the axis AX is preferably present in a region surrounded by the winding core C of the tape reel TR. For example, the third inner wall surface 26A31 is formed to include a cylindrical surface separated from the axis AX by a distance slightly larger than the outer diameter of the tape reel TR before use, and thus the axis AX of the bobbin case 26A and a central axis of the tape reel TR can be brought close to each other within a predetermined distance when the tape reel TR is accommodated.

Figure 12B:
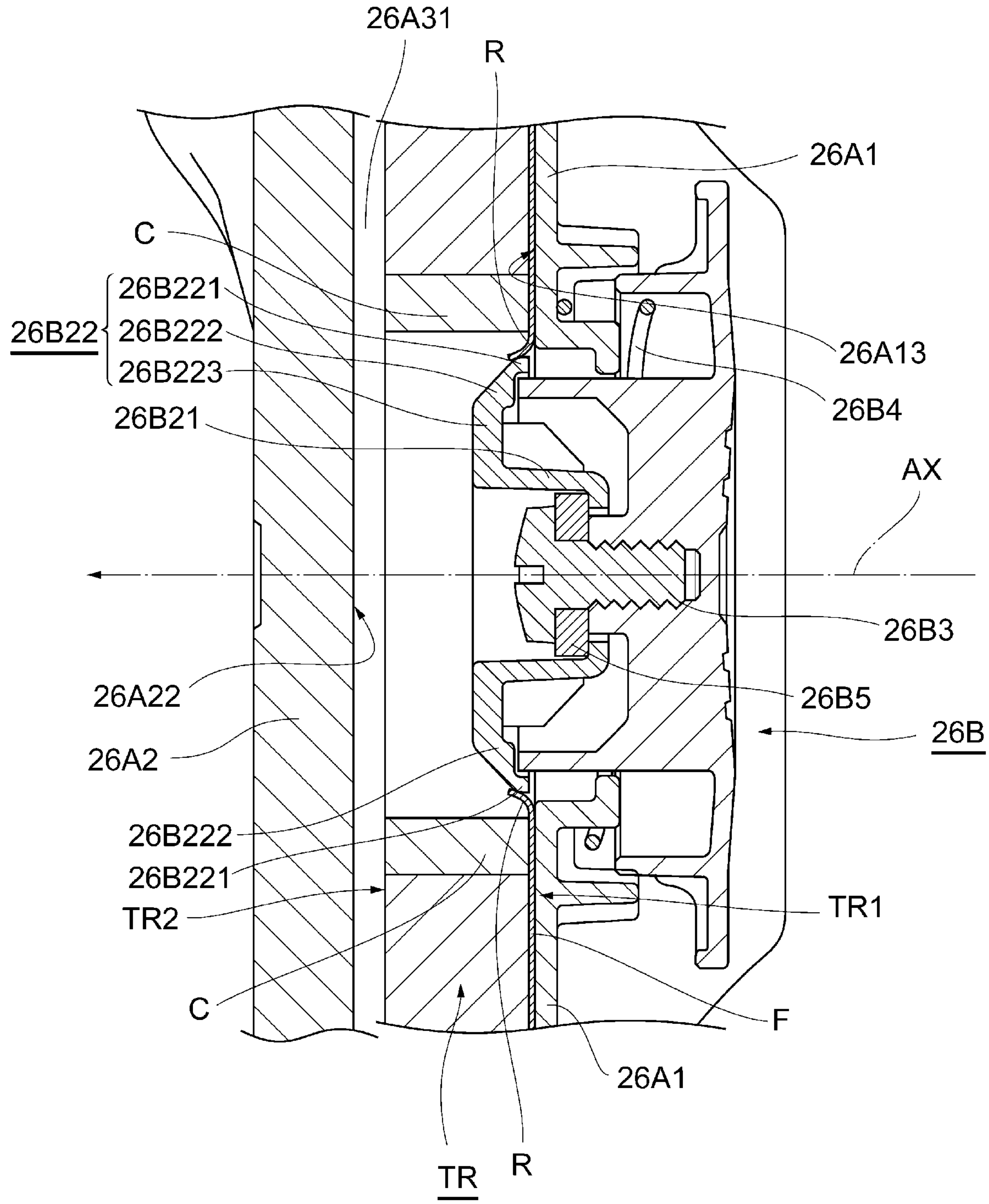
FIG. 12B is a cross-sectional view of the main part of the tape magazine unit in a state where a shaft moving in an axial direction abuts a film.

Next, the user presses the button 26B1 (step S3). Accordingly, as illustrated in FIG. 12B, the button 26B1 and the shaft 26B2 advance in the axis AX positive direction. Therefore, a part of the shaft 26B2 protrudes from the first inner wall surface 26A13 and enters the inner region of the bobbin case 26A. At this time, since an outer diameter of the bottom surface portion 26B221 (twice of a distance between the bottom surface portion 26B221 and the axis AX) is larger than an inner diameter of the hole of the film F, the inclined surface of the inclined surface portion 26B222 comes into contact with the rib R of the film F. However, since an end portion of the rib R is a free end, the rib R is elastically deformed along the inclined surface of the inclined surface portion 26B222 as illustrated in the drawing.

Figure 12C:
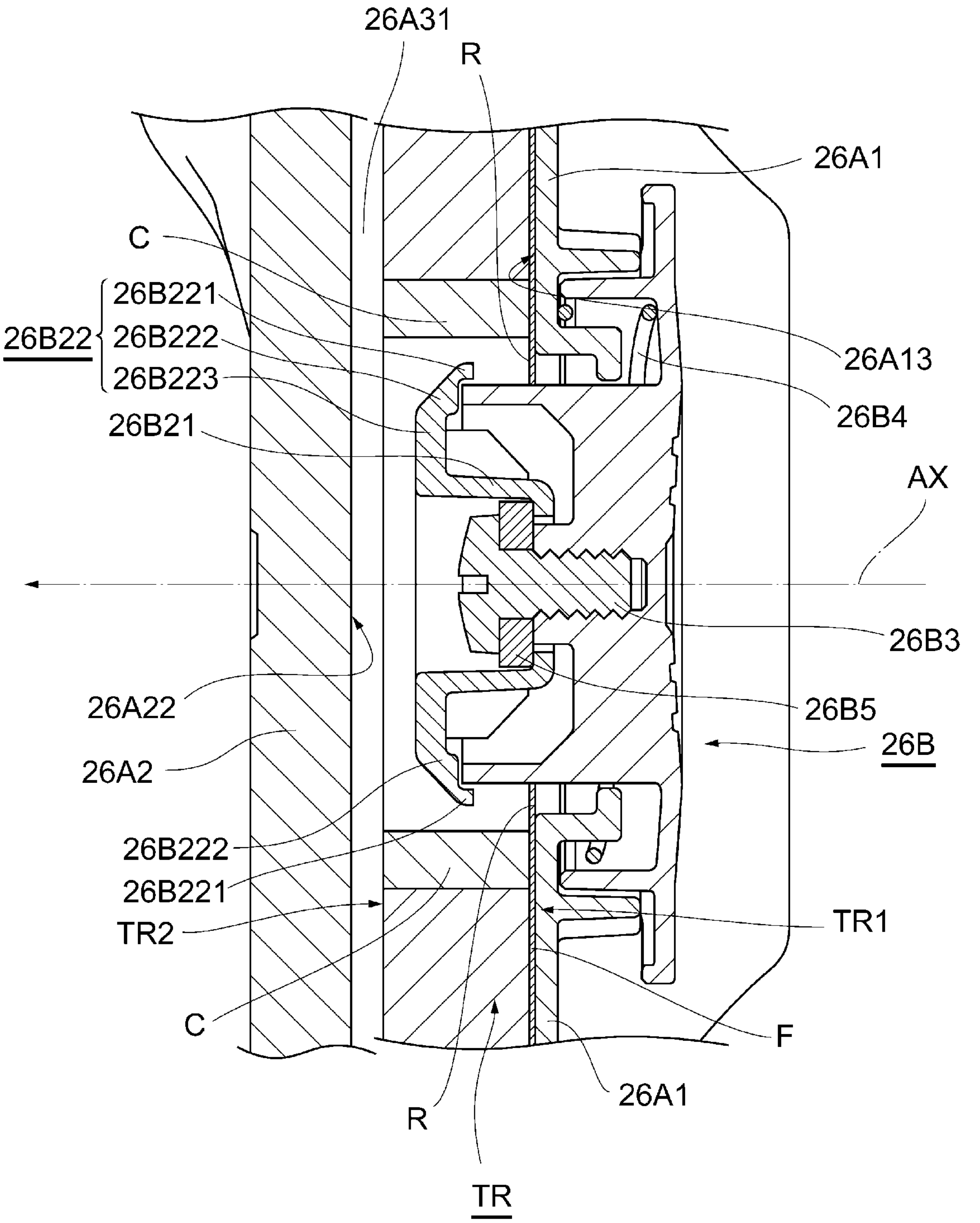
FIG. 12C is a cross-sectional view of the main part of the tape magazine unit in a state where the shaft moving in the axial direction passes through the film.

When the button 26B1 and the shaft 26B2 are further moved in the axis AX positive direction, the bottom surface portion 26B221 of the engaging portion 26B22 passes through the rib R of the film F (step S4). Therefore, as illustrated in FIG. 12C, the engaging portion 26B22 is present in a region surrounded by the rib R and an inner wall surface of the winding core C.

Figure 12D:
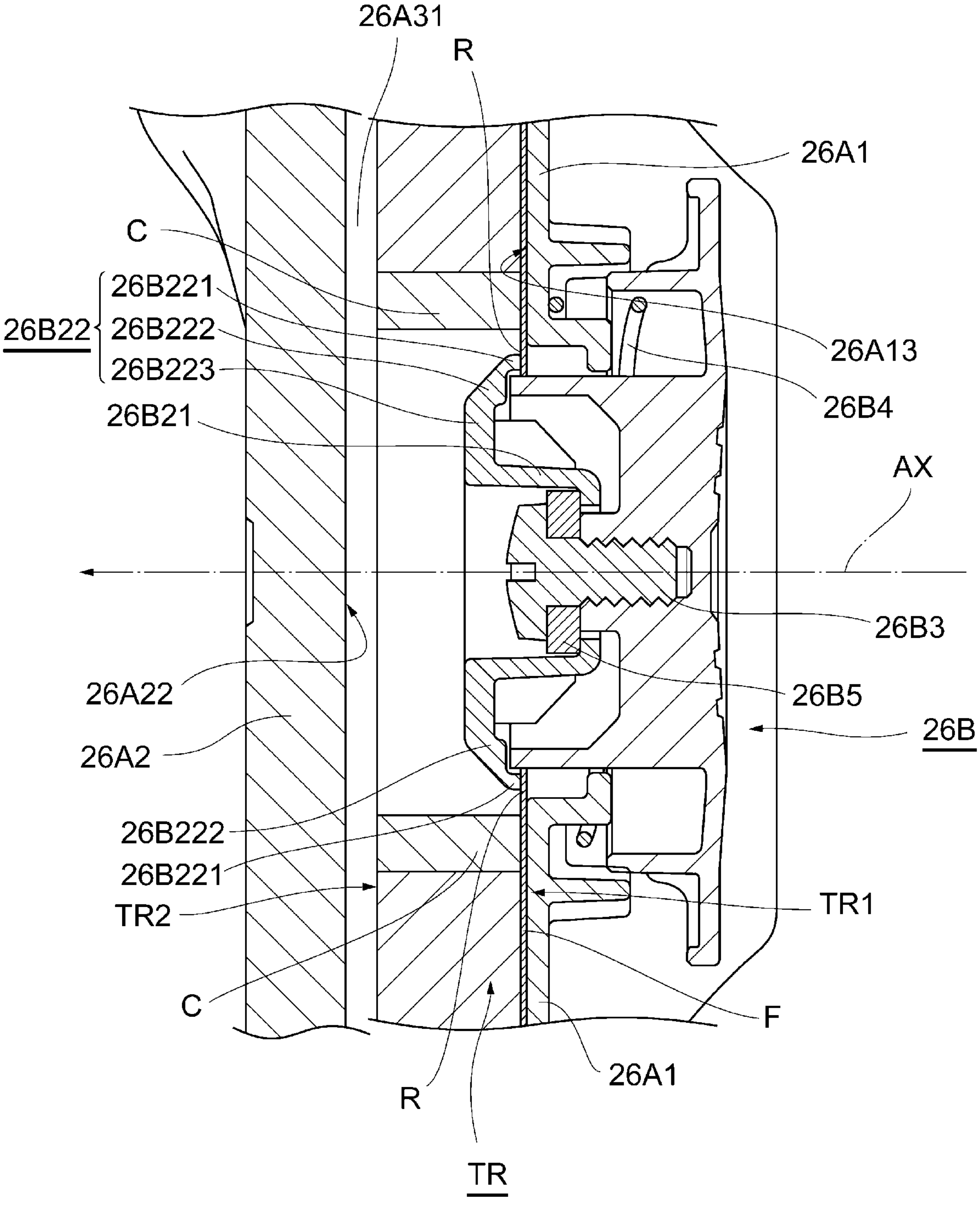
FIG. 12D is a cross-sectional view of the main part of the tape magazine unit in a state where a bottom surface portion of the shaft abuts the film and holds the tape reel.

Thereafter, when pressing on the button 26B1 is stopped, the button 26B1 and the shaft 26B2 move in the axis AX negative direction, which is an opposite direction, under a biasing force of the compression spring 26B4. However, the bottom surface portion 26B221 of the engaging portion 26B22 contacts and press an edge portion of the rib R (an example of "engagement") (step S5). Therefore, as illustrated in FIG. 12D, the tape reel TR can be held rotatably while maintaining a state where the engaging portion 26B22 is accommodated in the region surrounded by the rib R and the inner wall surface of the winding core C. At this time, a surface of the film F and the first inner wall surface 26A13 may face each other and partially contact each other. However, by forming the film F with a highly smooth member, rotation of the tape reel TR can be prevented from being hindered unnecessarily. When the biasing force of the compression spring 26B4 is increased, the tape reel TR can be pressed and held with a stronger force while deforming the end portion of the rib R in a direction of separating from the winding core C. Rigidity of the film F, an elastic force of the compression spring 26B4, a thickness of the film F, and the like can be appropriately designed by those skilled in the art.

Thereafter, the user pulls out the tip of the tape TP through the tape holder 28A, holds a tip portion of the tape TP on the tape guide 28B, and thereafter closes the lid portion of the tape holder 28A (step S6).

By performing the above process, the mounting of the tape reel TR to the binding machine 10 is completed. The user can use the binding machine 10 to repeatedly perform the holding operation and the binding operation. Since the engagement between the shaft 26B2 and the film F is released by pulling the button 26B1 in the axis AX negative direction, the tape reel TR can be easily removed.

According to the tape magazine unit 26 having the above configuration, since the opening through which the tape reel TR can pass is formed in the circumferential portion 26A3 of the bobbin case 26A, the tape reel TR can be accommodated in the bobbin case 26A. Therefore, the tape reel TR can be set in the bobbin case 26A more easily than in the related art. In addition, since the tape reel TR can be set in the bobbin case 26A without changing a manner of holding the binding machine 10, it is possible to reduce the possibility that the tape reel TR falls at the time of setting.

As will be understood by those skilled in the art, the tape magazine unit 26 and the bobbin case 26A can also be used in a binding machine that implements a binding method other than the binding machine 10.

Since not only the circumferential portion 26A3 but also a portion of the front surface portion 26A1 is cut out to form the opening, even with a half-used tape reel TR, a center of the tape reel TR and a center of the bobbin case 26A can be easily aligned. In particular, one or a plurality of circular ribs 26A11 with the axis AX as a center are formed on the front surface portion 26A1. Therefore, by comparing the rib 26A11 with a boundary between the tapes TP or the film F on the side surface of the tape reel TR that can be observed from the opening, the alignment can be easily performed. In addition, the small-diameter hole 26A12 is formed in the region on the rear side of the front surface portion 26A1 as illustrated in FIG. 10. Therefore, by checking the side surface of the tape reel TR that is observed from the opening and checking positions of the tape reel TR and the film F that are observed from the hole 26A12, the alignment can be further easily performed.

Even when the tape TP is excessively pulled out, the user can directly rotate the tape reel TR reversely from the opening provided in the front surface portion 26A1.

Since the surface of the button 26B1 is exposed to the outside, even a user who is not accustomed to using the binding machine can easily understand the work for setting the tape reel TR.

The slit 26A21 extending in the radial direction is formed in the back surface portion 26A2 (FIG. 2). Therefore, it is possible to easily grasp a remaining tape amount of the tape reel TR. Further, information indicating the remaining tape amount may be printed in the vicinity of the slit 26A21. For example, on a surface of the back surface portion 26A2, "100%" may be printed in the vicinity of an outer diameter region of the slit 26A21, "10%" in the vicinity of an inner diameter region thereof, and "50%" in the vicinity of a region between the regions.

In the present embodiment, the shaft 26B2 is configured to press the rib R of the film F of the tape reel TR. Therefore, even for tape reels TR having different inner diameters of winding core C, by making the inner diameters of the films F uniform, the tape reels TR to which such a film F is attached can be held.

However, a tape reel to which the film is not attached can also be held. For example, the bottom surface portion 26B221 of the shaft 26B2 may be configured to press the side surface of the winding core C instead of the rib R of the film F. With such a configuration, a tape reel without a film can also be held. Further, by expanding a size of the bottom surface portion 26B221 in the radial direction, even a winding core having a different inner diameter can be pressed. The tape reel may be held by pressing an inner diameter surface of the winding core radially outward.

Note that the size of the opening formed in the circumferential portion 26A3 needs to be large enough to allow the tape reel TR to be accommodated in the inner region of the bobbin case 26A. Here, when a thickness of the tape reel TR (width of the tape TP) is set as TPW and the diameter of the tape reel TR before use is set as TRD, the opening needs to be formed so as to have a section including a rectangle in which a short side is TPW and a long side is TRD.

For example, in a case where the diameter TRD of the tape reel TR is set to be 100 mm for convenience and the inner region of the bobbin case 26A is formed to include a cylinder having a diameter of 150 mm, a vertex angle of an isosceles triangle, in which a length of each equal side is 75 mm and a base is 100 mm, is about 83 degrees. Accordingly, if the opening is formed such that an interior angle of a circular arc between one point 26A35 on the opening edge of the opening formed in the circumferential portion 26A3 and one point 26A32 on another opening edge is larger than 83 degrees with the axis AX serving as a center, the two opening edges sandwiching the opening, the tape reel TR can be accommodated. In order to have a margin, it is preferable to form the opening such that the interior angle thereof is larger than 90 degrees. The inner region of the bobbin case 26A is preferably slightly larger than the tape reel TR before use. For example, in a case where the inner region of the bobbin case 26A is formed to include a cylinder having a diameter of 120 mm, a vertex angle of an isosceles triangle, in which a length of each equal side is 60 mm and a base is 100 mm, is about 112 degrees. Accordingly, if the opening is formed such that an interior angle of a circular arc between one point 26A35 on the opening edge of the opening formed in the circumferential portion 26A3 and one point 26A32 on another opening edge is larger than 112 degrees with the axis AX serving as a center, the two opening edges sandwiching the opening, the tape reel TR can be accommodated.

In other words, if the inner region of the bobbin case 26A is formed to include a cylinder having a diameter of 140 mm and the opening is formed such that the interior angle (an interior angle of a circular arc between one point 26A35 on the opening edge and one point 26A32 on another opening edge with the axis AX serving as a center, the two opening edges sandwiching the opening) is 90 degrees or more and 180 degrees or less, a tape reel TR having a diameter of about 100 mm or less can be accommodated theoretically.

By forming an opening in the circumferential portion 26A3 in this manner and moving the tape reel TR in a direction perpendicular to the axis AX of the bobbin case 26A, the tape reel TR can be accommodated in the inner region of the bobbin case 26A from the opening formed in the circumferential portion 26A3. When the opening is formed in this manner, the tape reel TR can be accommodated in the inner region of the bobbin case 26A without necessarily forming an opening in the front surface portion 26A1. However, as described in the present embodiment, an opening communicating with the opening of the circumferential portion 26A3 may be formed in the front surface portion 26A1.

[Hook Mechanism]

Figure 13:
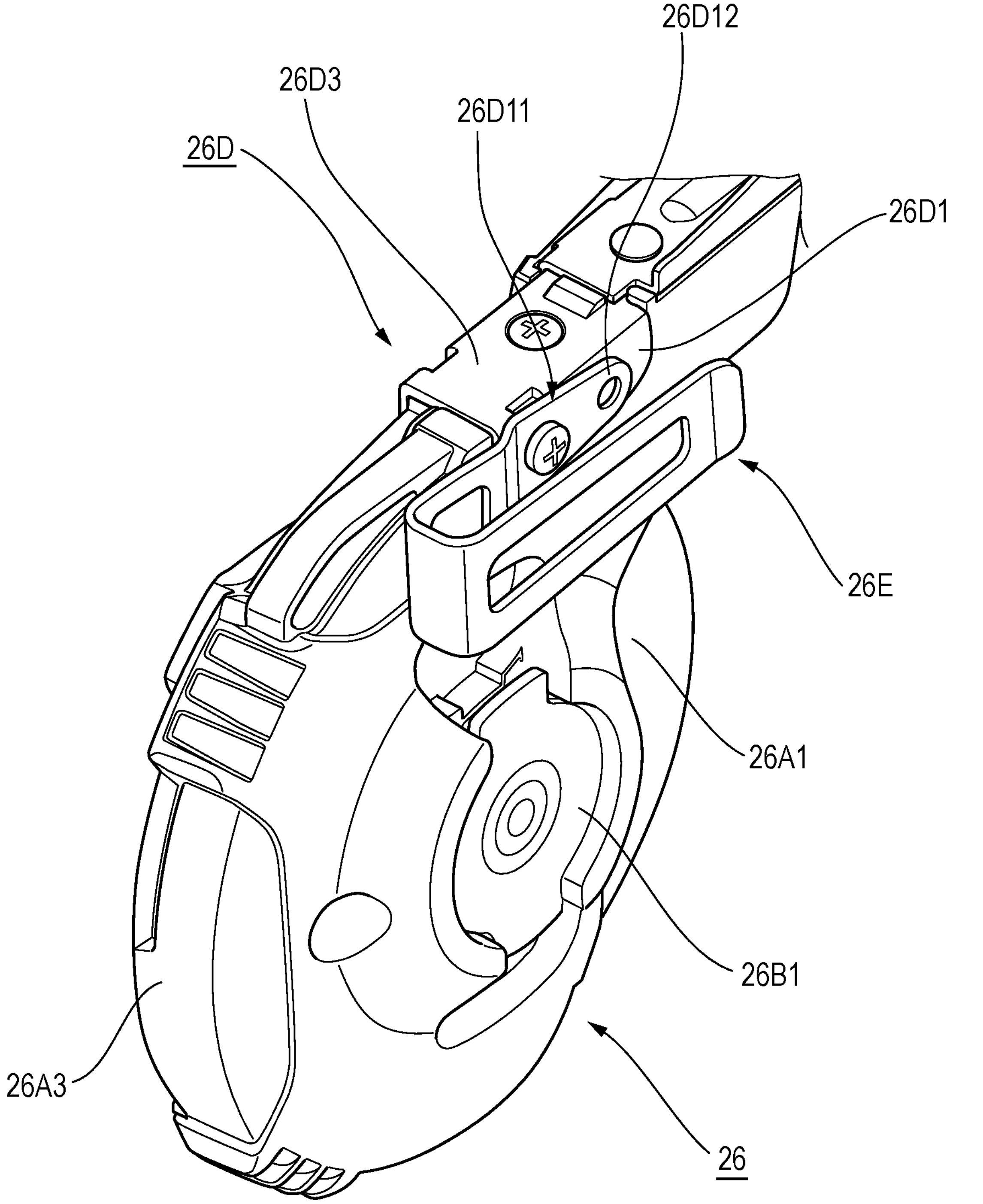
FIG. 13 is a perspective view of the binding machine including a hook attaching tool and a hook.

The tape magazine unit 26 of the binding machine 10 may include a hook attaching tool 26D to which a hook 26E for suspending and storing the binding machine 10 is attached. FIG. 13 is a perspective view of the binding machine 10 including the hook attaching tool 26D. As illustrated in FIGS. 1, 2, 10, and 13, the hook attaching tool 26D includes a first attachment portion 26D1 provided on the front surface portion 26A1 including one side surface of the bobbin case 26A facing the axis AX direction, a second attachment portion 26D2 provided on the back surface portion 26A2 including the other side surface of the bobbin case 26A facing the axis AX direction, and a connection portion 26D3 attached to a portion facing upward of the circumferential portion 26A3. The first attachment portion 26D1 and the second attachment portion 26D2 have a plate shape, and are connected substantially at right angles to the connection portion 26D3 having a plate shape. In the present embodiment, the first attachment portion 26D1 and the second attachment portion 26D2 have the same structure. The first attachment portion 26D1 and the second attachment portion 26D2 are plane-symmetrically formed with respect to a plane passing between the first attachment portion 26D1 and the second attachment portion 26D2. The connection portion 26D3 and the circumferential portion 26A3 may be integrally provided. The first attachment portion 26D1 and the front surface portion 26A1 may be integrally provided, and the second attachment portion 26D2 and the back surface portion 26A2 may be integrally provided.

The first attachment portion 26D1 is formed with a dowel 26D11 (an example of a "first protrusion") and a hole 26D12 (an example of a "first recess"). The dowel 26D11 is a protrusion that can be used for positioning. The second attachment portion 26D2 is formed with a dowel 26D21 (an example of a "second protrusion") having the same structure as the dowel 26D11 and a hole 26D22 (an example of a "second recess") having the same structure as the hole 26D12.

The hook attaching tool 26D is fixed to the circumferential portion 26A3 by a bolt passing through a hole formed in the connection portion 26D3. However, the hook attaching tool 26D may be attached to the main handle 20.

According to the binding machine 10 of the present embodiment, the hook 26E in which a through-hole (or recess) engaging with the dowel 26D11 and a through-hole corresponding to the hole 26D12 are formed can be attached to the first attachment portion 26D1. For example, the hook 26E is positioned by passing the dowel 26D11 through one through-hole of the hook 26E, and the hook 26E is fixed by screwing a screw into a screw hole communicating with the hole 26D12 via the other through-hole of the hook 26E (FIGS. 10 and 13), whereby the hook 26E can be attached to the binding machine 10 at a predetermined position and at a predetermined angle. Since the second attachment portion 26D2 has the same structure as the first attachment portion 26D1, it is also possible to attach the hook 26E to the second attachment portion 26D2 (FIG. 2). Further, the hook 26E is formed to be plane-symmetrical with respect to a plane passing through centers of the two through-holes used for attachment. Therefore, both in a case of being attached to the first attachment portion 26D1 and in a case of being attached to the second attachment portion 26D2, the hook 26E can take the same posture in an upper-lower direction.

As described above, since the bobbin case 26A according to the present embodiment does not have a lid that opens and closes for accommodating the tape reel TR, it is possible to attach the hook 26E to any one of the front surface portion 26A1 and the back surface portion 26A2. Therefore, it is possible to provide a binding machine 10 of higher convenience.

[Brake Unit]

Figure 14:
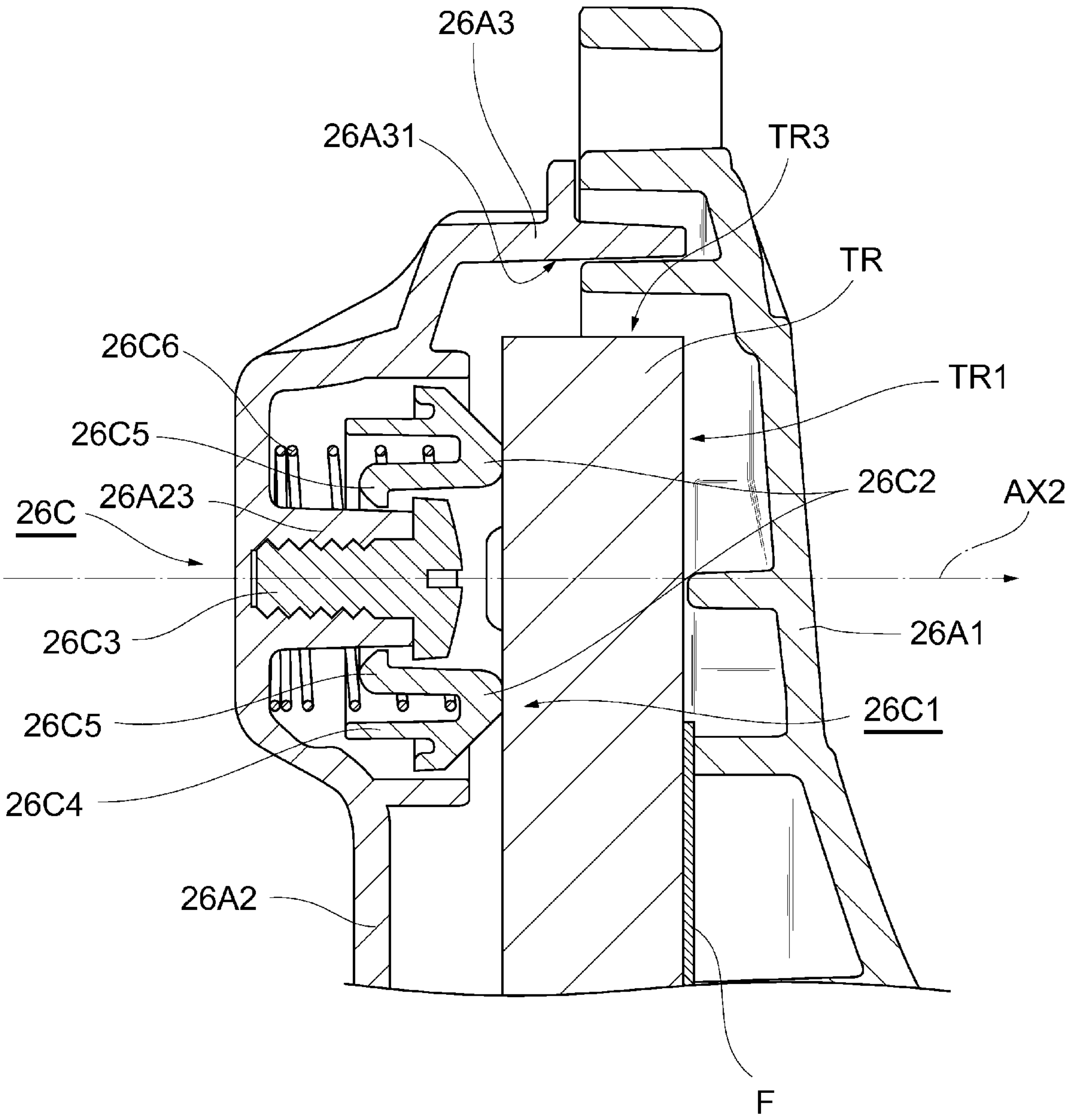
FIG. 14 is a cross-sectional view of a main part of a brake unit.
Figure 15:
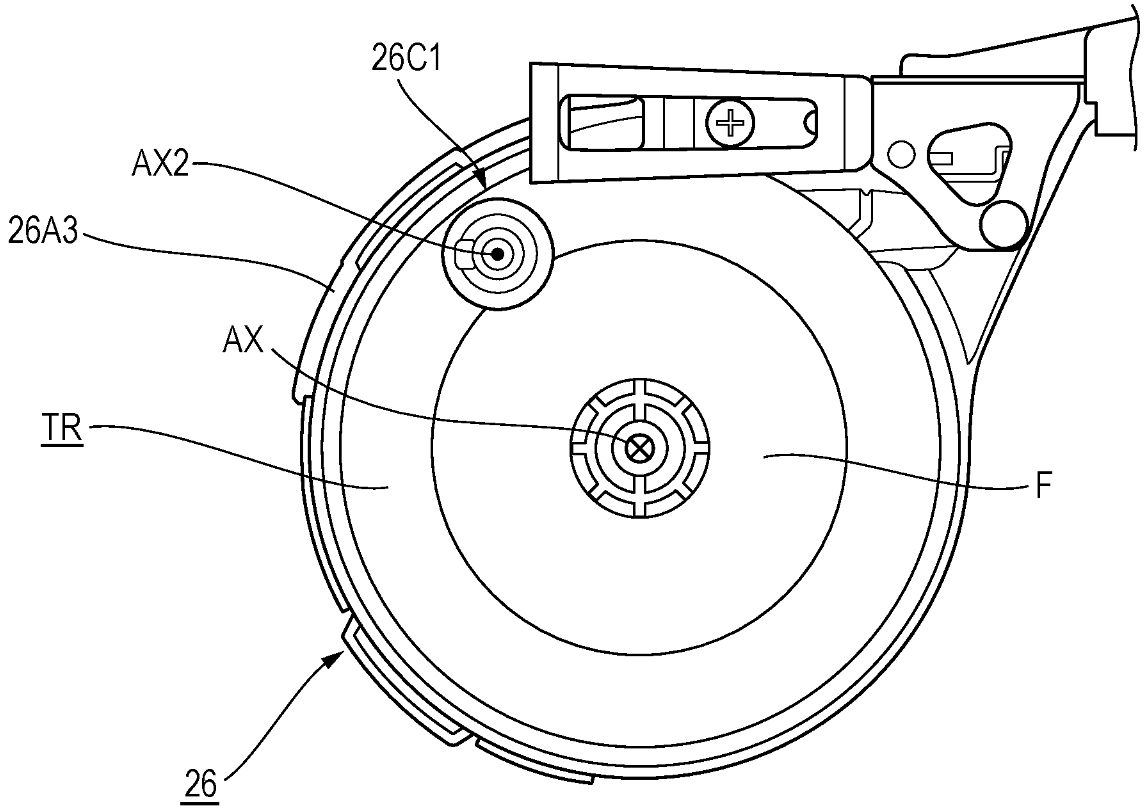
FIG. 15 is a perspective view of the tape magazine unit showing a brake pad.

Hereinafter, a brake unit 26C (an example of a "second protrusion") that can be mounted on the tape magazine unit 26 will be described. FIG. 14 is a cross-sectional view of a main part of the tape magazine unit 26 along a cross section passing through an axis AX2 that is a center of the brake unit 26C. FIG. 15 is a perspective view of the tape magazine unit 26 illustrating a brake pad 26C1 (an example of an "abutting member") of the brake unit 26C in FIG. 1.

As illustrated in FIG. 14, the brake unit 26C is attached to the back surface portion 26A2. The brake unit 26C includes the brake pad 26C1 that presses the side surface of the tape reel TR in the axis AX direction, a compression spring 26C6 (an example of an "elastic member") that applies a biasing force to press the side surface of the tape reel TR to the brake pad 26C1, and a male screw 26C3 that prevents the brake pad 26C1 from coming off the back surface portion 26A2.

The brake pad 26C1 is preferably made of a material having elasticity and wear resistance, and can be made of, for example, polyamide (PA), propylene (PP), or polyacetal (POM). The brake pad 26C1 is formed axially symmetrical with respect to the axis AX2. The brake pad 26C1 has a protrusion 26C2 that protrudes in an axis AX2 direction. As illustrated in FIG. 15, the protrusion 26C2 is formed in a circular shape as viewed from the axis AX2 direction. Further, the brake pad 26C1 includes an inner wall portion 26C5 that is connected to an inner diameter side of the protrusion 26C2 and that extends in a direction of retracting from the protrusion 26C2 in the axis AX2 direction, and an outer wall portion 26C4 that is connected to an outer diameter side of the protrusion 26C2 and that extends in a direction of retracting from the protrusion 26C2 in the axis AX2 direction. A region surrounded by the protrusion 26C2, the inner wall portion 26C5, and the outer wall portion 26C4 forms a cylindrical portion or space. As illustrated in FIG. 14, an end portion of the inner wall portion 26C5 is bent in an inner diameter direction toward the axis AX2.

The back surface portion 26A2 is provided with a support portion 26A23 for attaching the brake pad 26C1. The support portion 26A23 is formed in a cylindrical shape with the axis AX2 as an axis. By disposing the brake pad 26C1 such that the end portion of the inner wall portion 26C5 of the brake pad 26C1 abuts a cylindrical surface of the support portion 26A23, the brake pad 26C1 can be provided at a desired position.

The compression spring 26C6 presses the brake pad 26C1 from the back surface portion 26A2 to the front surface portion 26A1. The compression spring 26C6 is inserted into a cylindrical portion or space surrounded by the inner wall portion 26C5 and the outer wall portion 26C4. Therefore, the compression spring 26C6 can press a portion close to the protrusion 26C2. Further, the brake pad 26C1 can be pressed in a direction substantially parallel to the axis AX2 direction.

A female screw with the axis AX2 as an axis is formed in the support portion 26A23 formed in a cylindrical shape. The male screw 26C3 is screwed with the female screw. A head portion of the male screw 26C3 protrudes from the support portion 26A23. Since the end portion of the inner wall portion 26C5 of the brake pad 26C1 is caught by the protruding portion, it is possible to prevent the brake pad 26C1 from coming off the back surface portion 26A2. Since the brake pad 26C1 presses the side surface of the tape reel TR that is to be rotated, the brake pad 26C1 may be twisted or inclined with the rotation of the tape reel TR, but by providing the configuration described above, the brake pad 26C1 can be prevented from coming off from the back surface portion 26A2. Further, each side surface of the tape reel TR is not necessarily formed flat, and may have fine irregularities. However, by forming the brake pad 26C1 with an elastic material, it is possible to elastically press the side surface of the tape reel TR even when the side surface has irregularities.

As illustrated in FIG. 15, in the present embodiment, the protrusion 26C2 of the brake pad 26C1 is provided so as to be located in the outer peripheral region of the side surface of the tape reel TR. The protrusion 26C2 of the brake pad 26C1 is provided so as to be located in the outer diameter region of the film F.

According to the binding machine 10 including the brake unit 26C as described above, the brake pad 26C1 comes into contact with the side surface of the tape reel TR. Therefore, with a frictional force, the tape reel TR can be prevented from excessively rotating.

Further, since the brake pad 26C1 is elastically pressed against the side surface of the tape reel TR, even when the side surface has irregularities, braking can be applied with the frictional force by pressing the brake pad 26C1 against the side surface of the tape reel TR.

The brake unit 26C is provided so as to be movable back and forth in the axis AX2 direction by the compression spring 26C6. Therefore, the brake unit 26C does not hinder the mounting of the tape reel TR. Further, even when a distance between the side surface of the tape reel TR and the brake pad 26C1 changes to some extent along with the rotation of the tape reel TR, it is possible to apply the braking with the frictional force by pressing the brake pad 26C1 against the side surface of the tape reel TR.

Further, a vertical load with little variation can be applied by employing the compression spring 26C6, and thus the braking can be stabilized.

Further, since the brake pad 26C1 presses the outer peripheral region of the side surface of the tape reel TR, the tape TP that is excessively pulled out due to a large remaining tape amount can be prevented from bursting out of the tape magazine unit 26. When the remaining tape amount is small, the tape TP exists only in the inner peripheral region. Therefore, the brake pad 26C1 does not press the side surface of the tape reel TR. However, when the remaining tape amount is small, the tape TP excessively pulled out in the first place is less likely to burst out of the tape magazine unit 26. In addition, since the film F is attached to the other side surface of the tape reel TR, with the film F, the tape TP can be prevented from being excessively pulled out. However, a tape reel that does not have the film F can be applied to the present invention. Further, the brake pad may be configured to press the inner peripheral side region of the side surface of the tape reel TR.

In the present embodiment, a configuration in which the brake unit 26C is configured with the brake pad 26C1 and the compression spring 26C6 is illustrated as an example of the second protrusion, but the present invention is not limited to this combination. For example, the compression spring 26C6 may be eliminated and the brake pad 26C1 may abut the side surface of the tape reel TR by own elasticity, or the brake pad 26C1 itself may also serve as the abutting member and the elastic member.

Further, by providing the brake pad 26C1, fluctuation of pull-out resistance of the tape TP can be prevented. That is, when the remaining tape amount is large, a distance between the axis AX as a rotation center of the tape reel TR and the tape TP pulled out is large and the moment is large, and thus the pull-out resistance is relatively small. On the other hand, when the remaining tape amount is small, the distance between the axis AX, which is the rotation center of the tape reel TR, and the tape TP pulled out is small and the moment is small, and thus the pull-out resistance is relatively large. As described in the present embodiment, by providing a member for pressing the outer peripheral region (or a position in the inner peripheral region near the outer peripheral region) of the side surface of the tape reel TR, it is possible to increase the pull-out resistance at the time of pulling out the tape TP on the outer diameter side of the pressed position. Therefore, a variation amount with the pull-out resistance at the time the tape TP on the inner diameter side of the pressed position is pulled out can be prevented. As a result, workload of the user can be reduced. Further, since the fluctuation of the pull-out resistance is reduced, the degree of freedom in designing the binding machine is also improved.

[Operation Handle]

Figure 16:
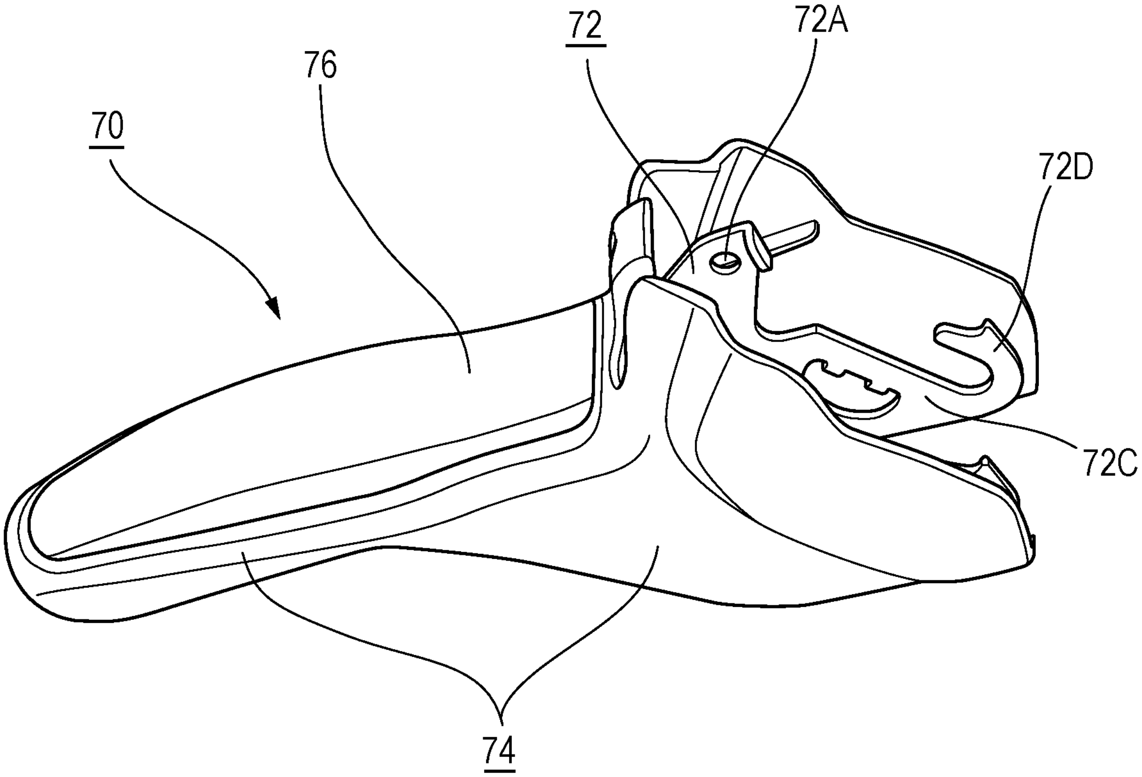
FIG. 16 is a perspective view of an operation handle.
Figure 17:
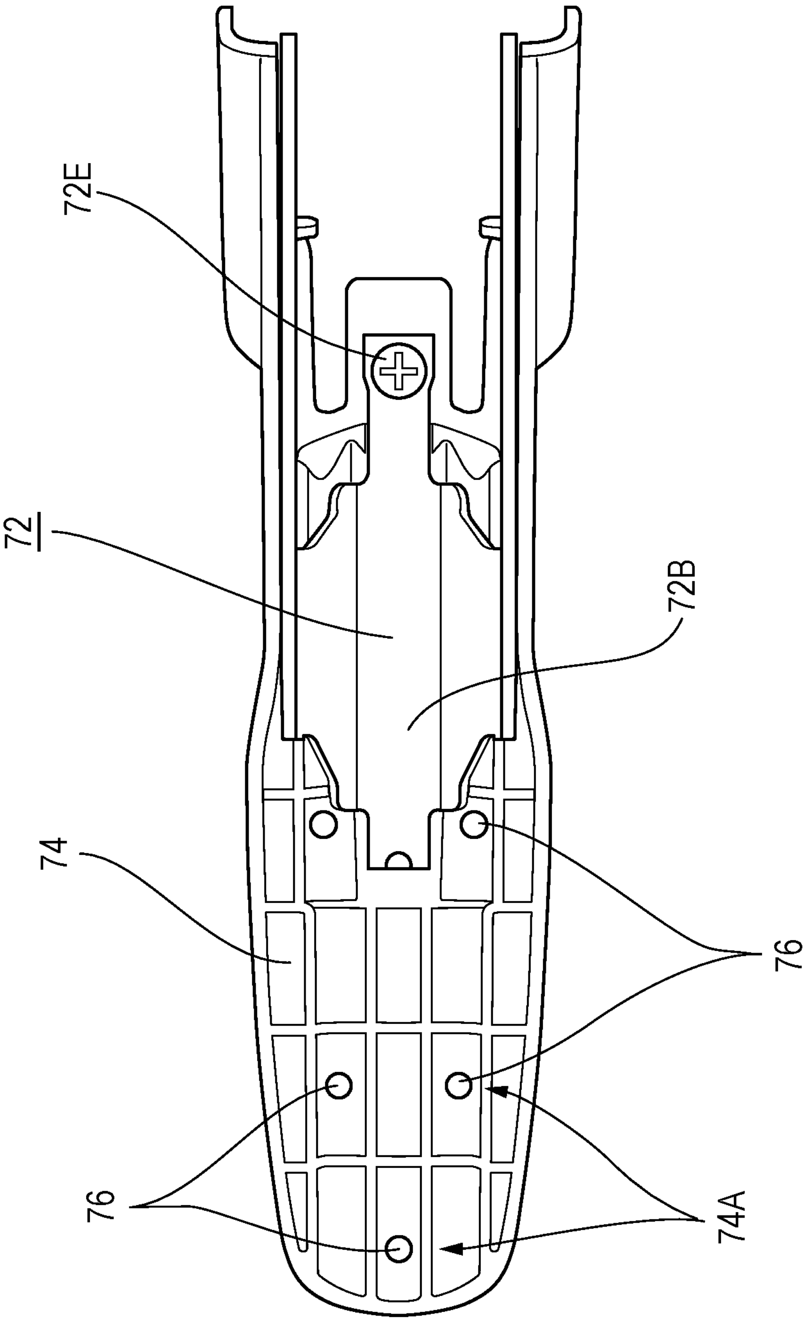
FIG. 17 is a bottom view of the operation handle as viewed from a side on which a metal handle is provided.

Hereinafter, the operation handle 70 mounted on the binding machine 10 will be described. FIG. 16 is a perspective view of the operation handle 70. FIG. 17 is a bottom view of the operation handle 70 as viewed from a side on which metal handle 72 is provided. As illustrated in these drawings, the operation handle 70 includes the handle 72 made of metal, a first grip cover 74 (an example of a "first cover") that is provided to cover an upper surface and side surfaces of the handle 72, and a second grip cover 76 (an example of a "second cover") that is provided to cover an upper surface of the first grip cover 74.

The handle 72 is a member that rotates the clincher arm 50 closer in the closing direction of approaching the main handle 20, based on a principle of leverage using a rotation shaft portion 72A pivotally supported by the shaft portion 70A of the clincher arm 50 as a fulcrum, a lever portion 72B as a force application point, and a link portion 72C as an action point on the main handle 20. The handle 72 is formed by performing press working on a sheet metal, for example.

The handle 72 is rotatably attached to the clincher arm 50 via a shaft that is inserted into a through-hole formed in the handle 72 and a through-hole formed in the clincher arm 50.

The link portion 72C extends from the rotation shaft portion 72A pivotally supported by the shaft portion 70A of the clincher arm 50 toward the main handle 20, and engages with the main handle 20 at an end portion. A hook 72D provided at a tip of the link portion 72C is a portion that engages with a shaft provided on the main handle 20 in the standby state. When the lever portion 72B is rotated to approach the main handle 20 by being pressed by the user, the rotation shaft portion 72A moves to approach the main handle 20. Accordingly the engagement between the hook 72D and the shaft provided on the main handle 20 is released, and the shaft provided on the main handle 20 relatively moves on an end surface of the link portion 72C while rotating.

The lever portion 72B (FIGS. 3 and 17) is a member that is pressed by being gripped by the user. The lever portion 72B can be formed, for example, by being subjected to press working integrally with the link portion. The lever portion 72B is formed to extend toward a side opposite to the link portion 72C with respect to the rotation shaft portion 72A pivotally supported by the shaft portion 70A of the clincher arm 50.

As illustrated in FIG. 16, the first grip cover 74 is a member that covers the side surfaces and the upper surface of the handle 72. A female screw is formed in the first grip cover 74. As illustrated in FIG. 17, the first grip cover 74 and the handle 72 are connected by a male screw 72E that passes through a through-hole formed in the handle 72 and that is screwed with the female screw formed in the first grip cover 74. The first grip cover 74 can be made of, for example, a resin having a large elastic modulus and excellent rigidity such as a glass fiber reinforced resin (GF). The GF further has excellent mechanical strength, hardness, and toughness. Since the first grip cover 74 is made of a resin having a large elastic modulus and excellent rigidity, the first grip cover 74 extends not only to the upper surface of the handle 72 but also to the rear where the handle 72 is not provided, as illustrated in FIG. 17. By forming the first grip cover 74 to be longer than the metal handle 72 in this manner, a distance between the rotation shaft portion 72A serving as a fulcrum and the force application point can be increased, and thus burden on the user can be reduced. As illustrated in FIG. 17, the first grip cover 74 is formed with a plurality of through-holes 74A penetrating from a front surface where the second grip cover 76 is provided to a back surface where the handle 72 is provided. As illustrated in a cross-sectional view in FIG. 18, each through-hole 74A is formed in a tapered shape so as to expand from a front surface where the second grip cover 76 is provided toward a back surface where the handle 72 is provided. The first grip cover 74 may be made of a resin such as nylon or polypropylene.

Figure 18:
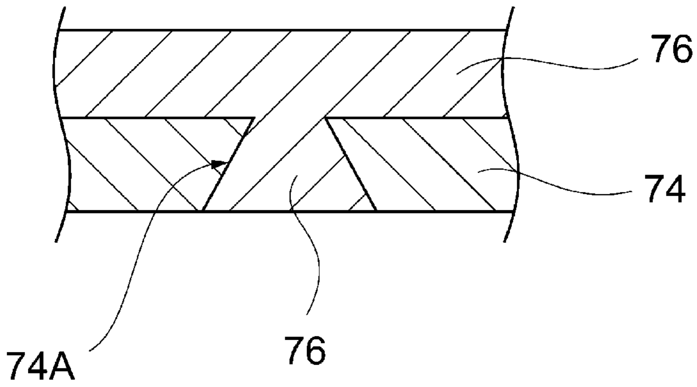
FIG. 18 is a cross-sectional view taken across a through-hole of a first grip cover.

The second grip cover 76 is a member provided in a portion directly pressed by the thumb or thenar eminence of the user when the user grips the operation handle 70 to perform the binding operation. Specifically, the second grip cover 76 is formed to cover the upper surface of the first grip cover 74 including a region where the plurality of through-holes 74 A are formed, of the front surface of the first grip cover 74. The second grip cover 76 is made of an elastomer resin, preferably a thermoplastic elastomer resin suitable for injection molding. The elastomer resin is a generic term for polymers having elasticity, and includes, for example, polyvinyl chloride, polyurethane, polystyrene, and nitrile rubber. The second grip cover 76 is made of a material having a smaller elastic modulus and a larger friction coefficient than that of the first grip cover 74. The first grip cover 74 and the second grip cover 76 are chemically bonded to each other by double layer molding, which will be described later. As illustrated in FIG. 18, the elastomer resin constituting the second grip cover 76 is filled in the through-hole 74A. Therefore, as illustrated in FIG. 17, a part of the second grip cover 76 is exposed to the back surface side of the first grip cover 74.

The operation handle 70 can be manufactured as follows.

First, the handle 72 can be formed by performing press working and heat treatment on a sheet metal, and thereafter performing anti-corrosion treatment thereon.

On the other hand, with the double layer molding method, firstly the first grip cover 74 is formed by injection molding, and thereafter the second grip cover 76 is formed by injection molding, so that the first grip cover 74 and the second grip cover 76 can be chemically bonded to each other. Further, the elastomer resin constituting the second grip cover 76 can be filled in the through-hole 74A of the first grip cover 74.

Finally, by screwing the handle 72 and the first grip cover 74 with the male screw 72E, both of the handle 72 and the first grip cover 74 can be fixed and the operation handle 70 can be manufactured. Here, a boss formed in accordance with a shape of the male screw 72E is provided in advance in the first grip cover 74. Therefore, the first grip cover 74 and the handle 72 can be coupled by engaging the male screw 72E with the boss of the first grip cover 74.

According to the binding machine 10 including the operation handle 70 as described above, since the friction coefficient of the second grip cover 76 to be directly pressed by the user is larger than the friction coefficient of the first grip cover 74, slipping from the operation handle 70 can be prevented. In addition, since the metal handle 72 is covered with the first grip cover 74, which has a large elastic modulus and is hard, durability and a degree of freedom in shape of the operation handle 70 can be improved. In addition, it is possible to prevent the handle 72 from damaging the second grip cover 76.

Since the first grip cover 74 and the second grip cover 76 are chemically bonded, deflection and displacement at boundary surfaces thereof can be prevented. Further, since the elastomer resin constituting the second grip cover 76 is filled in the through-hole 74A of the first grip cover 74, the second grip cover 76 is less likely to come off from the first grip cover 74. In particular, since the through-hole 74A is formed in a tapered shape expanding toward the back surface, a configuration that is even less likely to come off can be implemented.

[Modification of Operation Handle]

Figure 19:
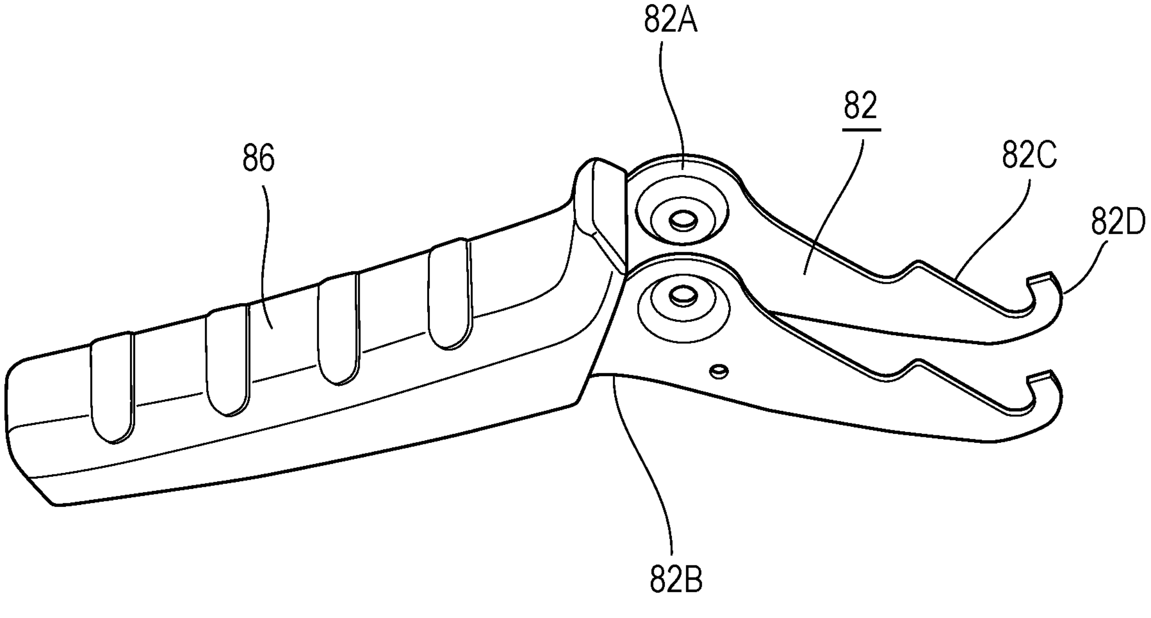
FIG. 19 is a perspective view of an operation handle.
Figure 20:
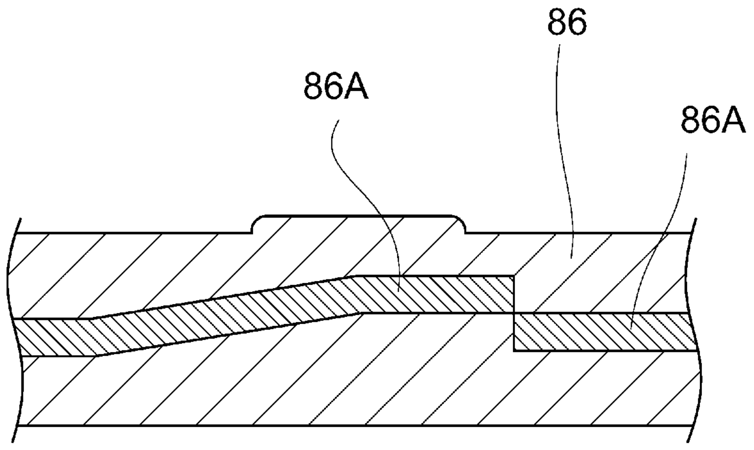
FIG. 20 is a cross-sectional view of an insertion portion of a lever portion of a grip cover.

FIG. 19 is a perspective view of an operation handle 80 according to a modification of the operation handle 70. FIG. 20 is a cross-sectional view of a grip cover 86 cut at a portion into which a lever portion 82B of a handle 82 is inserted.

The handle 82 includes a rotation shaft portion 82A, a lever portion 82B to be pressed by the user via the grip cover 86, and a link portion 82C that extends from the rotation shaft portion 82A toward the main handle 20 and that engages with the main handle 20. The link portion 82C is provided with a hook 82D at a tip thereof. Functions and configurations of the rotation shaft portion 82A, the lever portion 82B, the link portion 82C, and the hook 82D are the same as those of the rotation shaft portion 72A, the lever portion 72B, the link portion 72C, and the hook 72D, and a detailed description thereof will be omitted.

The grip cover 86 is formed of an elastomer resin having high hardness. The hardness of the elastomer resin of the grip cover 86 is, for example, 90 or more on a Shore A scale. Therefore, the elastomer resin has a high hardness among a general rubber category. By utilizing the elastomer resin having such a high hardness and a large friction coefficient for the grip cover 86, a binding machine including the grip cover 86, which maintains the degree of freedom in shape and is less likely to allow slipping to happen, can be provided.

As illustrated in FIG. 20, a hole 86A for forcibly inserting the lever portion 82B is formed inside the grip cover 86. However, as illustrated in FIG. 20, an inner wall surface of the hole 86 A may not be formed to be smoothly continuous. A cross-sectional shape of the hole 86A may be different from a cross-sectional shape of the lever portion 82B. Even such a hole 86A can be deformed in accordance with a shape of the lever portion 82B since an elastic modulus of the elastomer resin is small. Further, since a large elastic force is generated due to the deformation, the grip cover 86 and the lever portion 82B can be connected so as not to be easily detached from each other.

With the configuration described above, a binding machine including the operation handle 80, which has high durability and is less likely to allow slipping to happen, can be provided.

[Other Embodiments of Tape Magazine Unit]

Figure 21A:
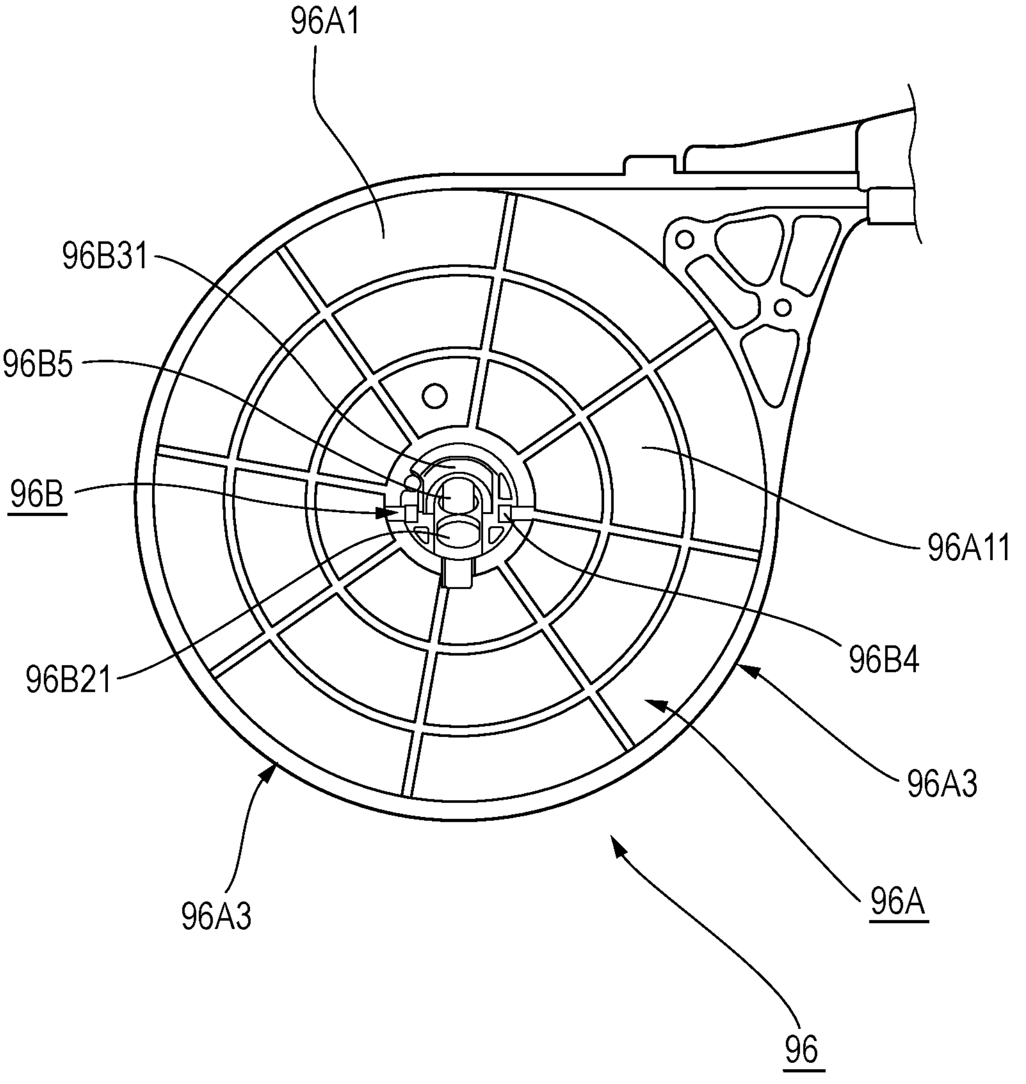
FIG. 21A is a side view of a tape magazine unit as viewed from a direction facing one side surface thereof.
Figure 21B:
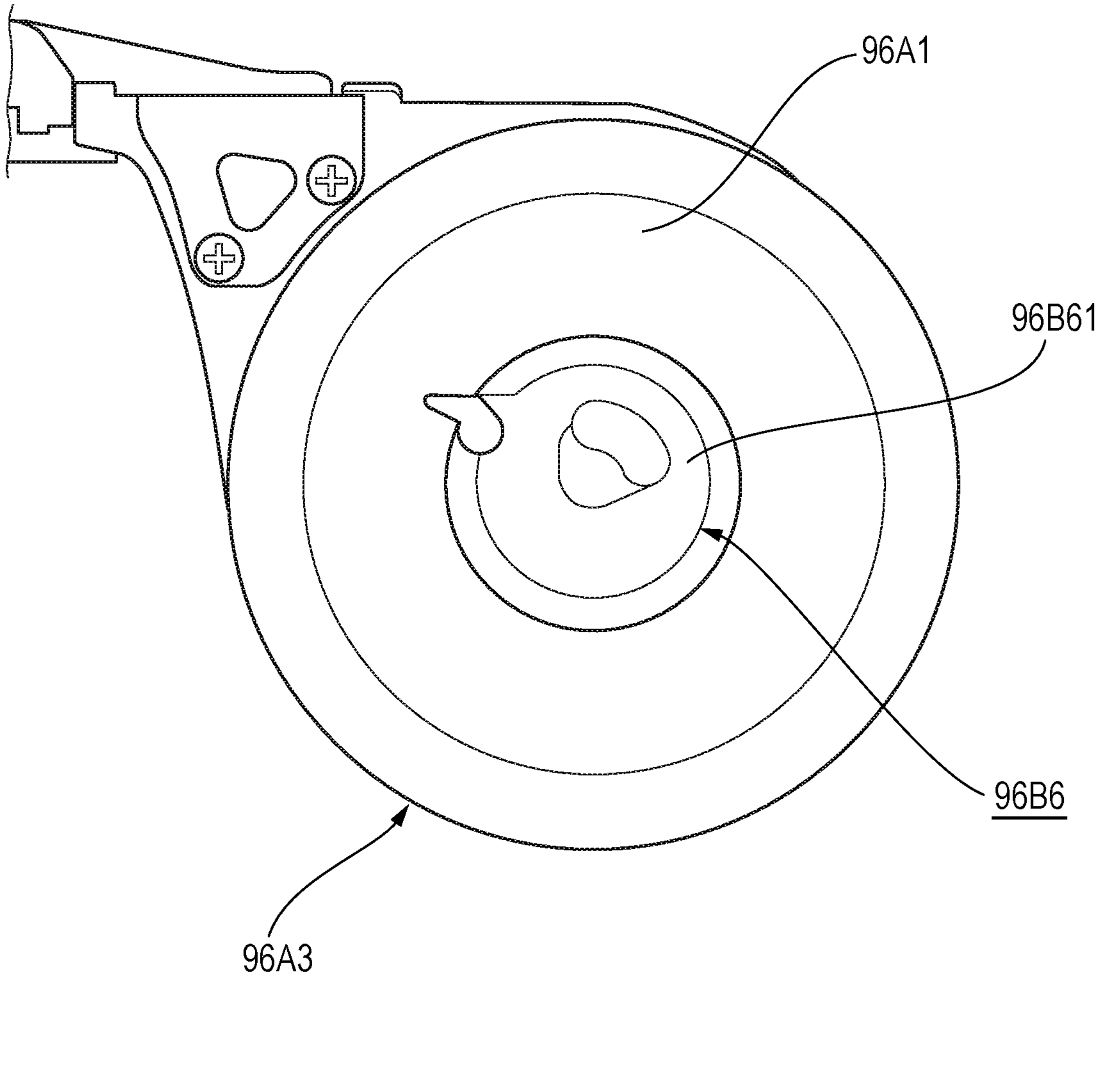
FIG. 21B is a side view of the tape magazine unit 96 as viewed from a direction facing another side surface thereof.

FIG. 21A is an enlarged view of a main part of a tape magazine unit 96 in a right side view of a binding machine according to another embodiment. FIG. 21B is an enlarged view of the same main part in a left side view. FIGS. 22A to 22D are cross-sectional views of a bobbin case 96A of a tape magazine unit 96 taken along a cross section passing through an axis AX3 of the bobbin case 96A. Since the tape magazine unit 96 can be attached to various binding machines including the binding machine 10, a description thereof will be omitted.

The tape magazine unit 96 includes the bobbin case 96A and a holding unit 96B that holds the tape reel TR.

The bobbin case 96A includes a front surface portion 96A1 and a circumferential portion 96A3. However, differently from the bobbin case 26A, the bobbin case 96A is not provided with a configuration corresponding to the back surface portion 26A2. In addition, differently from the circumferential portion 26A3, the circumferential portion 96A3 is formed with no opening, and is formed over the entire circumference.

Therefore, an opening surrounded by the circumferential portion 96A3 is formed on one side surface of the bobbin case 96A, and a wall surface 96A11 of the front surface portion 96A1 is exposed to the outside. Therefore, by moving the tape reel TR in a direction parallel to the axis AX3 of the bobbin case 96A, the tape reel TR can be accommodated in the bobbin case 96A.

The holding unit 96B has a function of holding the tape reel TR. The holding unit 96B includes a first shaft 96B2 and a second shaft 96B3 that engage with the tape reel TR, a rotation shaft 96B4 that rotatably holds the first shaft 96B2, a first compression spring 96B5 that presses the first shaft 96B2 and the second shaft 96B3 in a direction perpendicular to the axis AX3, and a lock portion 96B6.

The holding unit 96B is provided so as to protrude from the wall surface 96A11 toward the opening at a central portion of the front surface portion 96A1.

The first shaft 96B2 engages with an end portion of the rib R of the film F to hold the tape reel TR. The first shaft 96B2 includes a tapered inclined surface 96B21 that is tapered toward the opening. The inclined surface 96B21 is formed so as to have a circular arc with the axis AX3 as a center in a cross section perpendicular to the axis AX3. Therefore, by bringing the inclined surface 96B21 into contact with a tip of the rib R of the film F, the center of the tape reel TR can be aligned with a center of the bobbin case 96A. An engaging portion 96B22 engages with the film F to hold the tape reel TR. The engaging portion 96B22 is a groove extending in a circumferential direction about the axis AX3. An inner diameter of the engaging portion 96B22 is smaller than an outer diameter of a thickest end portion of the inclined surface 96B21. Therefore, the rib R of the film F sliding over the inclined surface 96B21 is suitably held by the engaging portion 96B22. A groove width of the engaging portion 96B22 in an axis AX3 direction is preferably slightly larger than the thickness of the film F, and the inner diameter of the engaging portion 96B22 is preferably slightly smaller than the inner diameter of the film F. With such a configuration, movement of the tape reel TR in the axis AX3 direction and movement in the direction perpendicular to the axis AX3 can be regulated. The first shaft 96B2 is rotatably held by the rotation shaft 96B4 perpendicular to the axis AX3. Therefore, a tip of the first shaft 96B2 pressed by the rib R of the film F can be swung to move in a direction of approaching the axis AX3. Therefore, the tape reel TR is easy to attach and difficult to remove.

Figure 22A:
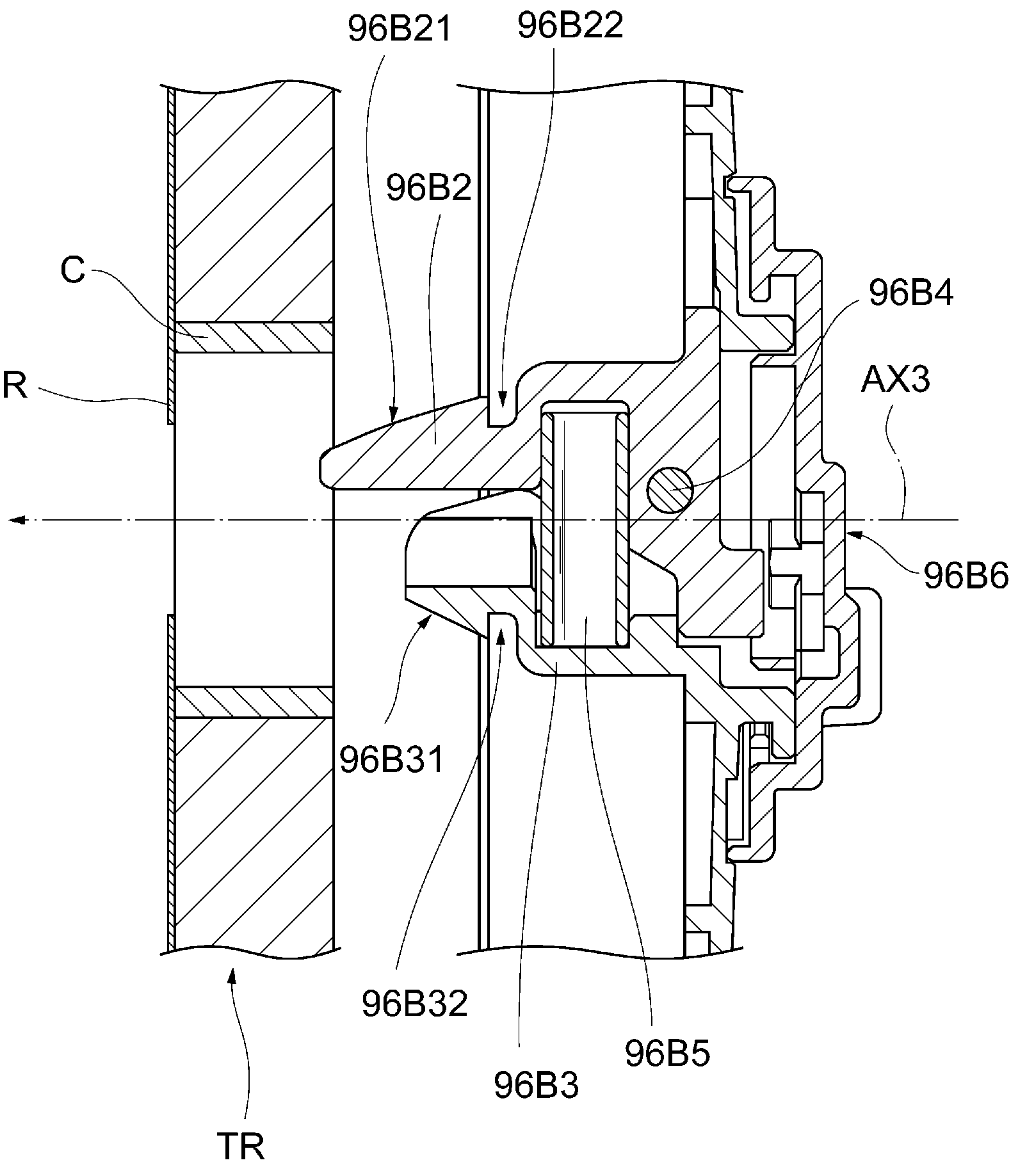
FIG. 22A is a cross-sectional view of a main part of the tape magazine unit at the time of mounting the tape reel.

The second shaft 96B3 engages with an end portion of the rib R opposite the first shaft 96B2 to hold the tape reel TR. Similarly to the inclined surface 96B21, the second shaft 96B3 is tapered toward the opening, and includes an inclined surface 96B31 having a circular arc with the axis AX3 as a center in a cross section perpendicular to the axis AX3. An engaging portion 96B32 having the same configuration as the engaging portion 96B22 is provided. However, a protrusion amount of the second shaft 96B3 in the axis AX3 direction is smaller than that of the first shaft 96B2. Therefore, the film F first comes into contact with the inclined surface 96B21 of the first shaft 96B2. Unlike the first shaft 96B2, the second shaft 96B3 is fixed to the front surface portion 96A1 and does not rotate. As illustrated in FIG. 22A and the like, the second shaft 96B3 is formed integrally with the front surface portion 96A1. Therefore, by providing the second shaft 96B3 and the first shaft 96B2 to be in contact with the second shaft 96B3, it is possible to accurately dispose the two shafts with respect to the axis AX3.

The first compression spring 96B5 is inserted between the first shaft 96B2 and the second shaft 96B3, and presses and supports the first shaft 96B2 in a direction perpendicular to the axis AX3 and the rotation shaft 96B4.

The lock portion 96B6 is a member that regulates the rotation of the first shaft 96B2. The lock portion 96B6 is exposed on an outer side surface of the front surface portion 96A1, and includes a lock lever 96B61 that is held on the front surface portion 96A1 so as to be rotatable about the axis AX3, and a steel ball 96B62 and a second compression spring 96B63 for notifying the user that a locked state is established. The lock lever 96B61 is provided with a stopper surface 96B64 that is in close proximity to and faces an end surface of the first shaft 96B2 in the locked state.

A procedure for amounting the tape reel TR to the tape magazine unit 96 described above will be described below.

First, as illustrated in FIG. 22A, the holding unit 96B is brought close to the hole of the film F of the tape reel TR. Here, differently from the first embodiment, the tape reel TR is mounted such that the side surface of the tape reel TR on which the film F is not provided is in close proximity to and face the wall surface 96A11 of the front surface portion 96A1.

Accordingly, the first shaft 96B2 enters the region in the winding core C.

Figure 22B:
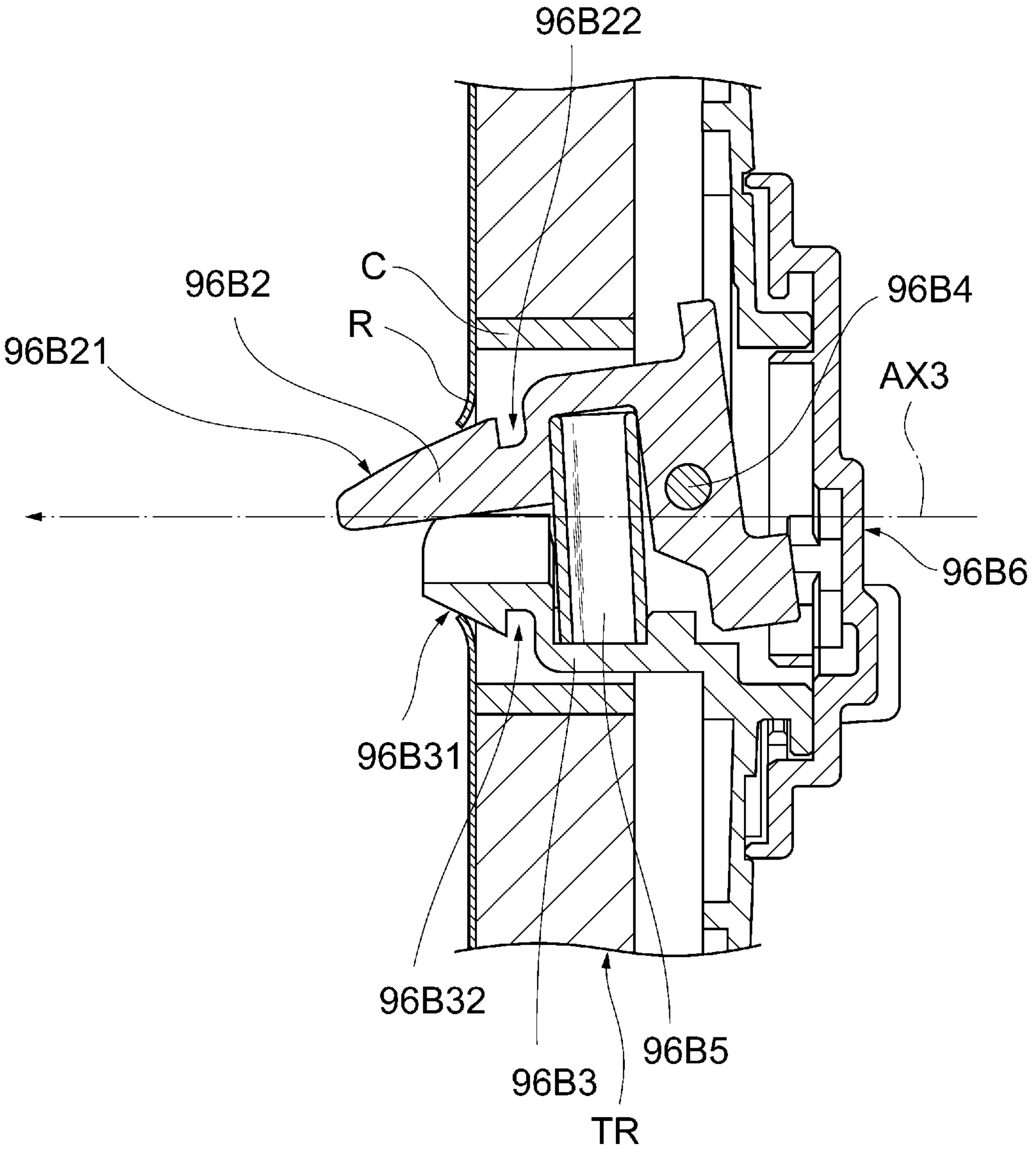
FIG. 22B is a cross-sectional view of a main part for illustrating a state where a rib of the film abuts an inclined surface and an inclined surface.

Next, as illustrated in FIG. 22B, the end portion of the rib R of the film F abuts the inclined surface 96B21 of the first shaft 96B2. Since the rib R of the film F is provided to have a free end, the tip is elastically deformed outward. The first shaft 96B2 is pressed by the rib R, and thus swings about the rotation shaft 96B4. Thereafter, the other end portion of the rib R abuts the inclined surface 96B31 of the second shaft 96B3, and is similarly elastically deformed outward. At this time, the tape reel TR is aligned by abutting the first shaft 96B2 first. Accordingly, even when abutting the second shaft 96B3 that is fixed, the rib R can be prevented from being deformed unnecessarily.

Figure 22C:
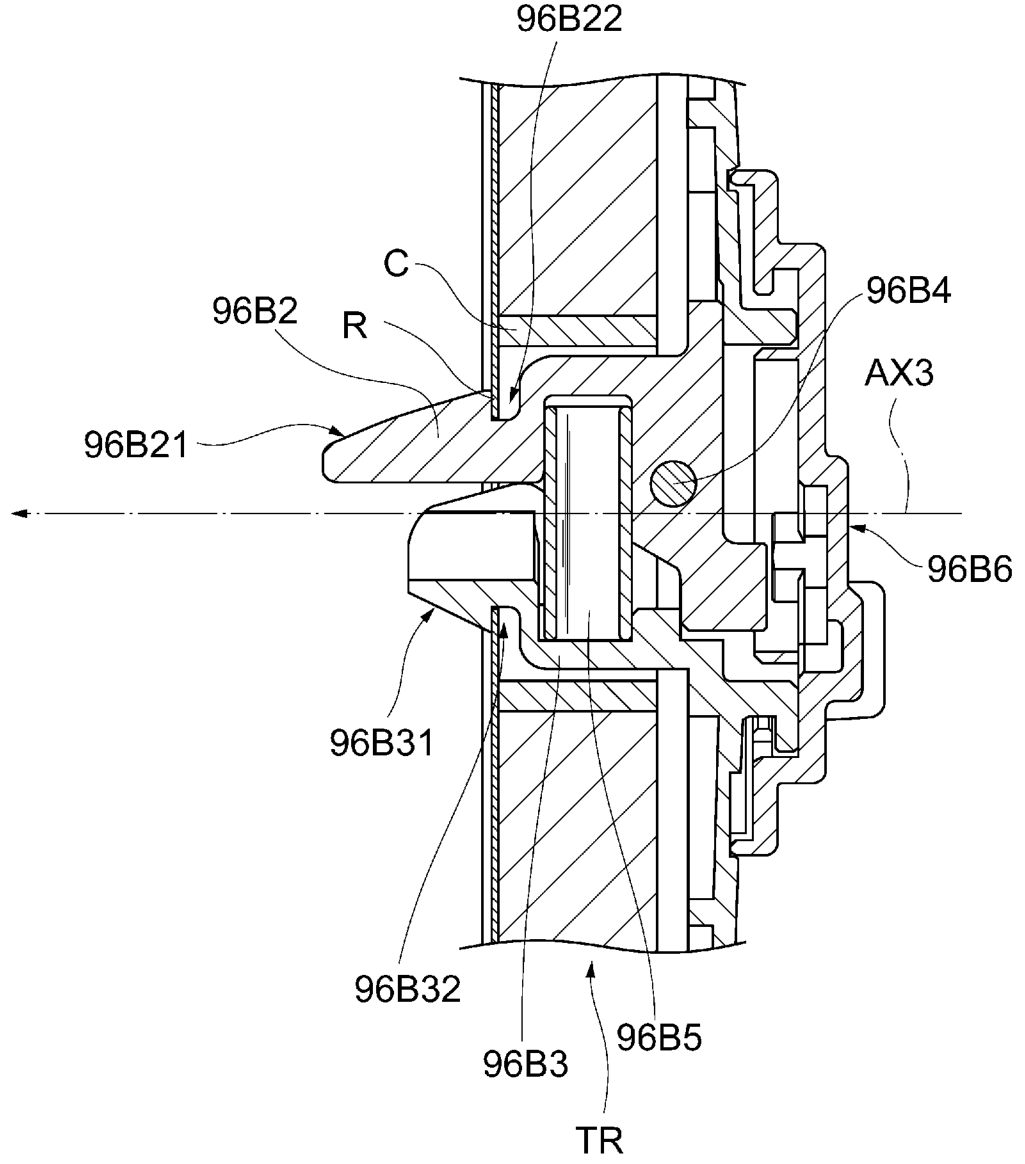
FIG. 22C is a cross-sectional view of a main part for illustrating a state where the tape reel engages with an engaging portion and an engaging portion and the tape reel is held.

As illustrated in FIG. 22C, when the rib R passes the inclined surface 96B21 and the inclined surface 96B31, the rib R engages with the engaging portion 96B22 and the engaging portion 96B32. Since the groove width of the engaging portion 96B22 in the axis AX3 direction is slightly larger than the thickness of the film F and the inner diameter of the engaging portion 96B22 is slightly smaller than the inner diameter of the film F, the holding unit 96B can rotatably hold the tape reel TR. However, while the engaging portion 96B22 and the engaging portion 96B32 are formed to have an inner diameter slightly larger than the inner diameter of the hole of the film F and are held, the tip of the rib R of the film F may be always in contact with the engaging portion 96B22, and the first shaft 96B2 and the second shaft 96B3 may be held to be rotatable about the axis AX3 by a bearing or the like.

Figure 22D:
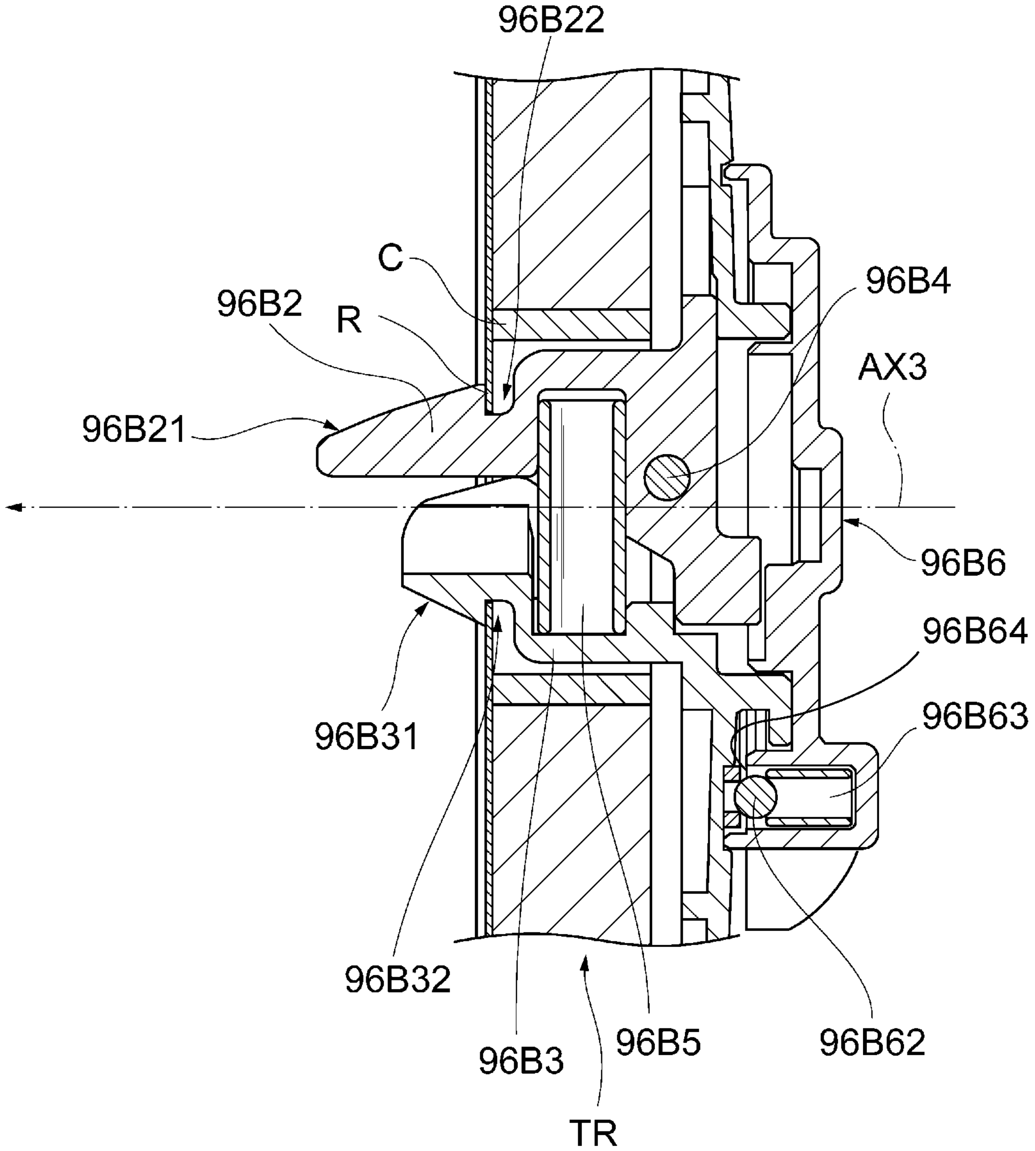
FIG. 22D is a cross-sectional view of a main part for illustrating a locked state by a lock portion.

Thereafter, the user rotates the lock lever 96B61. When the lock lever 96B61 is rotated to a locked position as illustrated in FIG. 22D, the steel ball 96B62 fits into a notch, giving the user a click feeling, and accordingly the user can recognize that the locked state is established. At this time, the stopper surface 96B64 is in close proximity to and faces the end surface of the first shaft 96B2. Therefore, the rotation of the first shaft 96B2 can be prevented.

By performing the above process, the mounting of the tape reel TR to the binding machine is completed. Thereafter, the user can use the binding machine to repeatedly perform the holding operation and the binding operation. After the first shaft 96B2 is caused to enter a rotatable state by rotating the lock lever 96B61 in an opposite direction, the user can easily remove the tape reel TR by releasing the engagement between the film F and the engaging portion 96B22 and the engaging portion 96B32.

With the configuration described above, the tape reel TR can be easily set in the bobbin case 96A.

The circumferential portion 96A3 may not be provided over the entire circumference. For example, an opening may be provided similarly to the circumferential portion 26A3, or a plurality of openings may be provided and a plurality of circumferential portions spaced apart may be provided. By providing the circumferential portion, the tape reel TR can be prevented from dropping at the time of being mounted. In addition, the surface of the tape TP can be protected.

Figure 23:
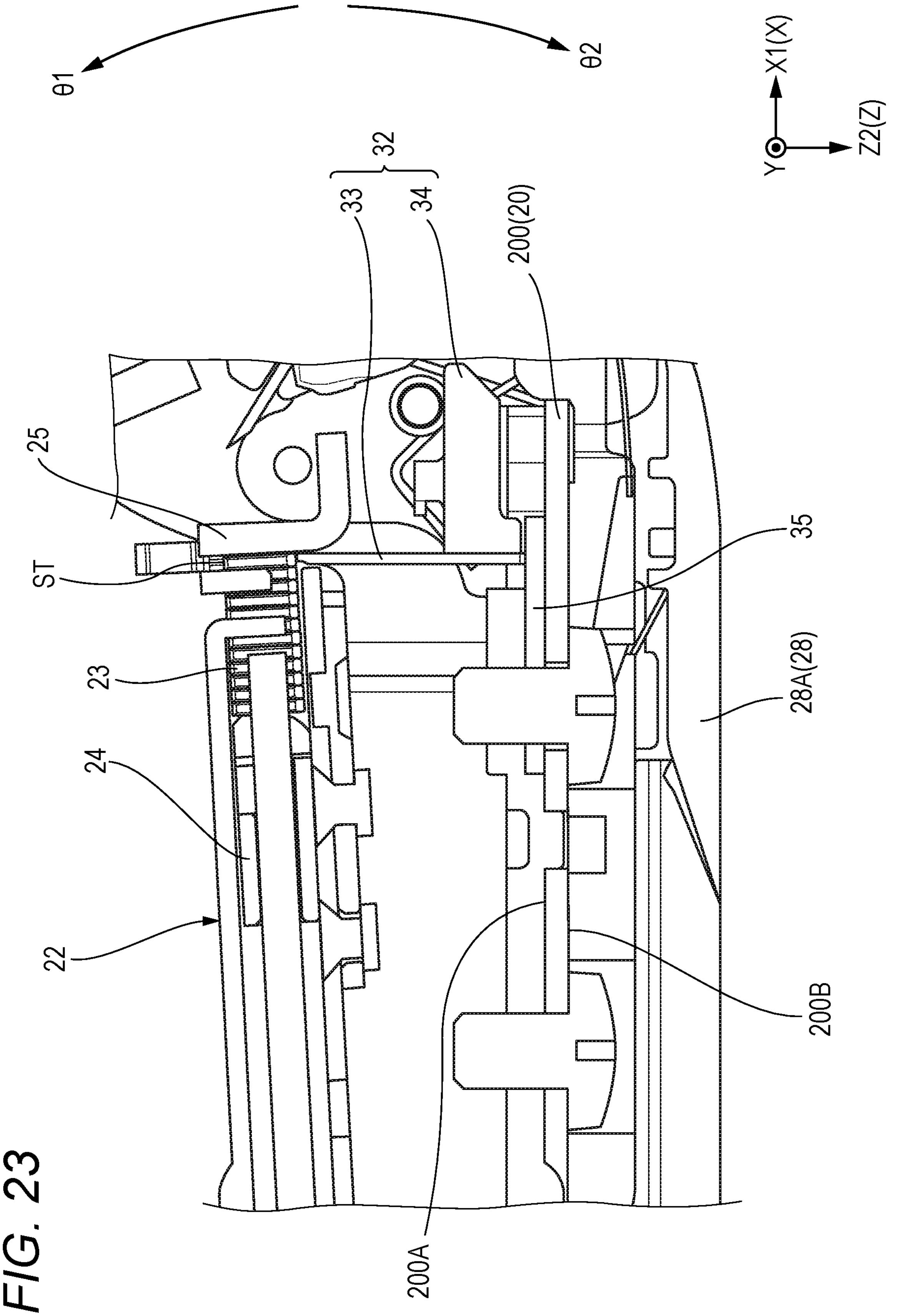
FIG. 23 is an enlarged cross-sectional view of the staple driver in a state where the diving of the staple is started as illustrated in FIG. 7.
Figure 24:
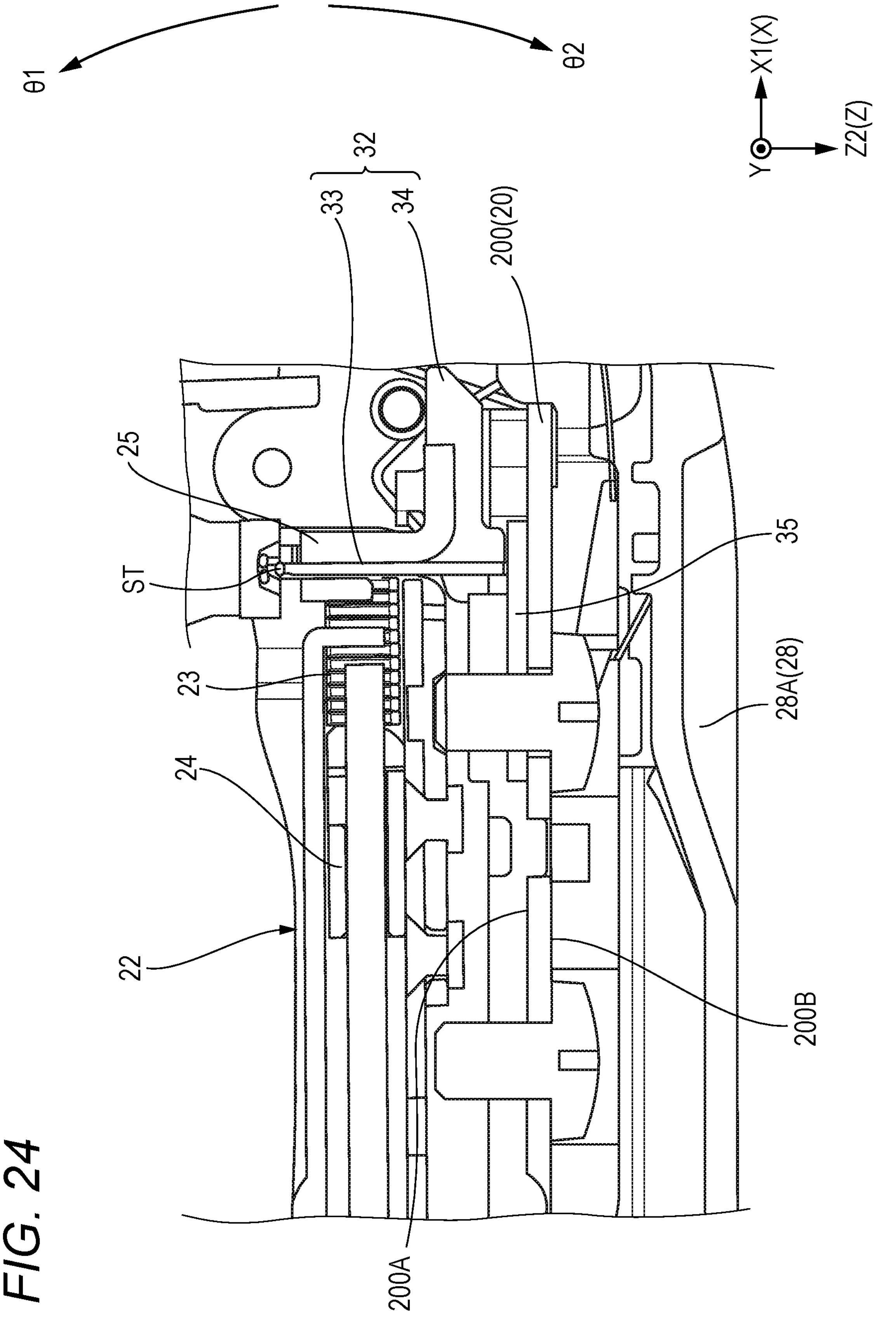
FIG. 24 is an enlarged cross-sectional view of the staple driver in a state where the driving of the staple is completed as illustrated in FIG. 9.

[Staple Driver] FIG. 23 is an enlarged cross-sectional view of the staple driver 32 in a state where driving of the staple ST is started as illustrated in FIG. 7. FIG. 24 is an enlarged cross-sectional view of the staple driver 32 in a state where the driving of the staple ST is completed as illustrated in FIG. 9. As illustrated in FIGS. 23 and 24, a bottom wall 200 of the main handle 20 has a lower surface 200B facing the tape holder 28A of the tape transport unit 28, and an upper surface 200A facing the staple magazine unit 22.

The staple driver 32 is attached to the upper surface 200A. A washer member (backup washer) 35 may be interposed between the bottom wall 200 and the staple driver 32. The washer member 35 is a metal component having enhanced wear resistance after being subjected to heat treatment, and is less prone to wear than the bottom wall 200. In order to reduce a friction coefficient, silicon grease or the like may be applied to a surface of the washer member 35.

As illustrated in FIGS. 23 and 24, the staple driver 32 has a driving portion 33 with which a leading staple ST is driven toward the clincher 54, and an attachment portion 34 for attaching the driving portion 33 to the main handle 20.

A tip (upper end) 33D of the driving portion 33 is pressed against the clincher guide 25 constituting a front wall surface of the staple accommodating portion 23 under a biasing force of a torsion coil spring 36. As described above, the staples ST accommodated in the staple accommodating portion 23 are pressed against the clincher guide 25 under a biasing force of the pusher unit 24. Since the leading staple ST and the tip 33D of the staple driver 32 are both regulated in position in a longitudinal direction X of the main handle 20 by the clincher guide 25, the tip 33D of the driving portion 33 faces the crown portion of the leading staple ST.

Figure 25:
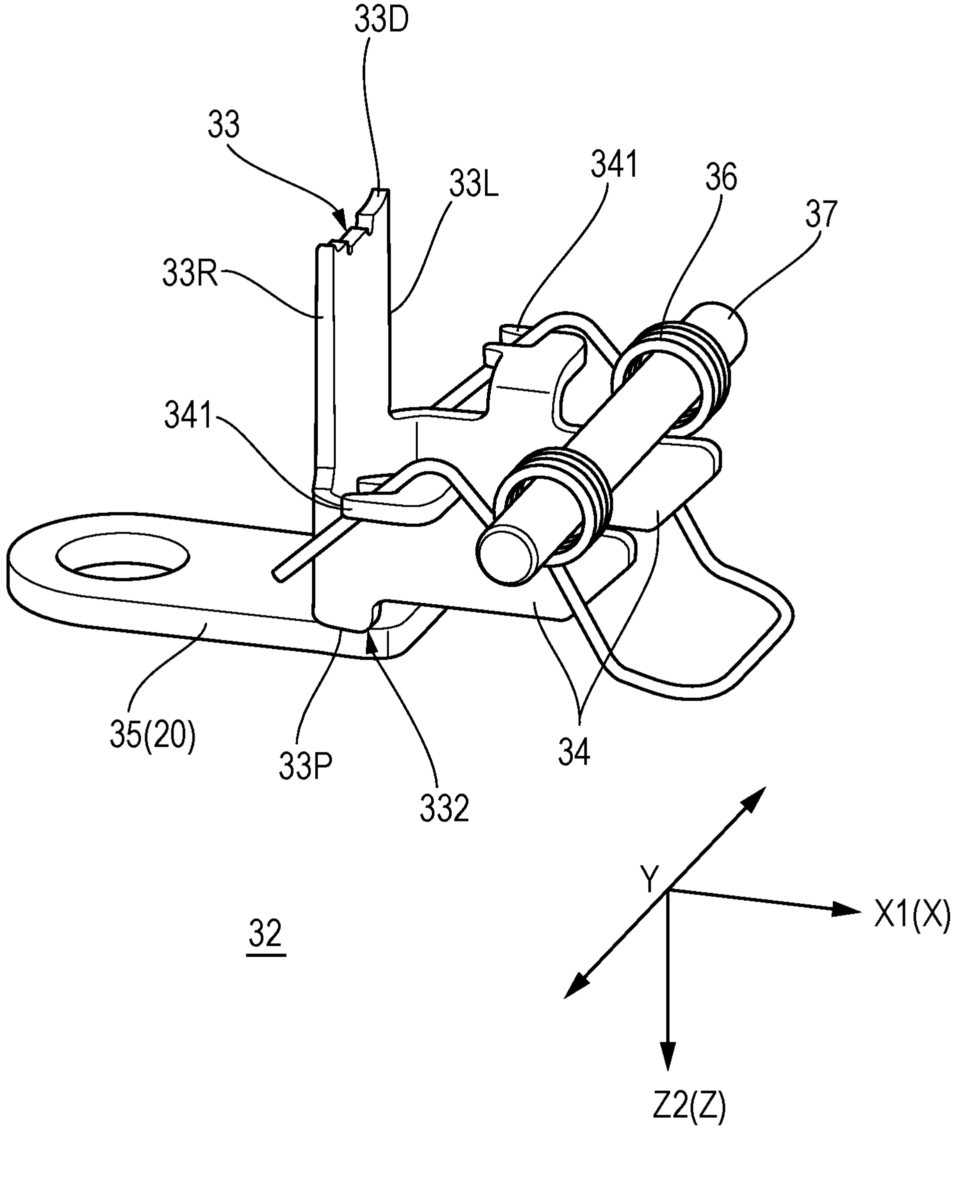
FIG. 25 is a perspective view of the staple driver illustrated in FIG. 9.

FIG. 25 is a perspective view of the staple driver 32 illustrated in FIG. 23. The driving portion 33 is formed in a substantially rectangular flat plate shape and extends in a direction of separating from the bottom wall 200 of the main handle 20. The driving portion 33 has the tip 33D, a base end 33P, and side edges 33L and 33R that constitute four sides of the driving portion 33.

As described above, the tip 33D of the driving portion 33 faces the staple ST. The base end (lower end) 33P opposite the tip 33D abuts the bottom wall 200 or the washer member 35 provided at the bottom wall 200. In other words, of the driving portion 33, the base end 33P as one end abuts the main handle 20 or the like, and the tip 33D as the other end extends to face the staple ST. The base end 33P is an example of "an end portion disposed on the main handle 20 side of the driving portion 33".

The attachment portion 34 is provided at each of the side edges 33L and 33R of the driving portion 33, and extends toward a tip portion 201 of the main handle 20. In the illustrated example, the attachment portion 34 is provided near the base end 33P of the driving portion 33. The attachment portion 34 is provided with an engaging portion 341 that engages with the torsion coil spring 36 serving as a biasing member. The engaging portion 341 is provided at an upper edge of the attachment portion 34 and protrudes outward in an axial direction Y of the rotation shaft portion 11 of the binding machine 10.

The torsion coil spring 36 (an example of "biasing member") is supported by s shaft portion 37 of the main handle 20 in a power storing state. The torsion coil spring 36 biases the engaging portion 341 in a direction from the upper surface 200A of the bottom wall 200 of the main handle 20 toward the lower surface 200B while biasing the engaging portion 341 in a direction toward the tip portion 201 of the main handle 20.

In the following description, in the longitudinal direction (a front-rear direction) X of the main handle 20, a direction (forward direction) from the rotation shaft portion 11 of the main handle 20 to the tip portion 201 may be referred to as a first direction X1. In a height direction (an upper-lower direction) Z orthogonal to both the longitudinal direction X of the main handle 20 and the axial direction Y of the rotation shaft portion 11, a direction (downward direction) from the upper surface 200A to the lower surface 200B of the bottom wall 200 may be referred to as a second direction Z2. When viewed from the staple driver 32 attached to the upper side of the main handle 20, the second direction Z2 is a direction in which the staple driver 32 approaches the main handle 20.

An end portion (base end portion) 332 including the base end 33P of the driving portion 33 and a portion in the vicinity thereof is disposed on the main handle 20 side. In a state where the clincher arm 50 is rotated in the closing direction θ2 (see FIG. 8, for example), the end portion 332 is located at a first position P1. In a state where the clincher arm 50 is rotated in the opening direction θ1 (see FIG. 2, for example), the end portion 332 is located at a second position P2 closer to the tip of the main handle 20 than the first position P1. That is, the staple driver 32 is configured to slide back and forth along the longitudinal direction X of the main handle 20 so as to be displaceable slightly.

According to the binding machine 10 of the first embodiment of the present invention configured as described above, as illustrated in FIG. 25, the driving portion 33, with which the staple ST is driven, can be configured in a flat plate shape that extends straight over an entire length from the tip 33D on which a reaction force from the staple ST acts to the base end 33P supported by the main handle 20.

A staple driver in the related art is configured with a plate spring bent into an L-shape, and the bent portion is supported by the bottom wall 200 of the main handle 20. Since the reaction force from the staple ST is received via the bent portion, a crack due to a fatigue phenomenon may be caused in the bent portion that is repeatedly deformed. In contrast, in the first embodiment of the present invention, since the driving portion 33 has a straight flat plate shape, the reaction force from the staple ST can be received without passing through the bent portion. The staple driver 32 is less likely to be damaged even if the binding machine 10 is repeatedly used.

The tip 33D of the driving portion 33 needs to be displaced back and forth following movement of the staple accommodating portion 23. A staple driver in the related art is formed in a plate spring that deforms itself. Correspondingly, in the first embodiment, the end portion 332 of the staple driver 32 is configured to be slidable on the bottom wall 200 of the main handle 20 or on the washer member 35 fixed to the bottom wall 200.

Therefore, even if the staple driver 32 itself does not deform, the tip 33D of the driving portion 33 can follow the movement of the staple accommodating portion 23. The staple driver 32 is less likely to be damaged even if the binding machine 10 is repeatedly used. Regarding a material of the staple driver 32, since repeated durability against bending is not necessarily required, an inexpensive material can be selected.

The staple driver 32 is biased in the first direction X1 and the second direction Z2 by a biasing member such as the torsion coil spring, and is positioned such that the tip 33D is not separated from the front wall surface of the staple accommodating portion 23. The biasing member is configured separately from the staple driver 32 and can be replaced separately.

[Second Embodiment of Staple Driver]

Figure 26:
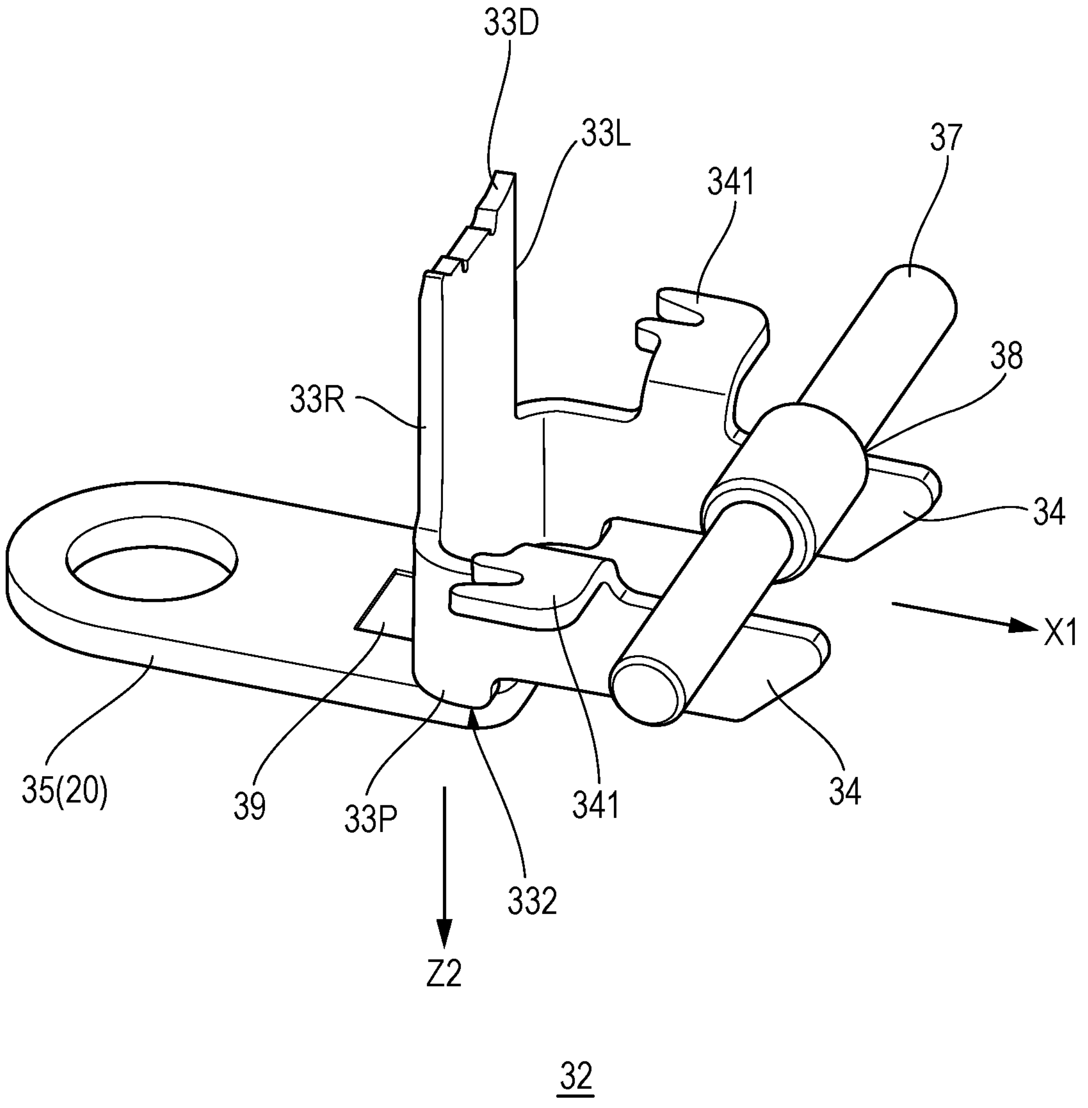
FIG. 26 is a perspective view of a staple driver according to a second embodiment of the present invention.

For a second embodiment, description of matters common to the first embodiment will be omitted, and only different points will be described. FIG. 26 is a perspective view of a staple driver 32 according to the second embodiment of the present invention. The second embodiment differs from the first embodiment in the biasing member that biases the staple driver 32 in the first direction X1 and the second direction Z2.

In the second embodiment, the staple driver 32 is biased by magnets 38 and 39 (an example of a "biasing member") instead of the torsion coil spring 36. The staple driver 32 is made of a ferromagnetic material to be attracted to a magnet. The magnet (first magnet) 38 for biasing the staple driver 32 in the first direction X1 is disposed at a position advanced from the driving portion 33 in the first direction X1. In the illustrated example, the magnet 38 is fixed to a peripheral surface of the shaft 37 facing the driving portion 33 from the front.

Similarly, the magnet (second magnet) 39 for biasing the staple driver 32 in the second direction Z2 is disposed at a position advanced from the driving portion 33 in the second direction Z2. In the illustrated example, the magnet 39 is embedded in the washer member 35 facing the staple driver 32 from below.

According to the second embodiment, similarly to the first embodiment, the staple driver 32 can be configured to be displaceable between the first position P1 (see FIG. 8) and the second position P2 (see FIG. 3). As compared with the first embodiment, the number of elastically deformable members is reduced, and thus the service life of the binding machine 10 can be extended.

[Staple Magazine Unit]

Figure 27:
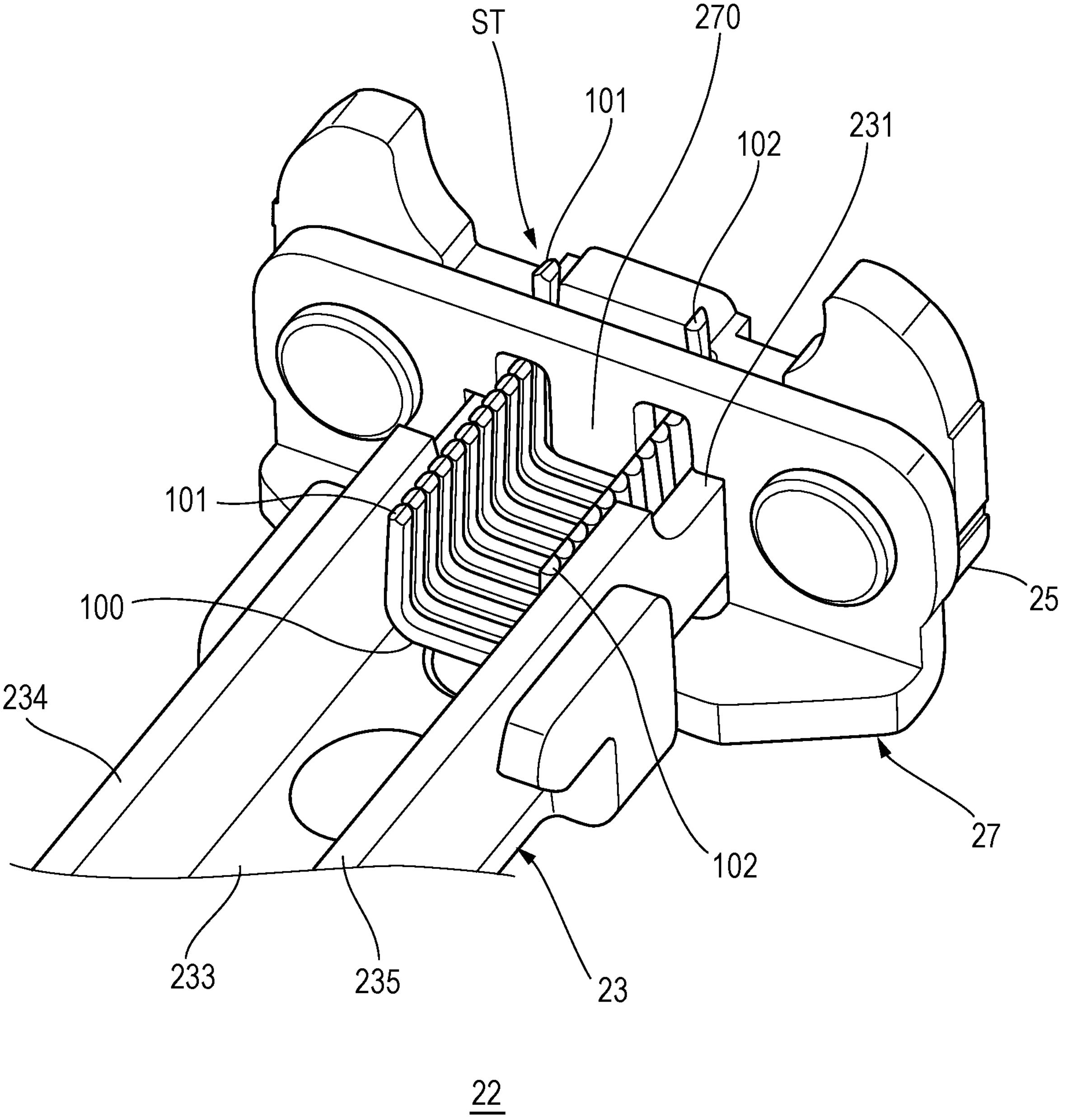
FIG. 27 is a perspective view illustrating a staple guide portion according to a first embodiment of the present invention.

FIG. 27 is a perspective view of a staple guide portion 27 according to the first embodiment of the present invention. The staple guide portion 27 faces a crown portion 100 of the staple ST from the rear side in a state where the staple ST is being driven (see FIG. 7).

In the illustrated example, the staple guide portion 27 is mounted to the staple accommodating portion 23 that accommodates the staples ST. The staple guide portion 27 and the staple accommodating portion 23 may be formed integrally, or the staple guide portion 27 and the clincher guide 25 may be formed integrally. The staple guide portion 27 has an extension portion 270 extending into the staple accommodating portion 23.

As illustrated in FIG. 27, the plurality of staples ST are accommodated in the staple accommodating portion 23 with the crown portions 100 being on a lower side. Each staple ST is formed in a U shape and includes the crown portion 100 and a pair of leg portions 101 and 102.

Figure 28:
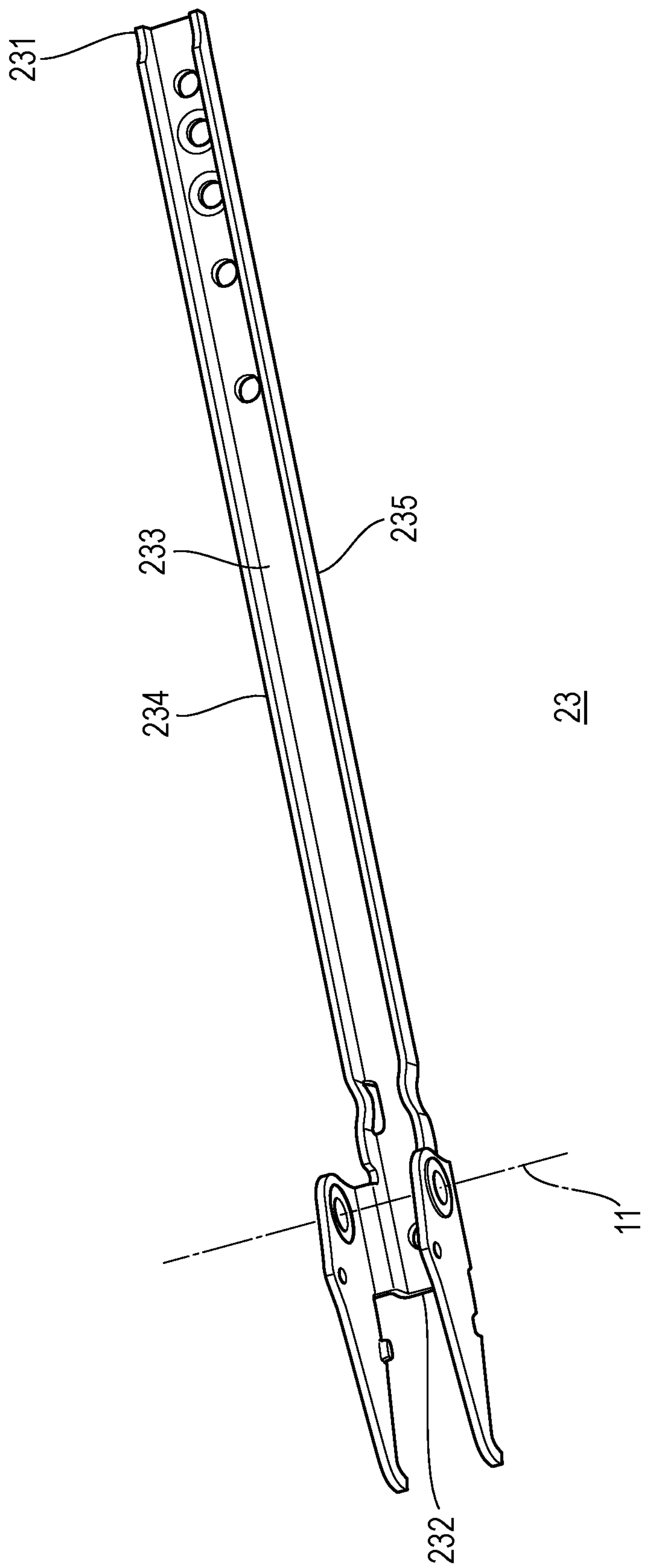
FIG. 28 is a perspective view of a staple accommodating portion illustrated in FIG. 27.

FIG. 28 is a perspective view of the staple accommodating portion 23 illustrated in FIG. 27. As illustrated in FIG. 28, the staple accommodating portion 23 is a long sheet metal member having a U-shaped cross section, and includes a base end portion 232 supported by the rotation shaft portion 11 of the binding machine 10 and a tip portion 231 opposite the base end portion 232. The staple accommodating portion 23 is configured to be capable of accommodating the staples ST at least in the tip portion 231.

The staple accommodating portion 23 has a bottom wall portion 233 along the crown portions 100 of the staple ST accommodated in the staple accommodating portion 23, and a pair of side wall portions 234 and 235 extending from the bottom wall portion 233 and along the pair of leg portions 101 and 102 of the staples ST respectively.

Figure 29:
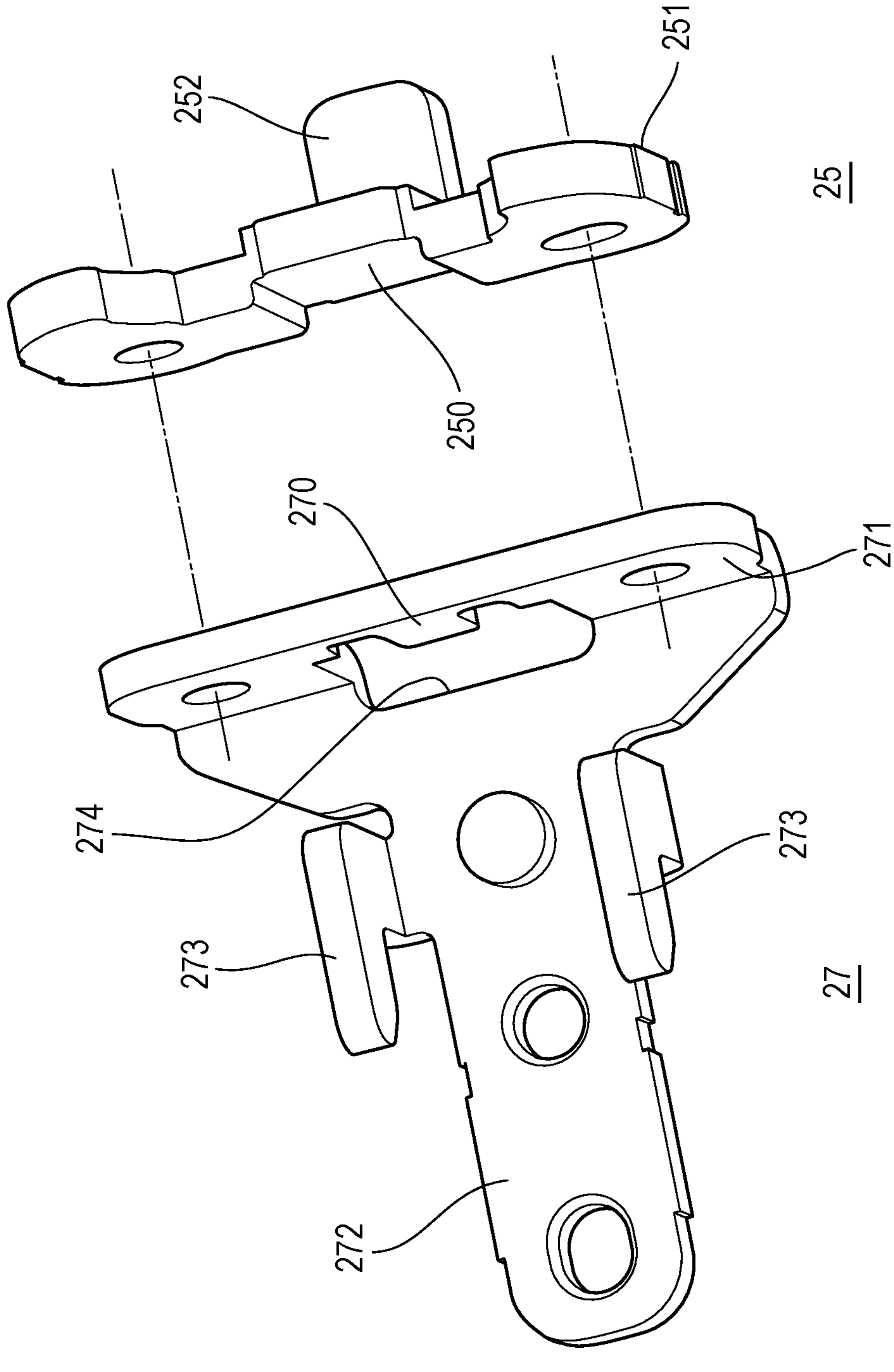
FIG. 29 is a perspective view of the staple guide portion illustrated in FIG. 27.

FIG. 29 is a perspective view of the staple guide portion 27 illustrated in FIG. 27. As illustrated in FIG. 29, in addition to the extension portion 270, the staple guide portion 27 further has a first attachment portion 271 to which the clincher guide 25 is to be attached, a second attachment portion 272 that is to be attached to the bottom wall portion 233 of the staple accommodating portion 23, a positioning portion 273 that extends from the second attachment portion 272 and faces the pair of side wall portions 234 and 235 of the staple accommodating portion 23 from lateral sides, and a through-hole 274 that is provided between the first and second attachment portions 271 and 272 and into which the tip portion 231 of the staple accommodating portion 23 is to be inserted.

In the illustrated example, the clincher guide 25 constitutes the front wall surface of the staple accommodating portion 23 against which the side surface of the leading staple ST is pressed. The clincher guide 25 includes a front wall portion 250 that constitutes the front wall surface described above, an attaching portion 251 that is to be attached to the first attachment portion 271 of the staple guide portion 27, and a tongue piece portion 252 that extends from the front wall portion 250 toward the tip portion 201 side of the main handle 20.

Figure 30:
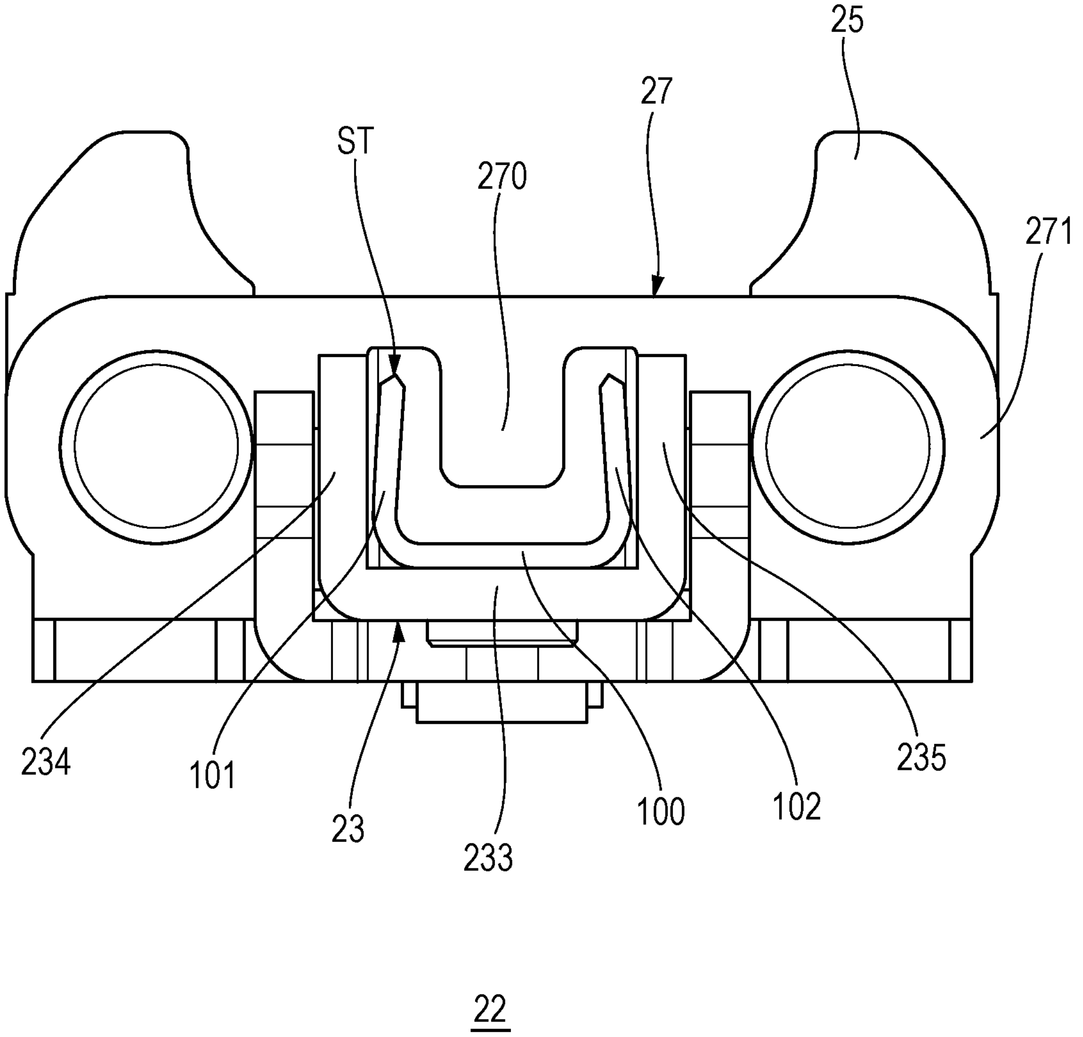
FIG. 30 is a rear view of the staple guide portion as viewed from a base end portion of the staple accommodating portion.

FIG. 30 is a rear view of the staple guide portion 27 as viewed from the base end portion 232 side of the staple accommodating portion 23. As illustrated in FIG. 30, with respect to the staple guide portion 27, the first attachment portion 271 is provided to stretch between the pair of side wall portions 234 and 235, and the extension portion 270 is positioned between the pair of leg portions 101 and 102 of the staple ST accommodated in the staple accommodating portion 23.

Figure 31:
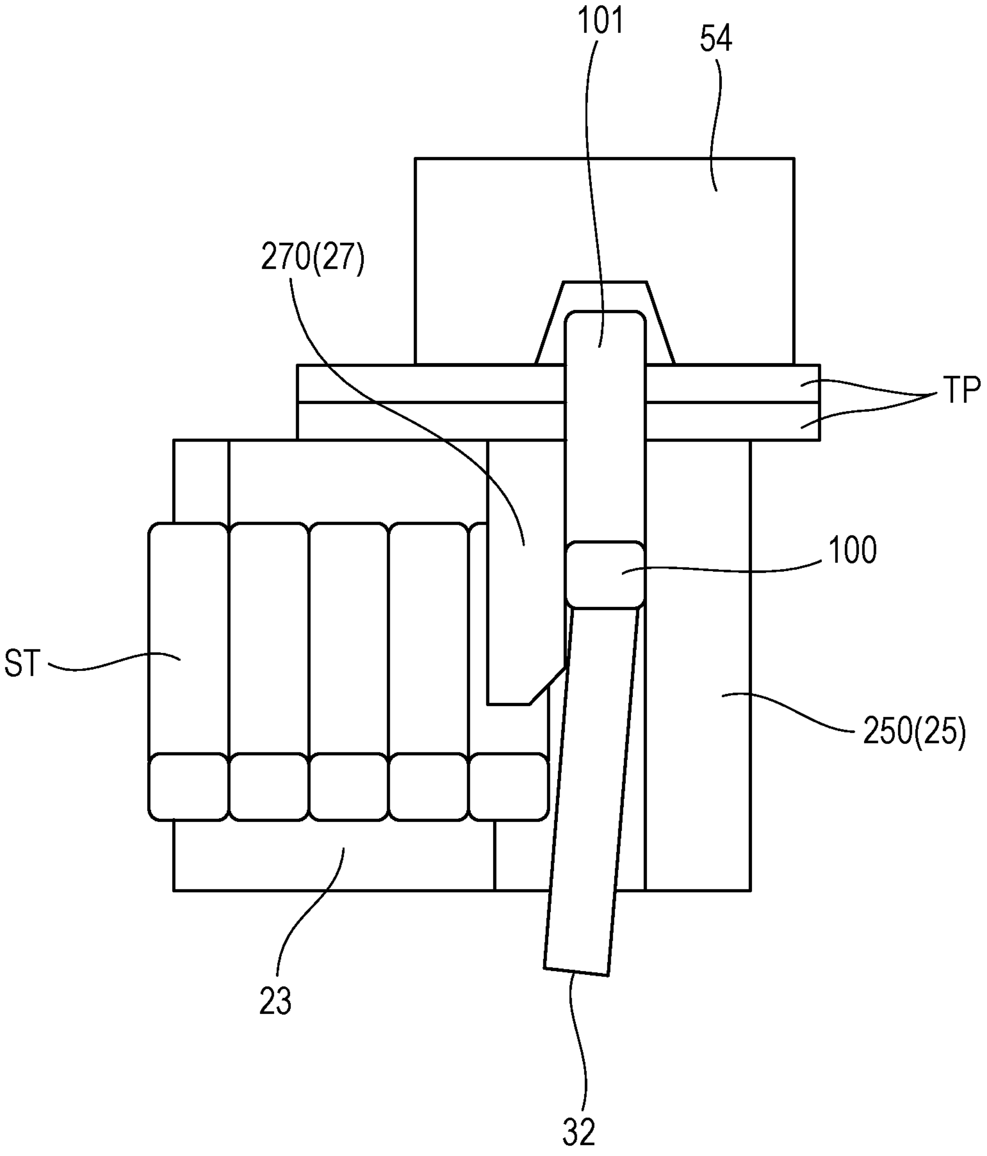
FIG. 31 is a cross-sectional view schematically illustrating a positional relationship between the staple and the staple guide portion in a state where the staple is being driven as illustrated in FIG. 8.
Figure 38:
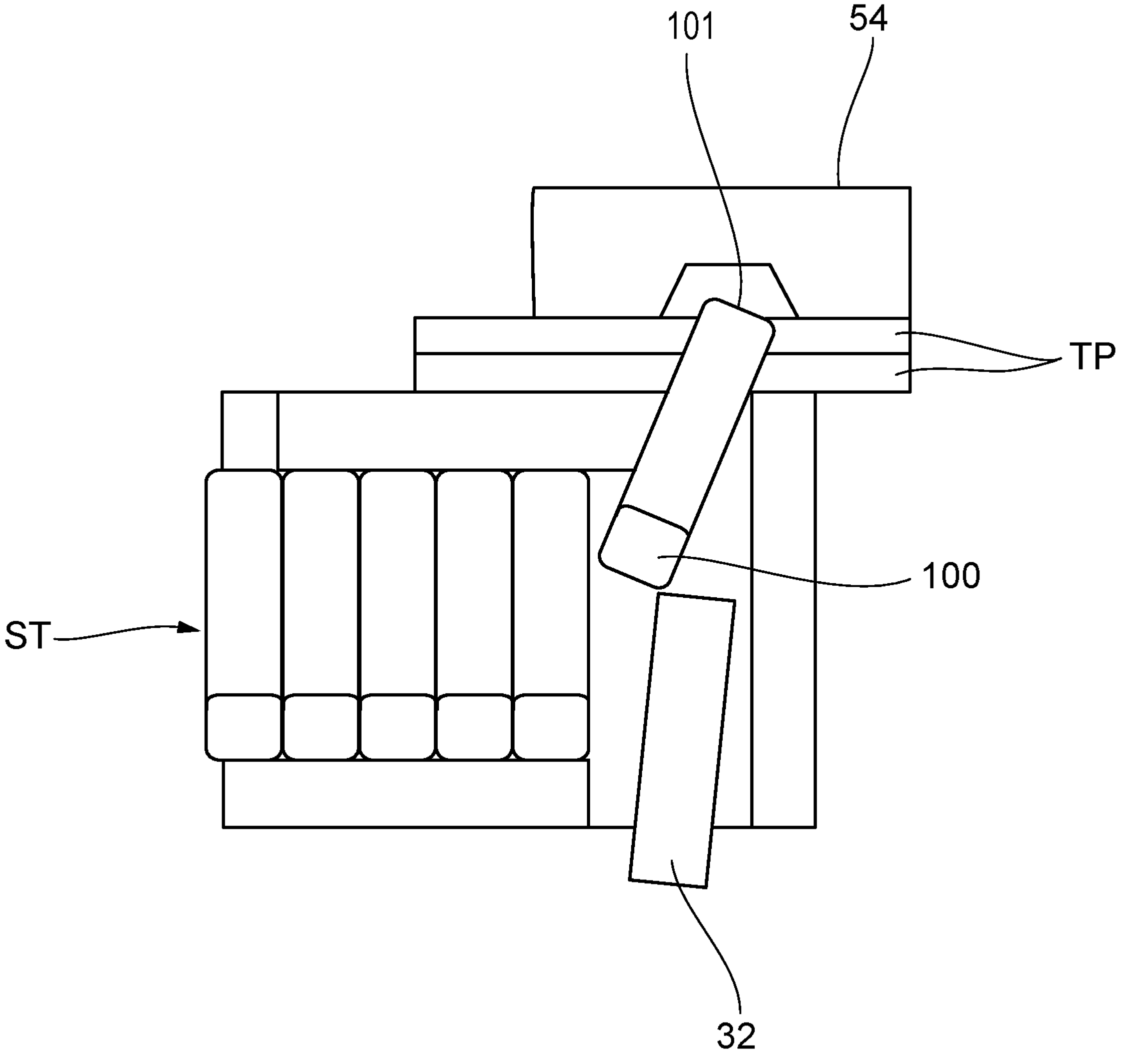
FIG. 38 is a cross-sectional view schematically illustrating a staple accommodating portion of a binding machine in the related art shown for comparison with the present invention.

FIG. 31 is a cross-sectional view schematically illustrating a positional relationship between the staple ST and the staple guide portion 27 in the state where the staple ST is being driven as illustrated in FIG. 8. FIG. 38 is a cross-sectional view schematically illustrating a staple accommodating portion of a binding machine in the related art shown for comparison with that in FIG. 31.

When the tape TP is to be cut in a state where strong tension is applied without the staple guide portion 27 being provided, as illustrated in FIG. 38, the tips of the leg portions 101 and 102 of the staple ST move forward by being pulled by the tape TP and the crown portion 100 opposite the tips of the leg portions 101 and 102 moves rearward, that is, the staple ST moves rotationally.

When the binding machine 10 is gripped in a state where the staple ST is in an inclined posture with respect to the front wall portion 250, the staple ST is deformed in an undesired shape between the clincher 54 and the staple driver 32, and the staple is caught.

The binding machine 10 of each embodiment of the present invention is provided with the staple guide portion 27 that prevents the staple ST from overturning. As illustrated in FIG. 31, the staple guide portion 27 faces the crown portion 100 of the staple ST from behind. Even if the tips of the leg portions 101 and 102 are pulled by the tape TP, the staple guide portion 27 abuts the crown portion 100 to regulate rearward movement of the crown portion 100, and thus the staple ST does not move rotationally. The staple ST can be prevented from overturning.

However, in the binding machine 10 of the first embodiment illustrated in FIG. 31, the extension portion 270 of the staple guide portion 27 is fixed to the front wall portion 250 of the clincher guide 25. In a case where the staple ST is caught in a gap between the extension portion 270 and the front wall portion 250, it is not easy to widen the gap.

Figure 32:
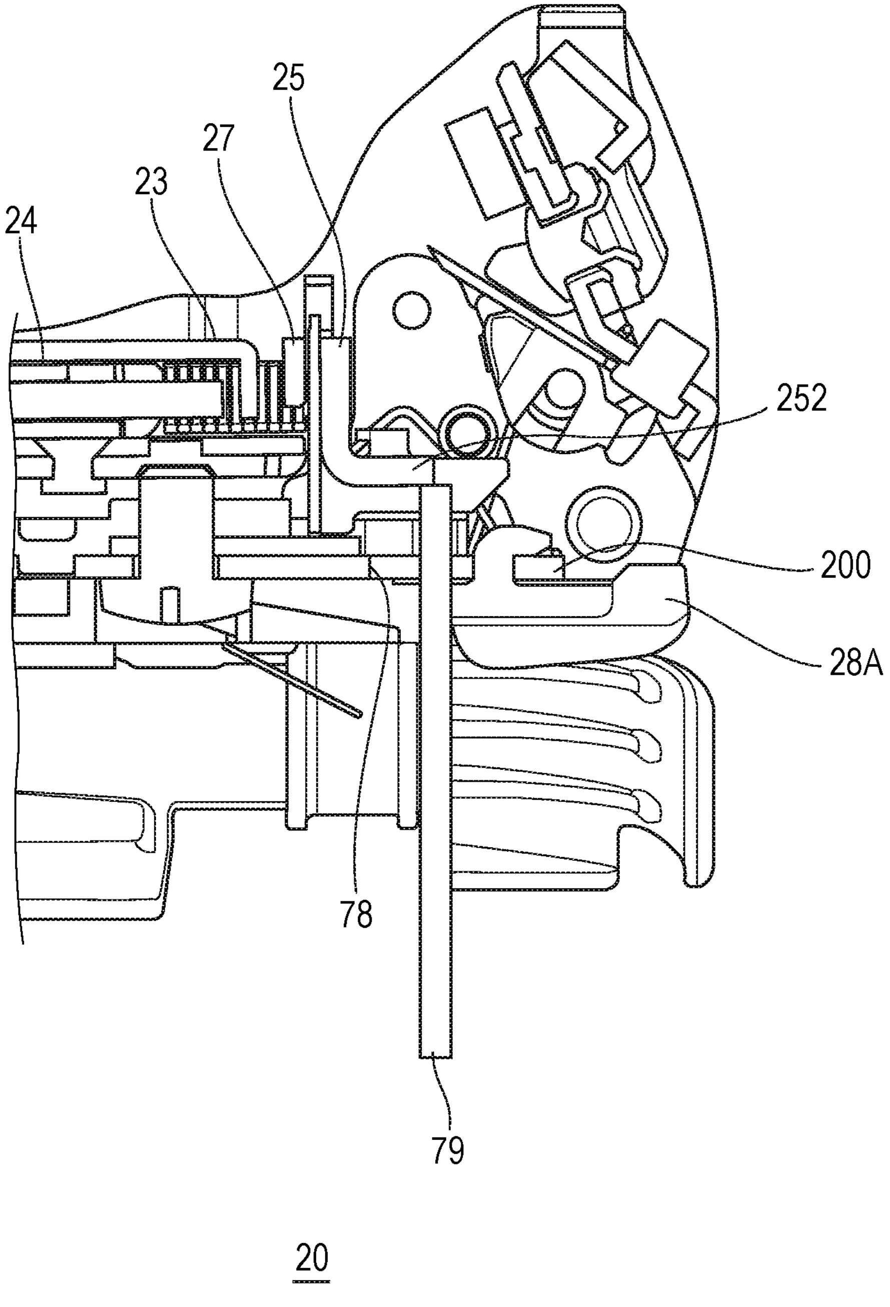
FIG. 32 is a cross-sectional view illustrating a state where a staple removing tool is pressed against a clincher guide through a through-hole.

FIGS. 32 to 35 illustrate exemplary removing members capable of removing the caught staple ST without widening the gap between the extension portion 270 and the front wall portion 250. FIG. 32 is a cross-sectional view illustrating a state where a staple removing tool 79 is pressed against the clincher guide 25 through a through-hole 78. In the illustrated example, the through-hole 78 is formed in the bottom wall 200 of the main handle 20 and a bottom portion of the tape holder 28A of the tape transport unit 28 right below the tongue piece portion 252 of the clincher guide 25.

Figure 33:
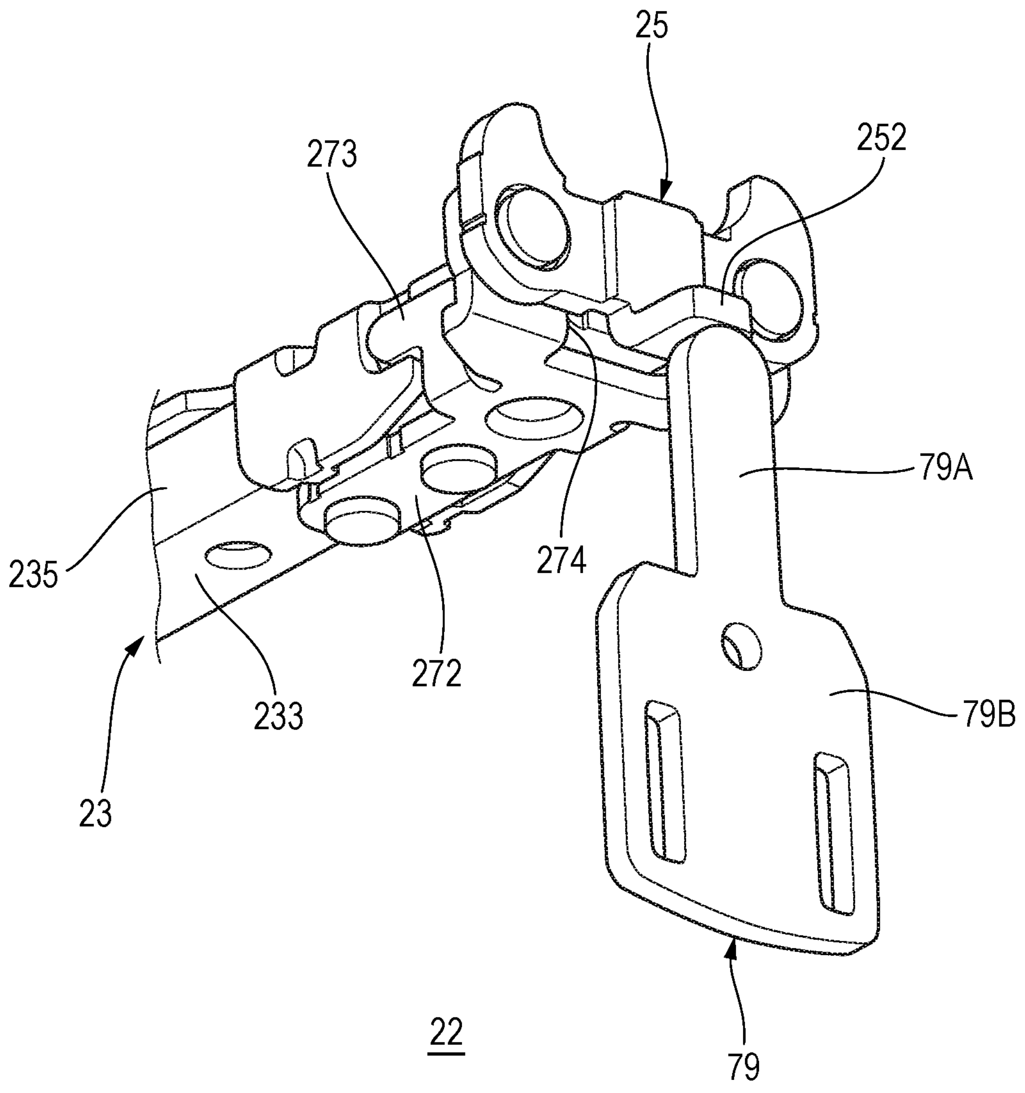
FIG. 33 is a perspective view of an exemplary staple removing tool illustrated in FIG. 32, as viewed from a tip portion of the main handle.

FIG. 33 is a perspective view of an exemplary staple removing tool 79 illustrated in FIG. 32, as viewed from the tip portion 201 side of the main handle 20. The staple removing tool 79 has, for example, a protruding portion 79A that is long enough to press the tongue piece portion 252 of the clincher guide 25 by being inserted into the through-hole 78, and a portion 79B to be gripped which is easy for the user of the binding machine 10 to grip.

Figure 34:
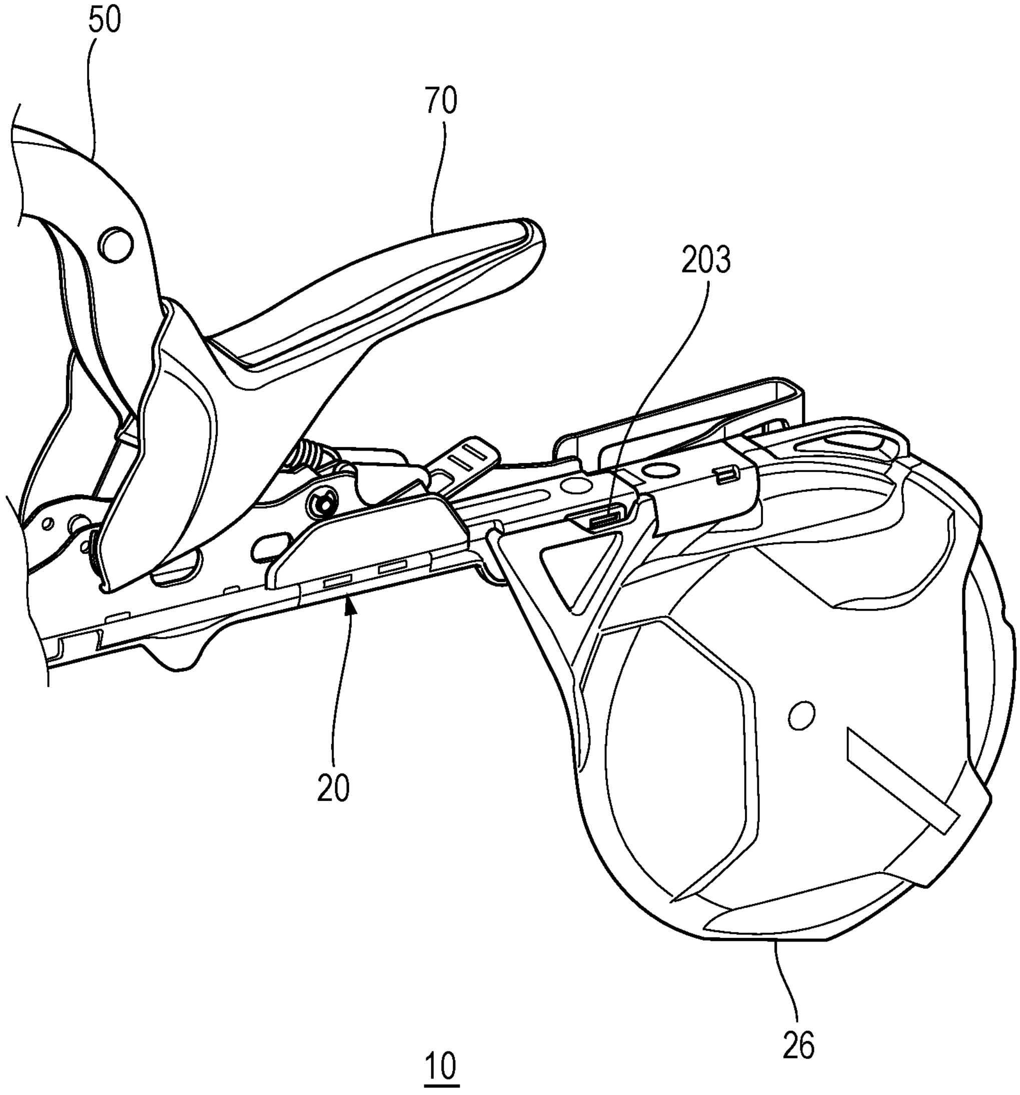
FIG. 34 is a perspective view illustrating the staple removing tool in a state of being accommodated in the main handle.

FIG. 34 is a perspective view illustrating the staple removing tool 79 in a state of being accommodated in the main handle 20. When the staple removing tool 79 has a flat plate shape, as illustrated in FIG. 34, the staple removing tool 79 can be accommodated and carried in a pocket 203 provided in the main handle 20.

Figure 35:
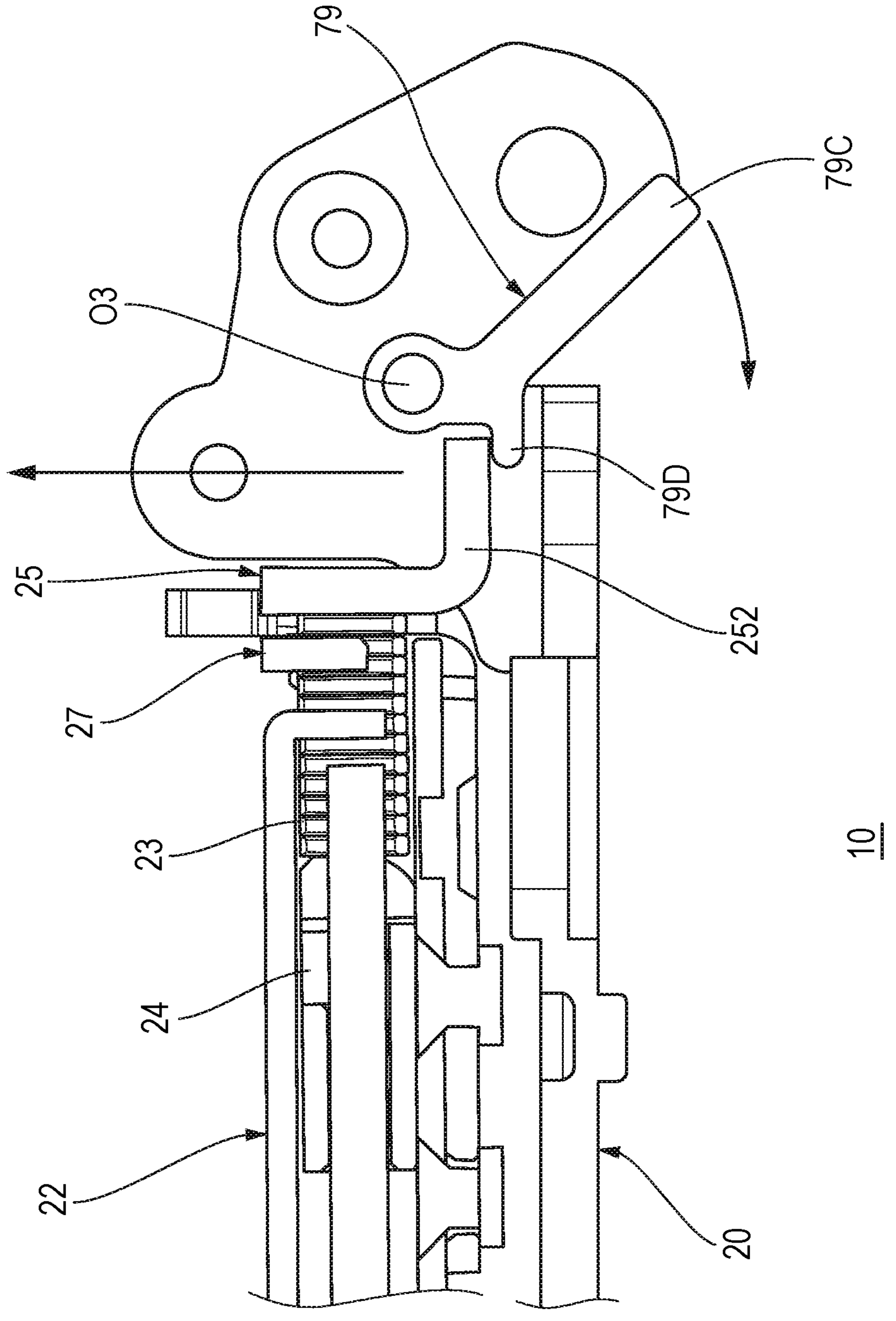
FIG. 35 is a cross-sectional view illustrating a staple removing tool as a modification.

FIG. 35 is a cross-sectional view illustrating a staple removing tool 79 as a modification. In the illustrated example, the staple removing tool 79 is always mounted to the main handle 20. When a lever 79C of the staple removing tool 79 is pushed down, the staple removing tool 79 rotates about a fulcrum O3, and a protrusion 79D provided between the lever 79C and the fulcrum O3 pushes up the tongue piece portion 252 of the clincher guide 25.

According to the binding machine 10 of the first embodiment of the present invention configured as described above, since the staple guide portion 27 supports such that the crown portion 100 of the staple ST does not move backward, the staple ST can be prevented from overturning at the time of driving the staple ST. Even if the staple ST is caught in the gap between the staple guide portion 27 and the clincher guide 25, the staple ST can be easily removed by pressing the tongue piece portion 252 of the clincher guide 25.

[Second Embodiment of Staple Magazine Unit]

Figure 36:
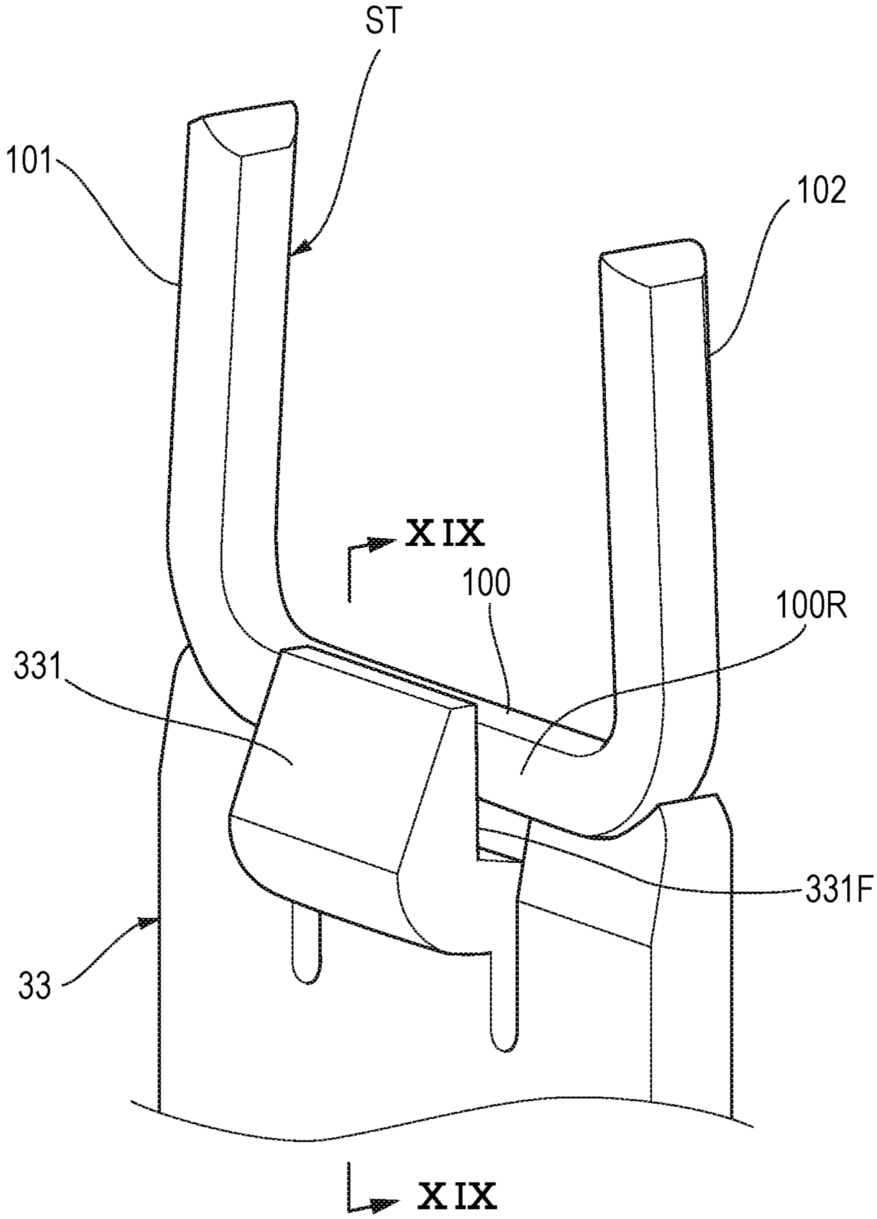
FIG. 36 is a perspective view of a staple guide portion according to a second embodiment of the present invention.
Figure 37:
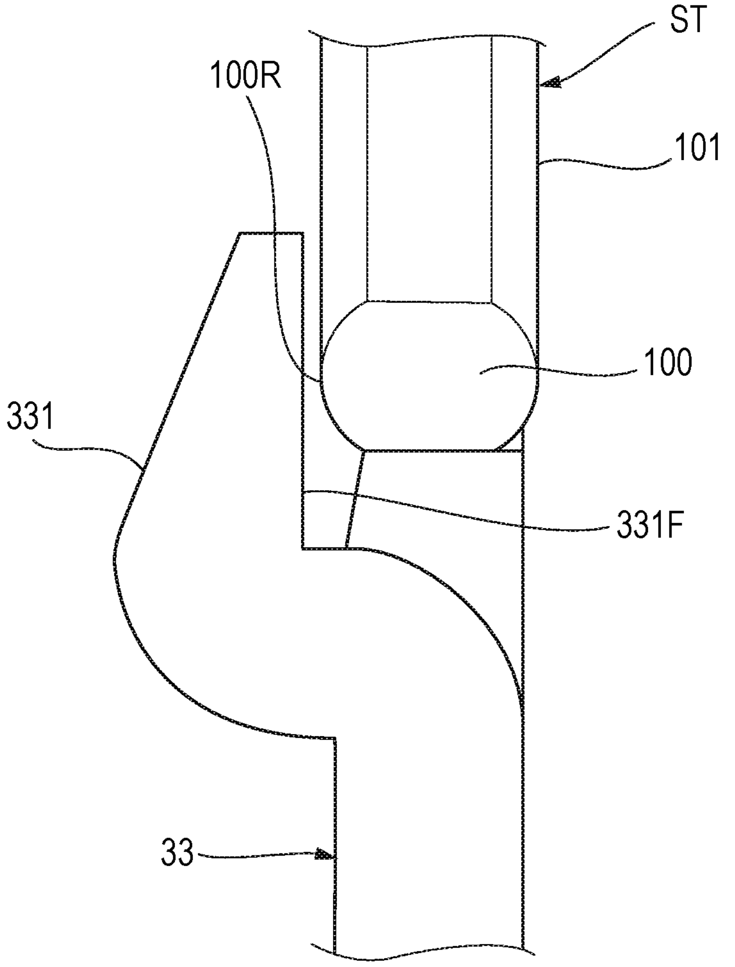
FIG. 37 is a cross-sectional view taken along a line XIX-XIX in FIG. 36.

For a second embodiment, description of matters common to the first embodiment will be omitted, and only different points will be described. FIG. 36 is a perspective view of a staple guide portion 331 according to the second embodiment of the present invention. FIG. 37 is a cross-sectional view taken along a line XIX-XIX in FIG. 36. The second embodiment is different from the first embodiment in that the staple guide portion 331 is provided in the staple driver 32 not in the staple magazine unit 22.

As illustrated in FIG. 36, the staple driver 32 includes the driving portion 33, which abuts the crown portion 100 of the staple ST to push out the staple ST, and the staple guide portion 331 that extends from the driving portion 33. The staple guide portion 331 has a wall surface 331F that faces a rearward surface 100R of a leading staple ST.

According to the second embodiment, similarly to the first embodiment, the staple can be prevented from overturning at the time of being driven. Further, according to the second embodiment, the manufacturing costs can be reduced since the number of components is reduced compared with that of the first embodiment.

[Staple and Clincher]

Figure 39:
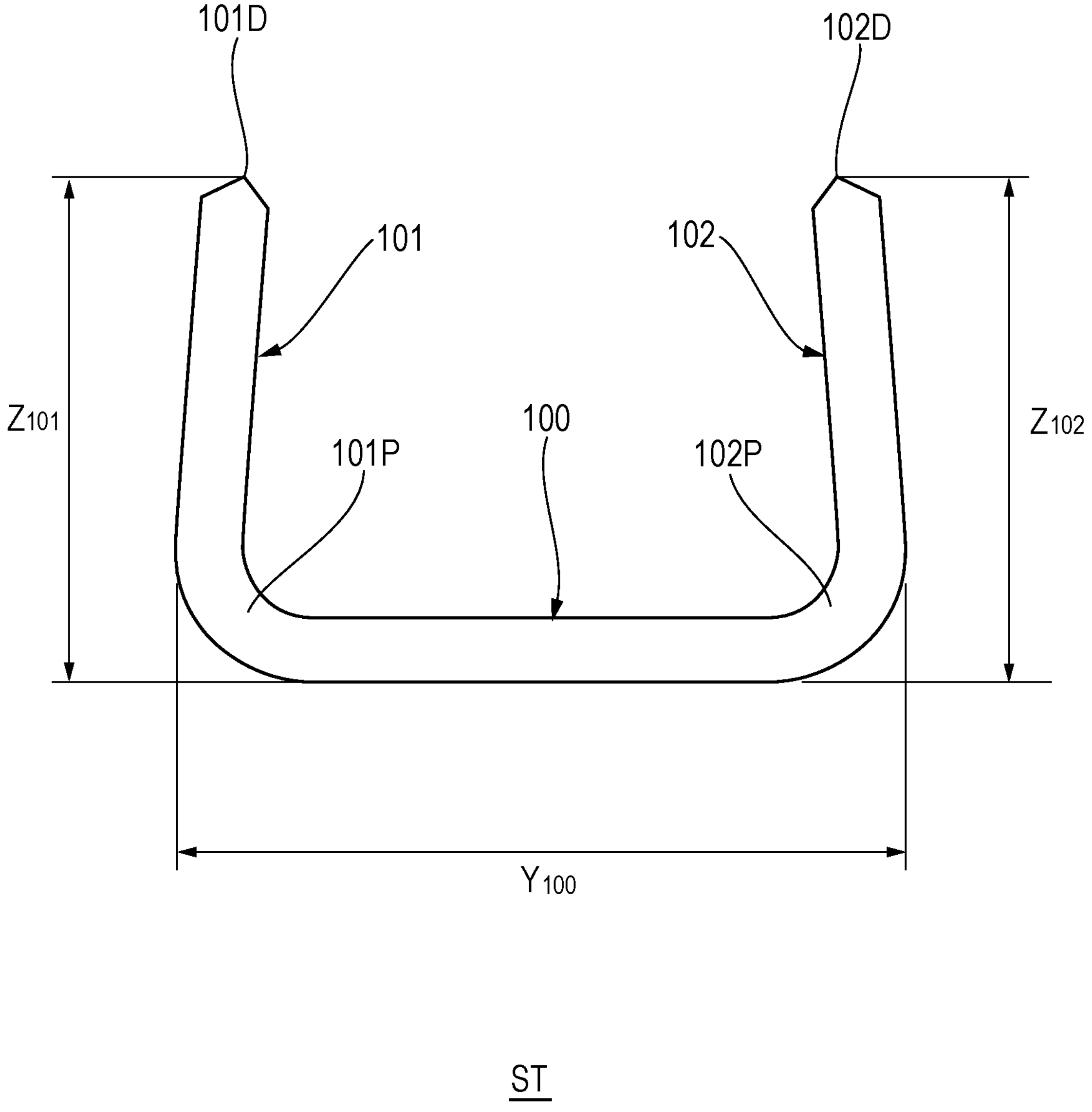
FIG. 39 is a front view of the staple used in the binding machine.

FIG. 39 is a front view of the staple ST used in the binding machine 10. As illustrated in FIG. 39, the staple ST is formed by pressing, for example, a steel wire joined with an adhesive in a U shape. Each staple ST has the crown portion 100, a first leg portion 101, and a second leg portion 102. The crown portion 100 is formed in a substantially linear shape and extends in a direction orthogonal to an arrangement direction of a plurality of staples ST arranged in a row.

A base end 101P of the first leg portion 101 is connected to one end of the crown portion 100. A first connection portion includes the base end 101P of the first leg portion 101 and a portion in the vicinity thereof. A base end 102P of the second leg portion 102 is connected to the other end of the crown portion 100. A second connection portion includes the base end 102P and a portion in the vicinity thereof.

With respect to the staple ST according to each embodiment of the present invention, the first leg portion 101 is formed to have a length (length of the needle leg) $Z_{101}$ larger than half the length (shoulder width) $Y_{100}$ of the crown portion 100. Similarly, the second leg portion 102 is formed to have a length $Z_{102}$ larger than half the length $Y_{100}$ of the crown portion 100. In the illustrated example, the lengths $Z_{101}$ and $Z_{102}$ of the first and second leg portions 101 and 102 are smaller than the length $Y_{100}$ of the crown portion 100.

Figure 40:
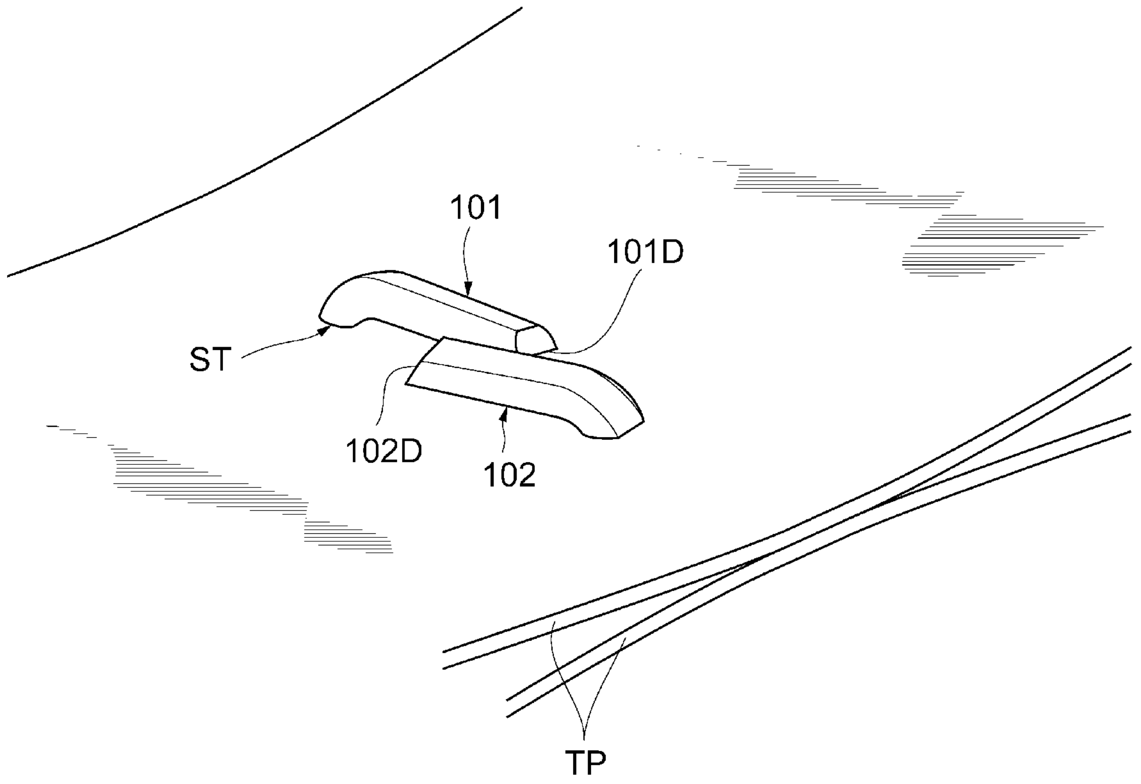
FIG. 40 is a perspective view of the staple in a state where the tape is bound.
Figure 41:
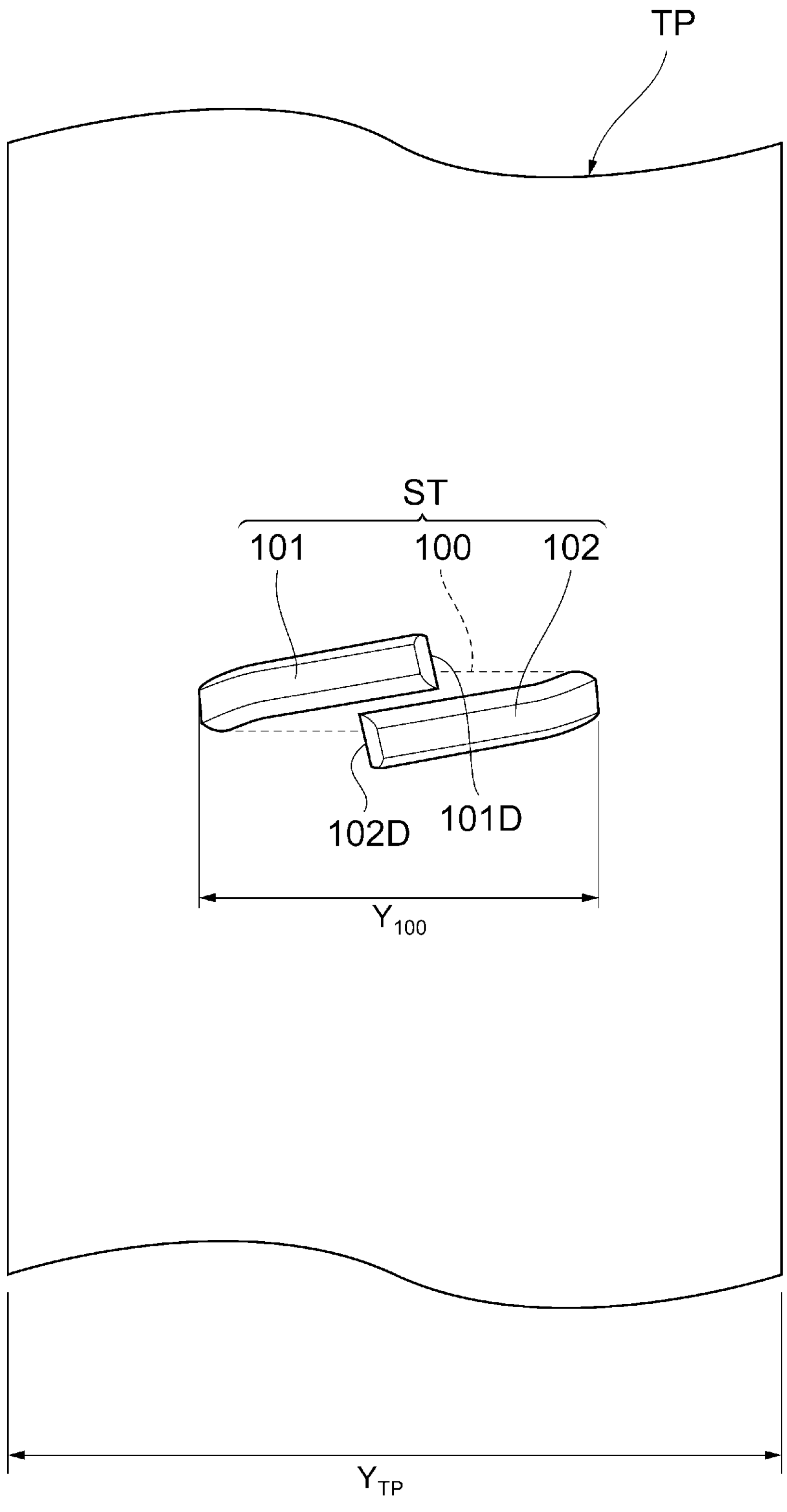
FIG. 41 is a plan view of the staple illustrated in FIG. 40.

FIG. 40 is a perspective view of the staple ST in a state where the tape TP is bound. One of characteristics of the staple ST according to the present embodiment is that the first leg portion 101 and the second leg portion 102 are clinched so as to intersect with each other as illustrated in FIG. 40. The clinched first and second leg portions 101 and 102 are partially overlapped in a width direction of the crown portion 100, and the tape TP can be bound even when the lengths $Z_{101}$ and $Z_{102}$ of the first and second leg portions 101 and 102 is larger than half the length $Y_{100}$ of the crown portion 100. The first leg portion 101 and the second leg portion 102 are bend such that the respective tips thereof are deviated from the crown portion 100. Therefore, the first leg portion 101 and the second leg portion 102 are bend such that the first leg portion 101 and the second leg portion 102 are in parallel or substantially in parallel to each other. Note that being substantially in parallel also includes in a state of being within a predetermined error range from perfectly in parallel. FIG. 41 is a plan view of the staple ST illustrated in FIG. 40. In the example illustrated in FIG. 41, the length $Y_{100}$ of the crown portion 100 is larger than half the width Yip of the tape TP.

Figure 42:
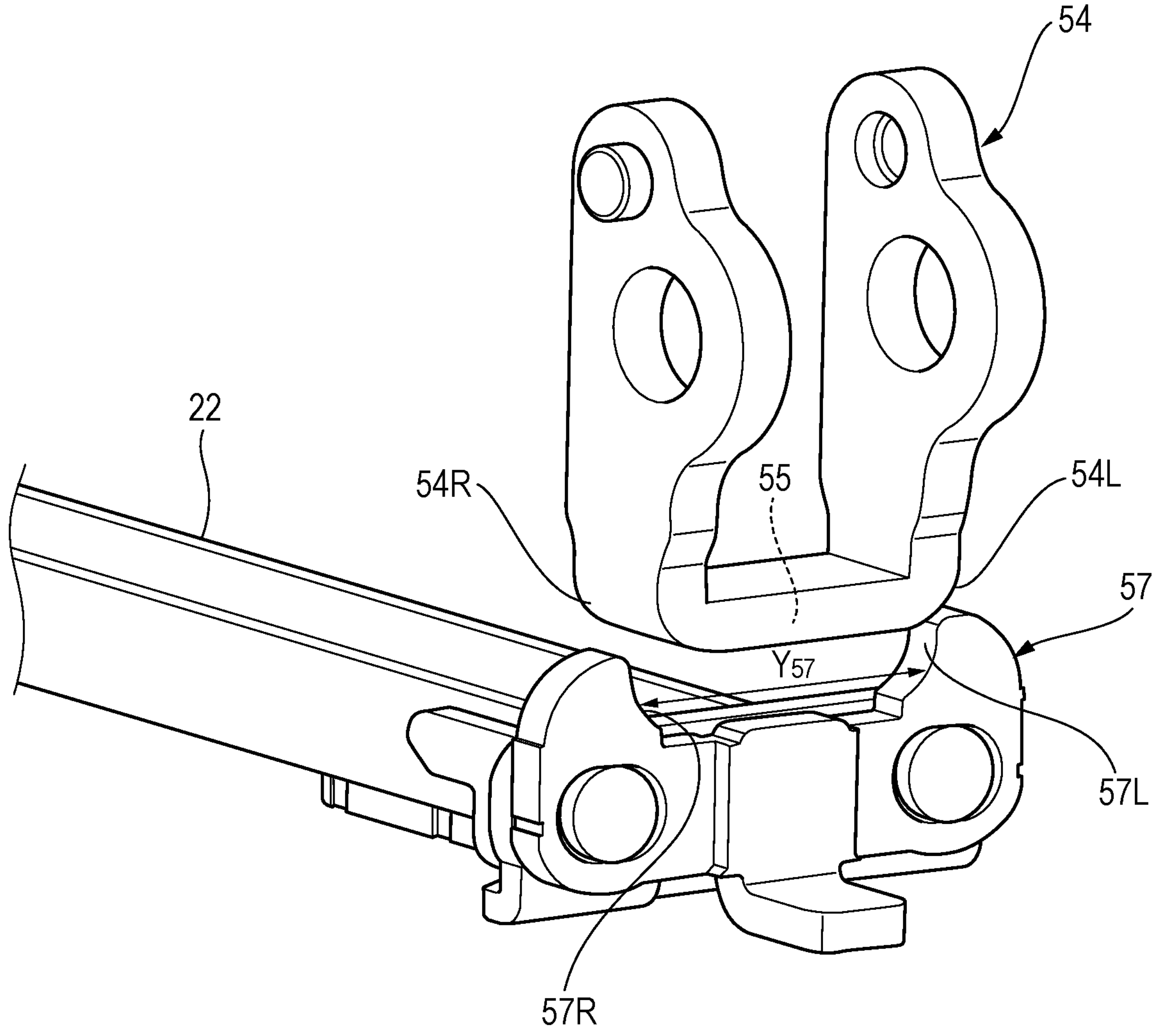
FIG. 42 is a perspective view of the clincher according to a first embodiment of the present invention.

FIG. 42 is a perspective view of the clincher 54 according to the first embodiment of the present invention. In the illustrated example, the clincher 54 is a sheet metal member integrally formed by performing press working on a rolled steel plate or the like, and is formed in a substantially U shape. At head of the staple magazine unit 22, a guiding portion 57 formed in a substantially U shape that is one size larger than the clincher 54 is provided. The guiding portion 57 regulates a position of the clincher 54 in the axial direction Y of the clincher arm 50 in a state where the clincher 54 is in close proximity to the staple magazine unit 22. The guiding portion 57 has a pair of left and right guide surfaces 57L and 57R inclined such that a gap Y57 in the axial direction Y increases toward the clincher 54.

Figure 43:
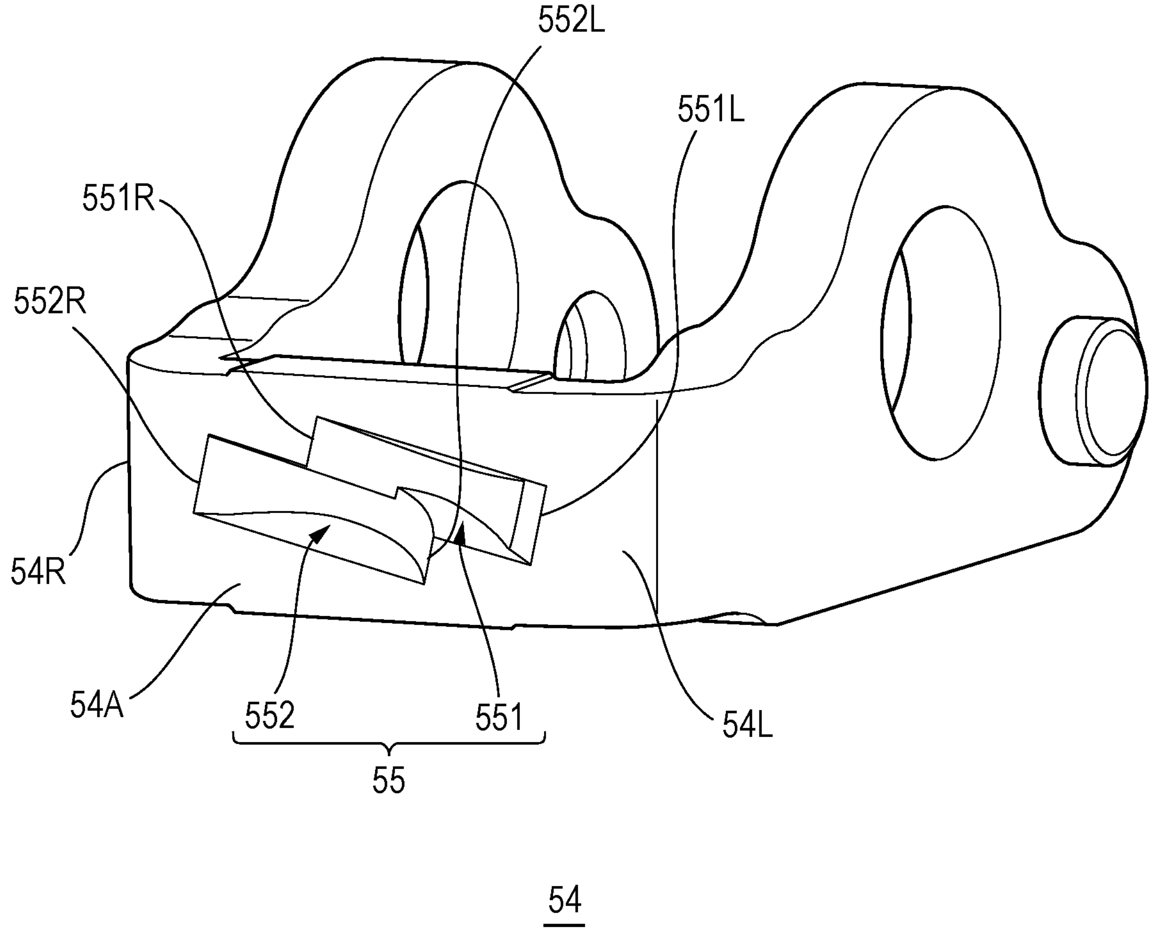
FIG. 43 is a perspective view of the clincher illustrated in FIG. 42 as viewed from a staple magazine unit.

FIG. 43 is a perspective view of the clincher 54 illustrated in FIG. 42 as viewed from the staple magazine unit 22 side. A groove 55 is provided on a surface 54A on a side facing the staple magazine unit 22. The clincher 54 has a pair of left and right surfaces 54L and 54R to be guided located on opposite sides with the groove 55 provided therebetween.

As illustrated in FIGS. 42 and 43, the surfaces 54L and 54R to be guided are inclined away from the staple magazine unit 22 as going leftward or rightward from the groove 55 at the center. In a state where the clincher 54 is in close proximity to the staple magazine unit 22, one surface 54L to be guided faces one guide surface 57L, and the other surface 54R to be guided faces the other guide surface 57R.

When a tip of the clincher arm 50 is displaced to the right or left with respect to the main handle 20 in the binding operation, one of the surfaces 54L and 54R to be guided of the clincher 54 is in sliding contact with one of the guide surfaces 57L and 57R of the guiding portion 57 correspondingly. In the guiding portion 57, the gap Y57 between the guide surfaces 57L and 57R decreases toward the staple driver 32 opposite the clincher 54. Therefore, the groove 55 of the clincher 54 is guided so as to face the leading staple ST that is driven from the staple magazine unit 22 by the staple driver 32.

Figure 44:
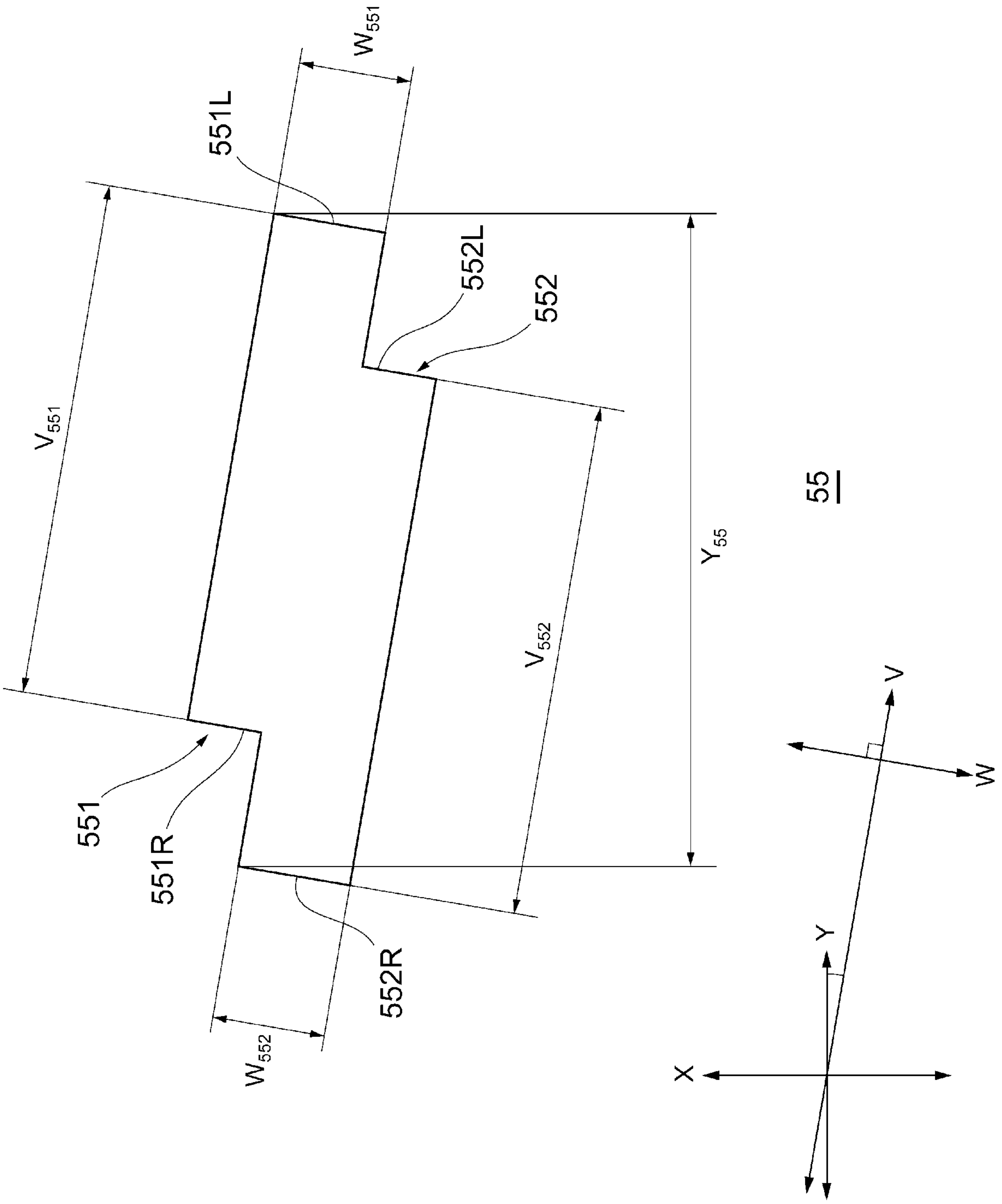
FIG. 44 is a diagram schematically illustrating a groove illustrated in FIG. 43.

The groove 55 includes a first groove 551 for guiding the first leg portion 101 of the staple ST and a second groove 552 for guiding the second leg portion 102 of the staple ST. FIG. 44 is a diagram schematically illustrating the groove 55. As illustrated in FIG. 44, the first groove 551 extends along a direction V that intersects the axial direction Y of the rotation shaft of the clincher arm 50 at an acute angle (hereinafter referred to as an acute angle direction). Similarly, the second groove 552 extends along the acute angle direction V.

A length of the first groove 551 in the acute angle direction V is taken as a first groove length $V_{551}$, and a length of the first groove 551 in a width direction W orthogonal to the acute angle direction V is taken as a first groove width $W_{551}$. Similarly, a length of the second groove 552 in the acute angle direction V is taken as a second groove length $V_{552}$, and a length of the second groove 552 in the width direction W is taken as a second groove width $W_{552}$.

The first groove 551 extends from a first end portion 551L to a second end portion 551R, and is directed, for example, from an outer side (left side) on the left side (one side) in the axial direction Y toward an inner side (right side). For example, the first groove 551 is formed such that a depth from the surface 54A gradually increases as it gets away from the first end portion 551L, and then a depth from the surface 54A gradually decreases as it approaches the second end portion 551R.

Similarly, the second groove 552 extends from a third end portion 552R to a fourth end portion 552L, and is directed, for example, from an outer side (right side) on the right side (the other side) in the axial direction Y toward an inner side (left side). For example, the second groove 552 is formed such that a depth from the surface 54A gradually increases as it gets away from the third end portion 552R, and then a depth from the surface 54A gradually decreases as it approaches the fourth end portion 552L.

The second groove 552 is disposed offset with respect to the first groove 551 in the width direction W of the grooves 551 and 552. In the illustrated example, the first groove 551 and the second groove 552 are formed so as to communicate with each other in a region between the fourth end portion 552L and the second end portion 551R. In the illustrated example, a sum of the first groove length $V_{551}$ of the first groove 551 and the second groove length $V_{552}$ of the second groove 552 is larger than a length $Y_{55}$ from the first end portion 551L to the third end portion 552R.

According to the binding machine 10 of the first embodiment of the present invention configured as described above, as illustrated in FIG. 40, the first and second leg portions 101 and 102 of the staple ST can be clinched so as to intersect with each other. Since the first and second leg portions 101 and 102 intersect with each other even when the staple ST sticks out from the tape TP, both the first and second leg portions 101 and 102 are caught in the tape TP, and the staple ST is less likely to come off from the tape TP. According to the present invention, it is possible to provide a binding machine with which the bound tape TP is less likely to come off from vines or stems of a plant even when the staple ST is displaced.

The width of the tape TP is selected according to the length $Y_{100}$ of the crown portion 100 so that the staple ST does not stick out in the width direction of the tape TP. According to the first embodiment, the clinched first and second leg portions 101 and 102 partially overlap with each other in the width direction of the crown portion 100, that is, in the longitudinal direction of the binding machine 10. Since the length $Y_{100}$ of the crown portion 100 can be made smaller than the sum of the length $Z_{101}$ of the first leg portion 101 and the length $Z_{102}$ of the second leg portion 102, the width $Y_{TP}$ of the tape TP can be reduced. As a result, the cost of the tape TP can be reduced.

According to the first embodiment, since it is not necessary to excessively shorten the lengths $Z_{101}$ and $Z_{102}$ of the first and second leg portions 101 and 102, moment at the time of bending the first and second leg portions 101 and 102 does not decrease. Since the load required to clinch the staple ST is not increased, the tape TP can be narrowed without increasing the burden on the user.

In the binding operation, it is necessary to insert the object S to be bound such as plantlets or branches between the clincher arm 50 and the main handle 20. When the clincher arm 50 is greatly rotated in the opening direction, the clincher 54 may be displaced with respect to a tip of the staple magazine unit 22. Further, in the binding operation, at the time pressing the tape TP, which is stretched between the tip of the clincher arm 50 and the tip of the main handle 20, against the object S to be bound to wind the tape TP around the object S to be bound, the clincher 54 may be displaced with respect to the tip of the staple magazine unit 22.

According to the first embodiment, the guiding portion 57 that regulates a relative position between the clincher 54 and the staple magazine unit 22 is provided at the tip of the staple magazine unit 22. Since the groove 55 of the clincher 54 is guided so as to face the leading staple ST driven from the staple magazine unit 22 by the staple driver 32, the first and second leg portions 101 and 102 can be bent reliably at the groove 55, and the first and second leg portions 101 and 102 can be bent so as to intersect with each other as described above.

[Second Embodiments of Staple and Clincher]

Figure 45:
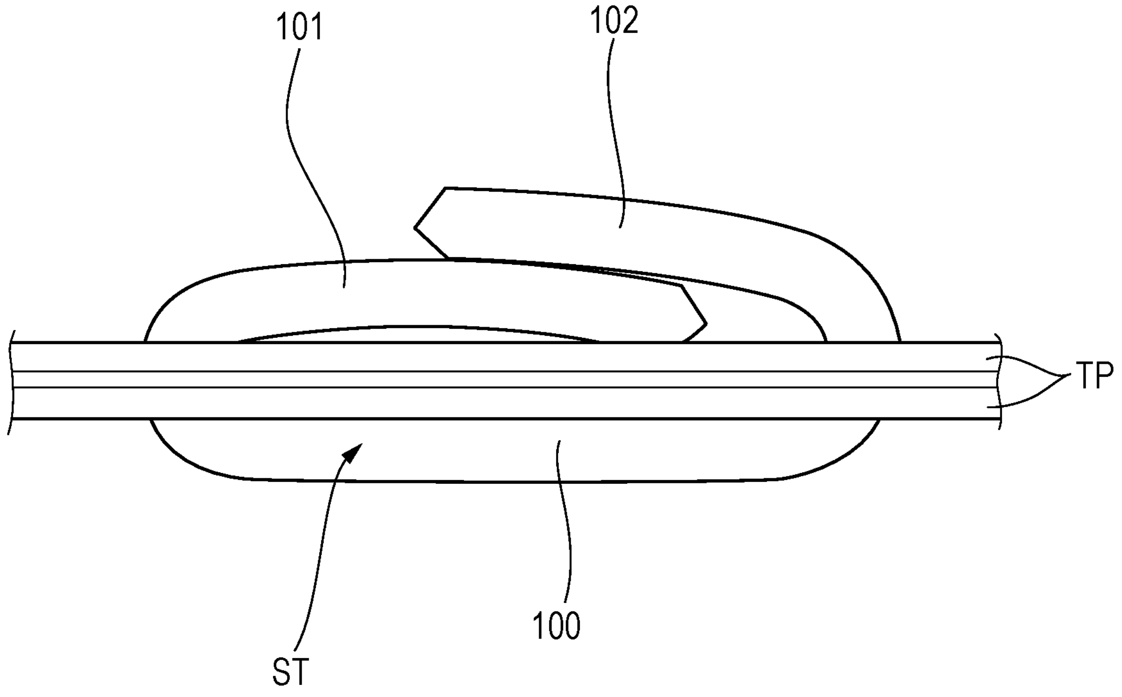
FIG. 45 is a cross-sectional view of the staple and the tape bound by a binding machine according to a second embodiment of the present invention.

For a second embodiment, description of matters common to the first embodiment will be omitted, and only different points will be described. FIG. 45 is a cross-sectional view of the staple ST and the tape TP bound by a binding machine 10 according to a second embodiment of the present invention. The second embodiment is different from the first embodiment in that the first and second leg portions 101 and 102 of the staple ST are not bent obliquely with respect to the crown portion 100 but overlap with each other in a thickness direction of the tape TP along the crown portion 100.

Figure 46:
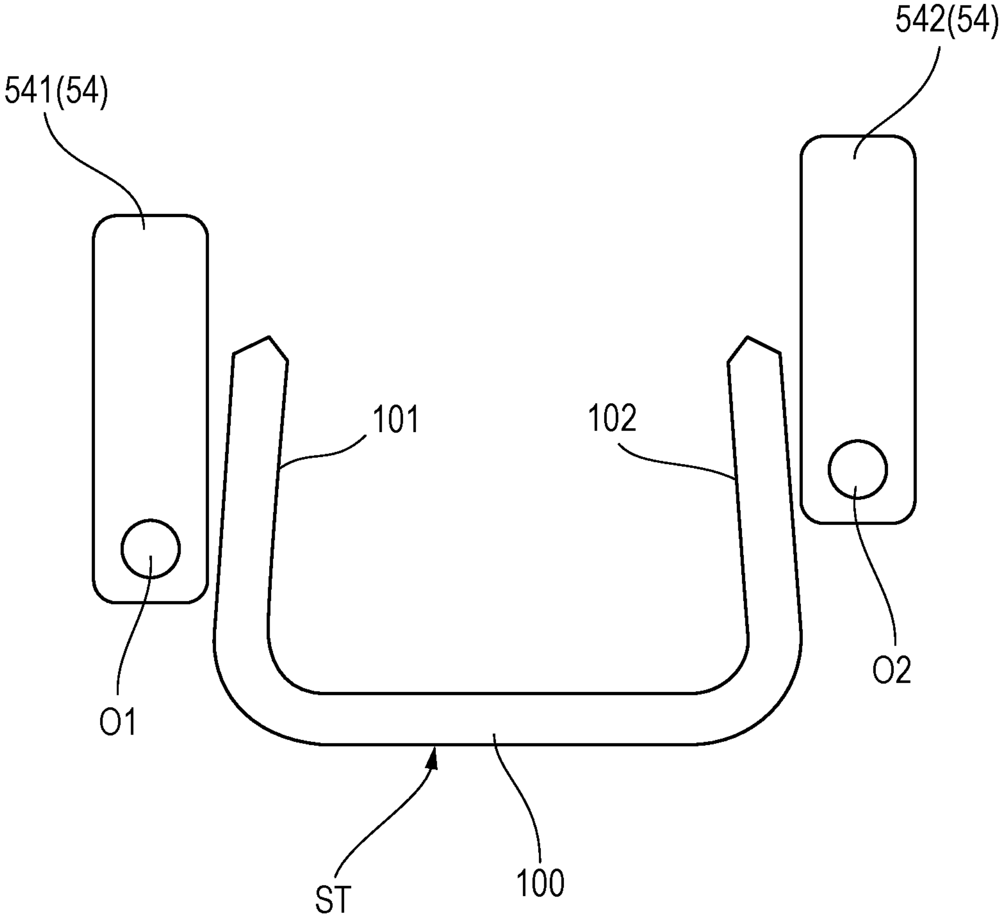
FIG. 46 is a diagram schematically illustrating an operation of the clincher according to a second embodiment of the present invention.
Figure 47:
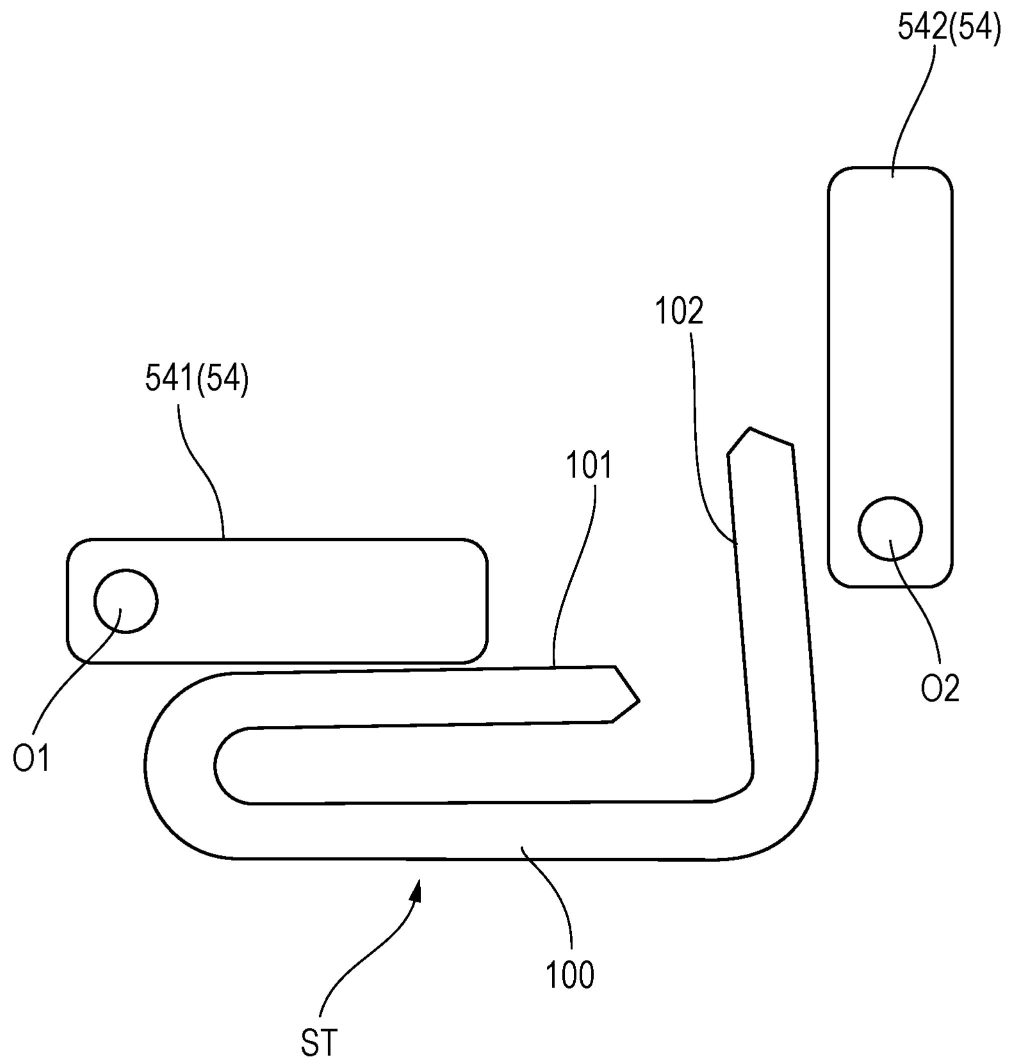
FIG. 47 is a diagram schematically illustrating an operation of the clincher following that in FIG. 46.
Figure 48:
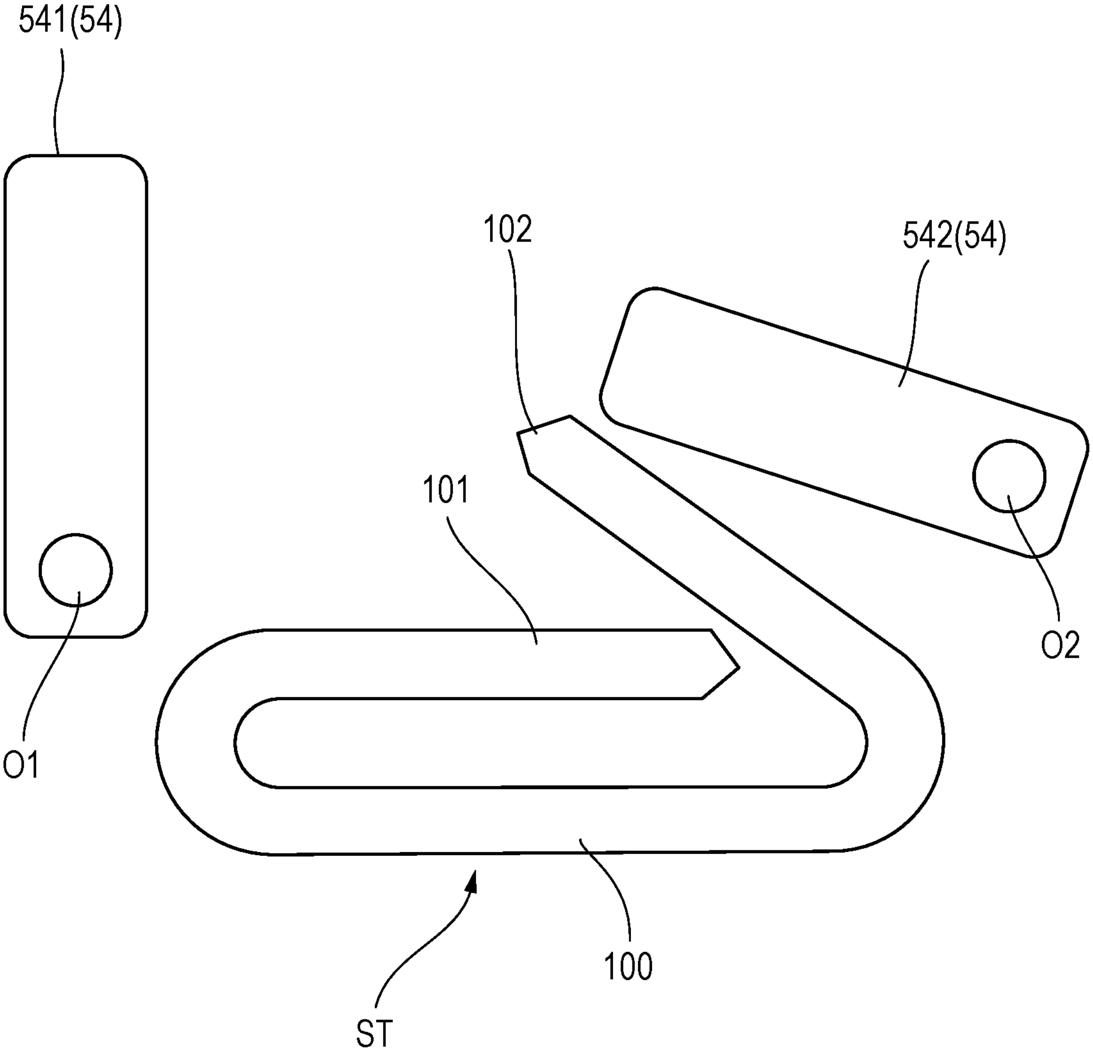
FIG. 48 is a diagram schematically illustrating an operation of the clincher following that in FIG. 47.
Figure 49:
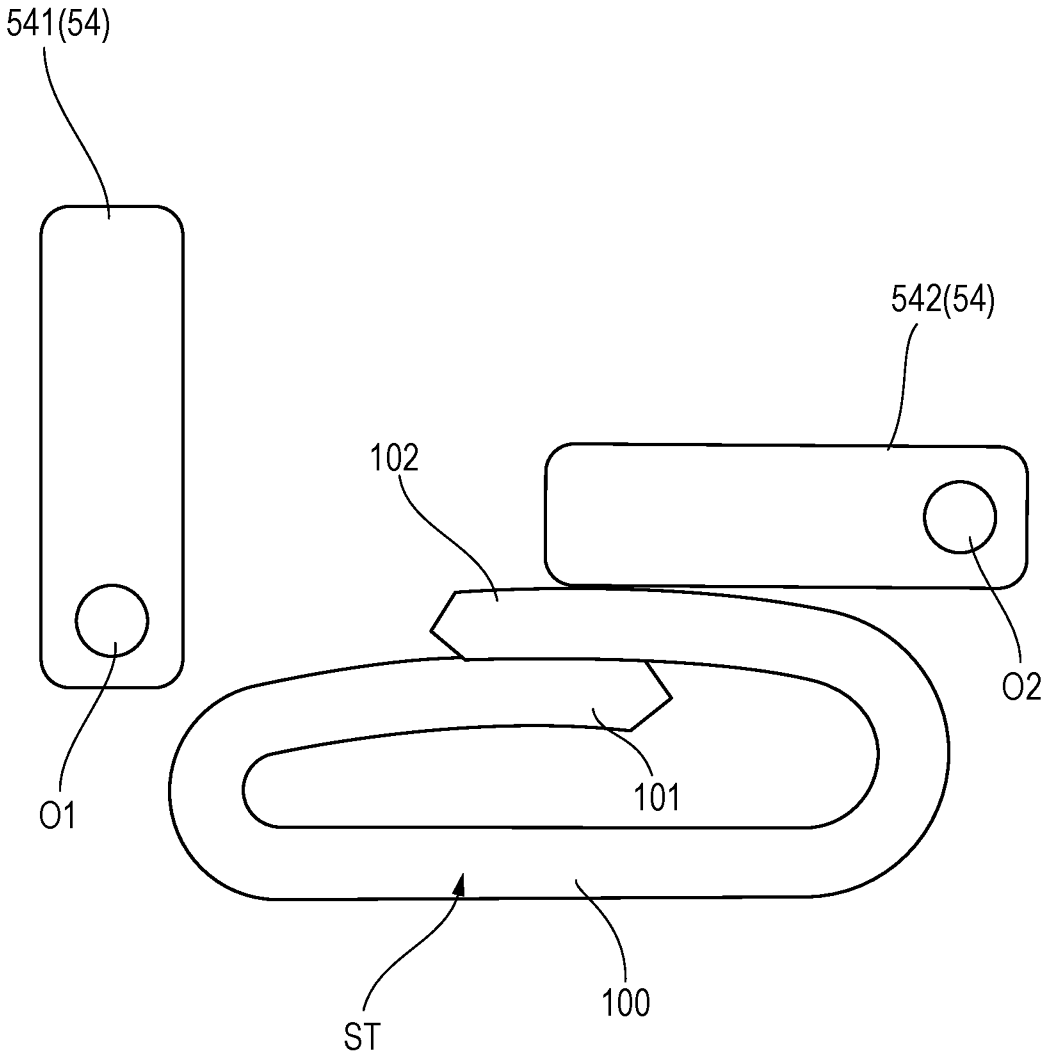
FIG. 49 is a diagram schematically illustrating an operation of the clincher following that in FIG. 48.
Figure 50:
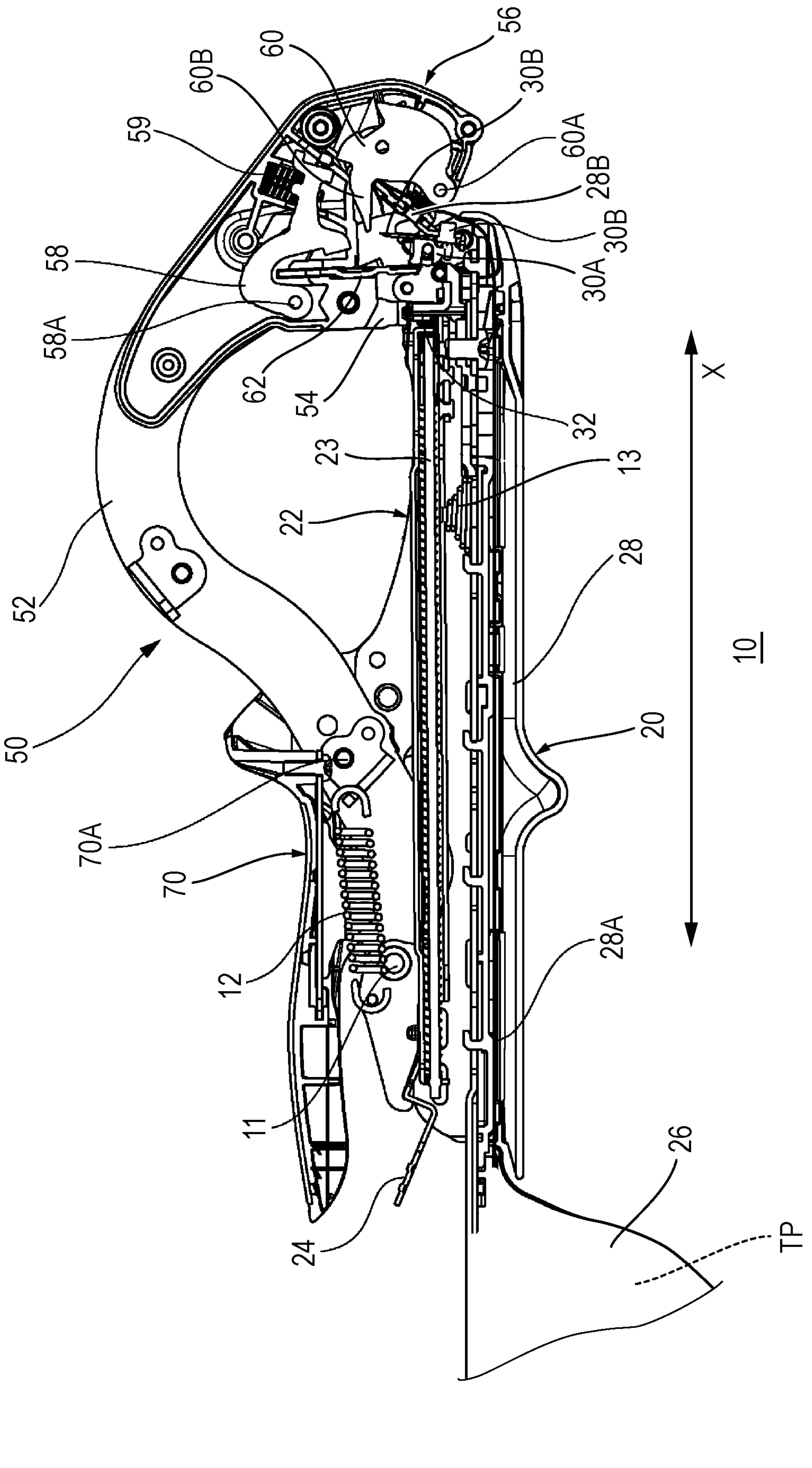
FIG. 50 is a cross-sectional view illustrating an internal structure of the binding machine common among the respective embodiments of the present invention.
Figure 51:
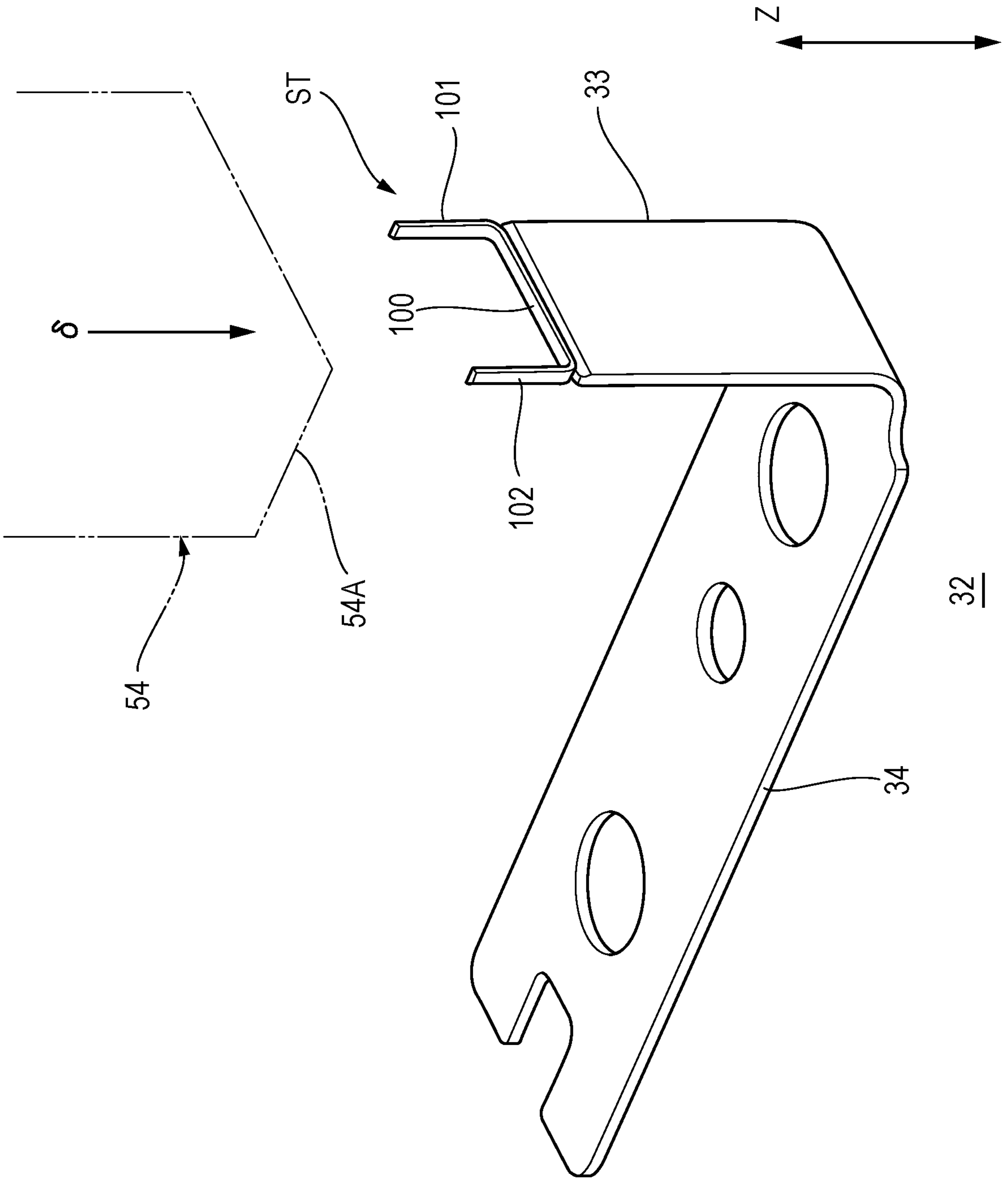
FIG. 51 is a perspective view illustrating the staple driver in a state where the driving of the staple is started.

FIGS. 46 to 49 are diagrams schematically illustrating operations of the clincher 54 according to the second embodiment of the present invention. As illustrated in FIG. 46, the clincher 54 of the second embodiment includes a pair of bending arms 541 and 542 that rotate about the centers O1 and O2 respectively. After one bending arm 541 bends the first leg portion 101 as illustrated in FIG. 47, the other bending arm 542 bends the second leg portion 102 with a time difference as illustrated in FIG. 48. Accordingly, as illustrated in FIG. 49, the first and second leg portions 101 and 102 can be folded so as to overlap with each other in the thickness direction of the tape TP.

According to the second embodiment, similarly to the first embodiment, it is possible to provide a binding machine with which the bound tape TP is less likely to come off from the vines or stems of a plant even when the staple ST is displaced.

[Stopper Structure]

A hook 22A is attached to the tip of the staple magazine unit 22. The hook 22A is locked with a shaft portion 14 fixed to the main handle 20. The staple magazine unit 22 is biased by a coil spring 13 in a direction of being separated from the main handle 20. The staple magazine unit 22 can rotate in a direction of approaching the main handle 20 against a biasing force of the coil spring 13. Meanwhile, when the hook 22A abuts the shaft portion 14, the staple magazine unit 22 cannot be separated from the main handle 20 farther from the abutting position.

Hereinafter, a characteristic structure of the binding machine 10 of each embodiment of the present invention will be described in detail. One of characteristics of the binding machine 10 according to each embodiment of the present invention is that a regulating portion 75 is provided which regulates a movement amount δ of the clincher 54 toward the leg portions 101 and 102. The regulating portion 75 according to first to fourth embodiments regulates the movement amount δ of the clincher 54 by abutting a clinch surface 54A of the clincher 54. The regulating portion 75 according to fifth to seventh embodiments regulates the movement amount δ of the clincher 54 by regulating a rotation amount of the clincher arm 50.

[First Embodiment of Stopper Structure]

Figure 52:
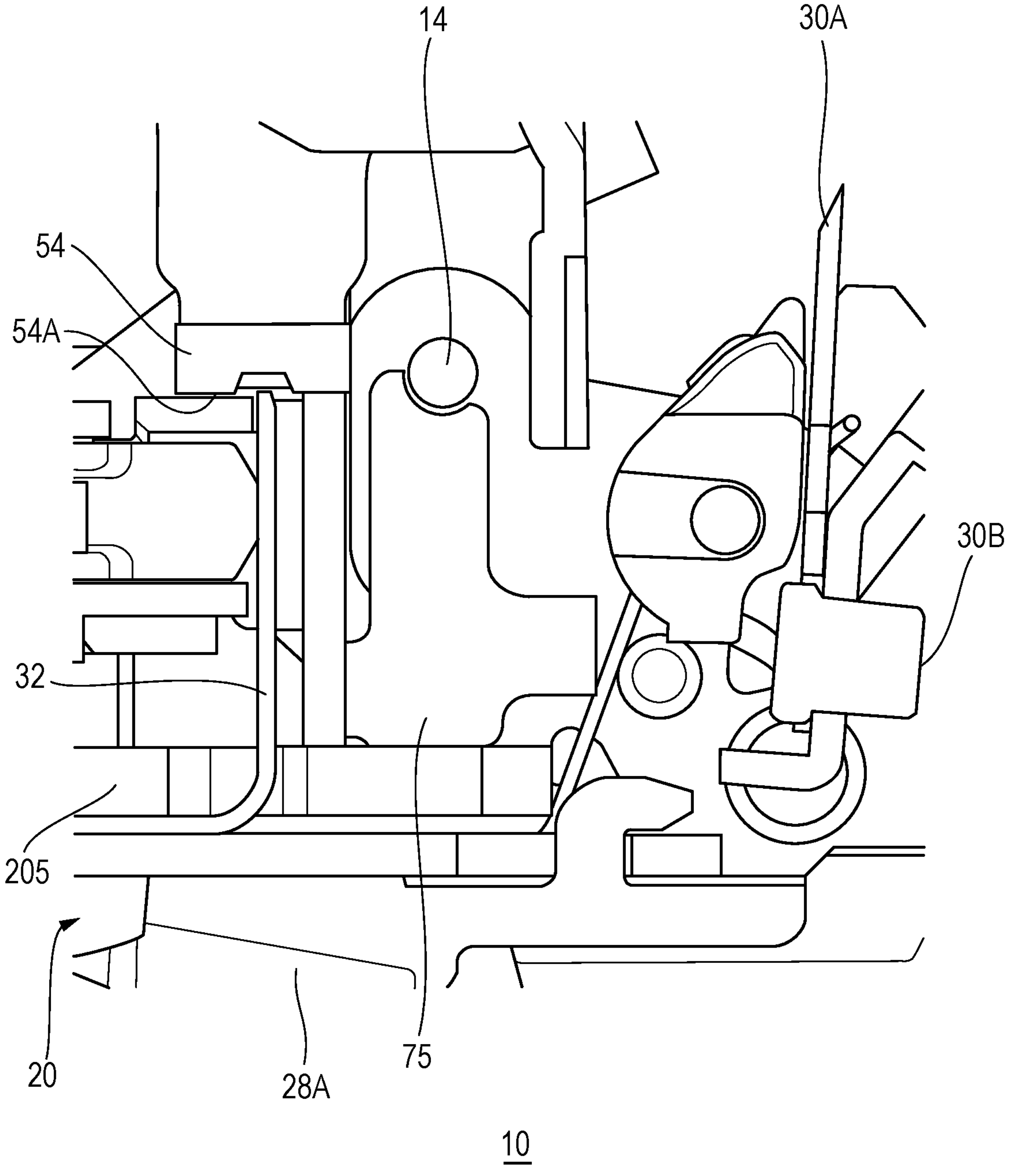
FIG. 52 is a cross-sectional view illustrating a regulating portion according to a first embodiment of the present invention.

FIG. 52 is a cross-sectional view of the regulating portion 75 according to the first embodiment of the present invention. As illustrated in FIG. 52, the regulating portion 75 abuts the clinch surface 54A of the clincher 54, and inhibits movement of the clincher 54 in an extending direction of the leg portions 101 and 102 of the staple ST, that is, in a rotation direction Z of the clincher arm 50. In the illustrated example, the regulating portion 75 is configured as an independent sheet metal member and is placed on a rigid member 205 constituting a skeleton of the main handle 20.

Figure 53:
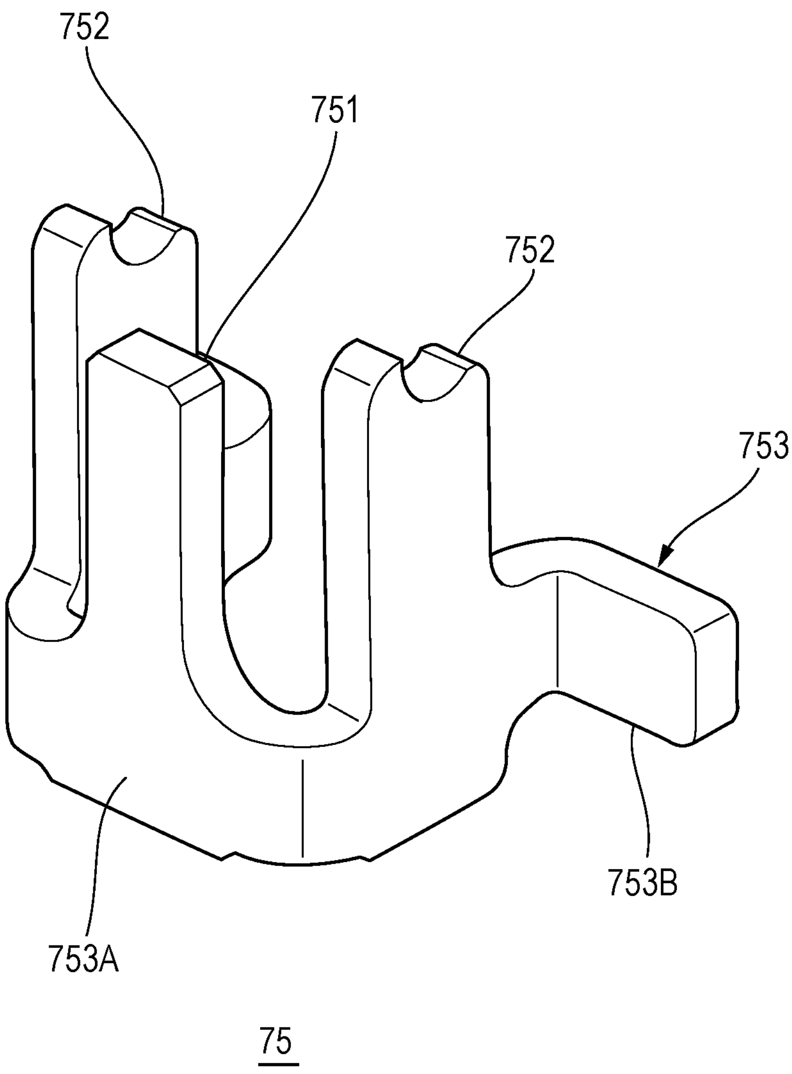
FIG. 53 is a perspective view of the regulating portion illustrated in FIG. 52 as viewed from a right rear side.

FIG. 53 is a perspective view of the regulating portion 75 illustrated in FIG. 52 as viewed from a right rear side. In the illustrated example, the regulating portion 75 includes a base portion 753 supported by the main handle 20, an abutting portion 751 protruding from the base portion 753, and a pair of left and right bearing portions 752.

The base portion 753 includes a central portion 753A that extends along the rigid member 205 of the main handle 20 and that is bent into a U shape, and blade portions 753B that protrude outward in a width direction of the main handle 20 from both ends of the central portion 753A. The abutting portion 751 abuts the clinch surface 54A of the clincher 54 to regulate a height of the clinch surface 54A.

Figure 54:
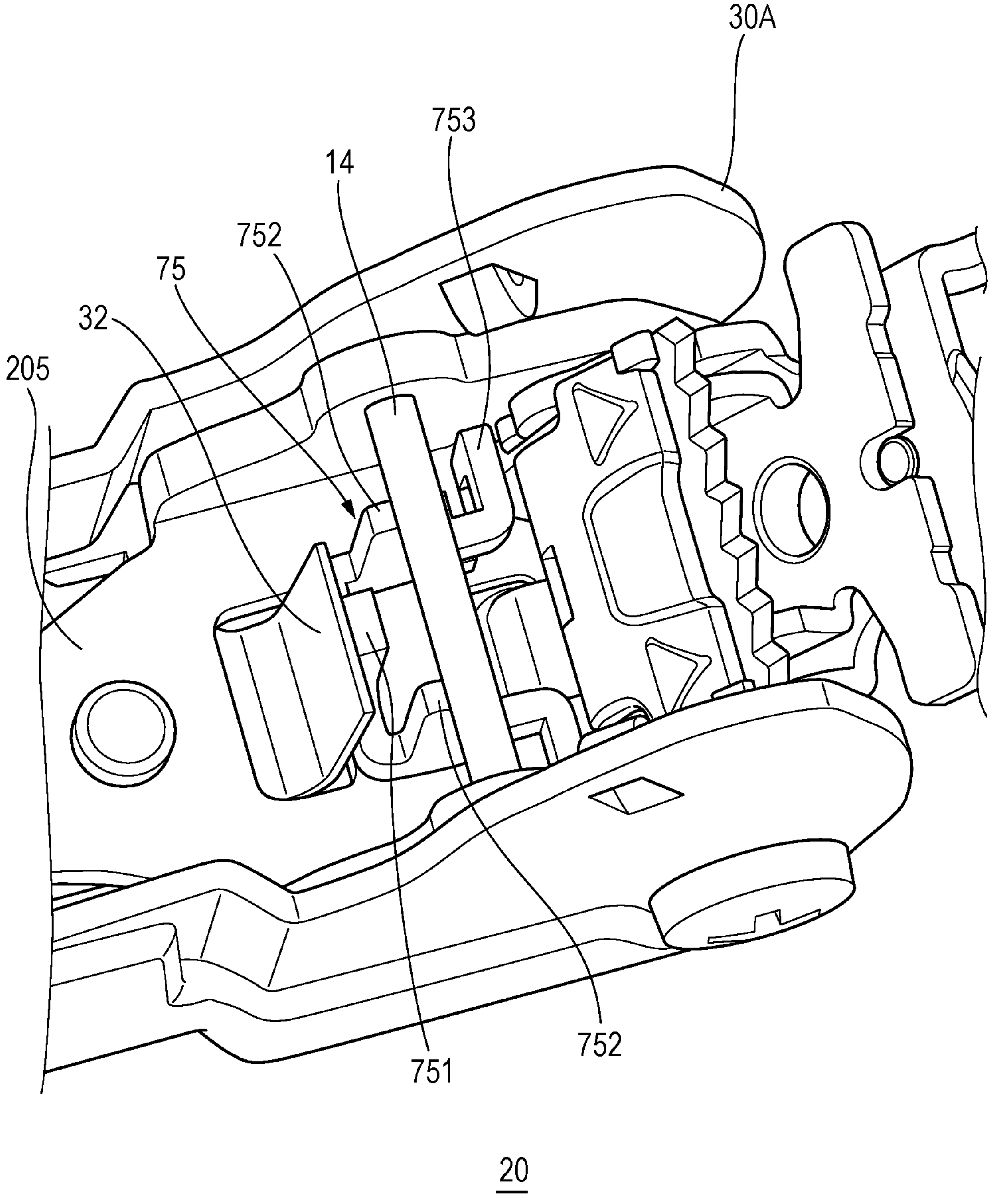
FIG. 54 is a perspective view illustrating a state where the regulating portion illustrated in FIG. 53 is attached to the main handle.

FIG. 54 is a perspective view illustrating a state where the regulating portion 75 illustrated in FIG. 53 is attached to the main handle 20. As illustrated in FIG. 54, the bearing portions 752 abut the shaft portion 14 of the main handle 20.

Since the bearing portions 752 abut the shaft portion 14, the regulating portion 75 is positioned in the longitudinal direction (front-rear direction) X of the main handle 20 and the rotation direction (upper-lower direction) Z of the clincher arm.

According to the binding machine 10 of the first embodiment of the present invention configured as described above, the movement amount δ of the clincher 54 can be regulated by the regulating portion 75 that abuts the clinch surface 54A of the clincher 54. Therefore, a load to be applied to the staple driver 32 can be limited and damage to the staple driver 32 can be prevented.

[Second Embodiment of Stopper Structure]

Figure 55:
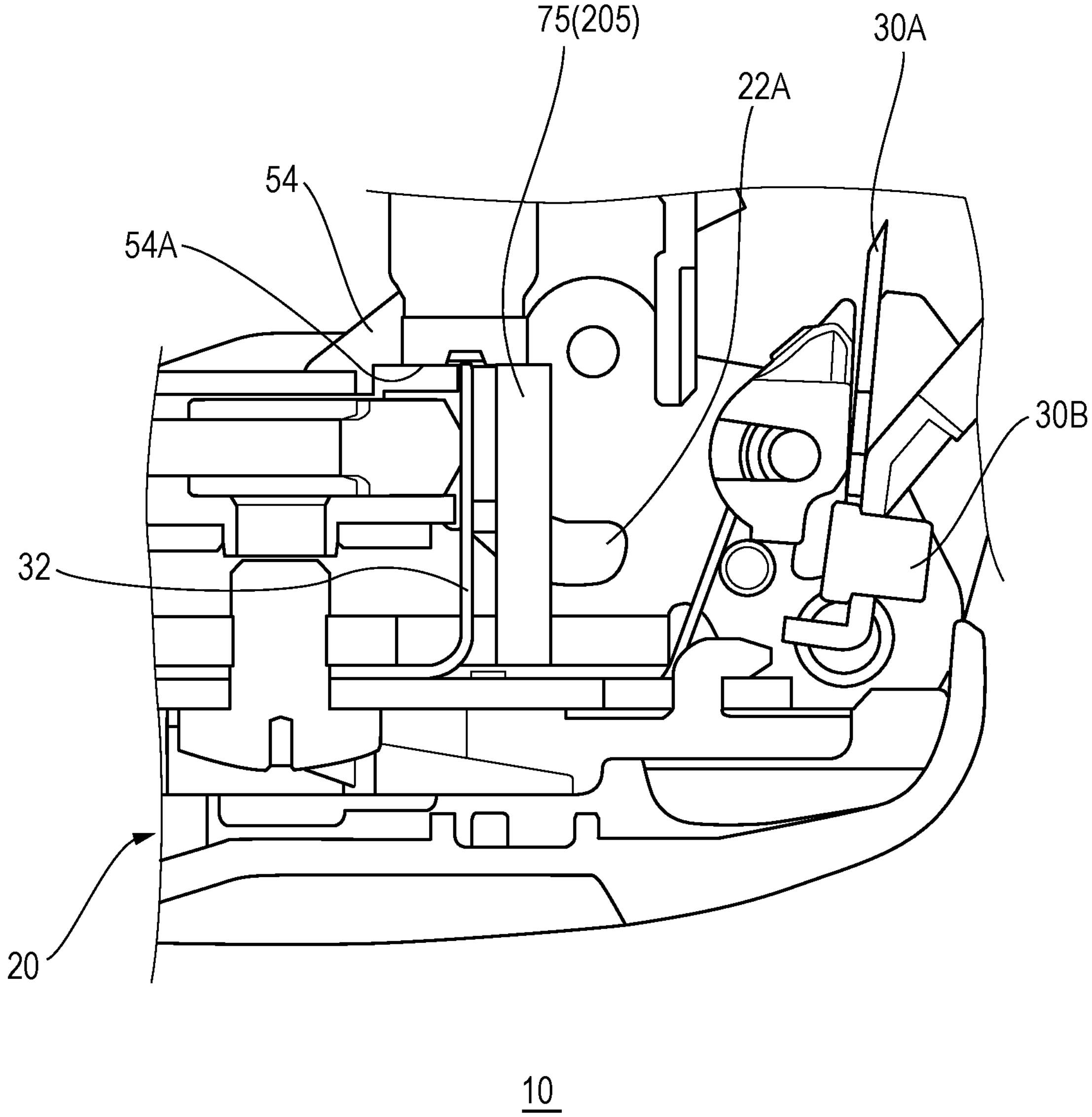
FIG. 55 is a cross-sectional view illustrating a regulating portion according to a second embodiment of the present invention.

FIG. 55 is a cross-sectional view illustrating a regulating portion 75 according to a second embodiment of the present invention. The second embodiment is different from the first embodiment in that the regulating portion 75 is formed integrally with the rigid member 205 of the main handle 20. According to the second embodiment, similarly to the first embodiment, a load to be applied to the staple driver 32 can be limited by regulating the movement amount δ of the clincher 54.

Since the regulating portion 75 is formed integrally with the rigid member 205 of the main handle 20, the regulating portion 75 is not displaced from the main handle 20. A height of the clinch surface 54A can be regulated more accurately. Since the number of components is reduced, the manufacturing costs of the binding machine 10 can be reduced.

[Third Embodiment of Stopper Structure]

Figure 56:
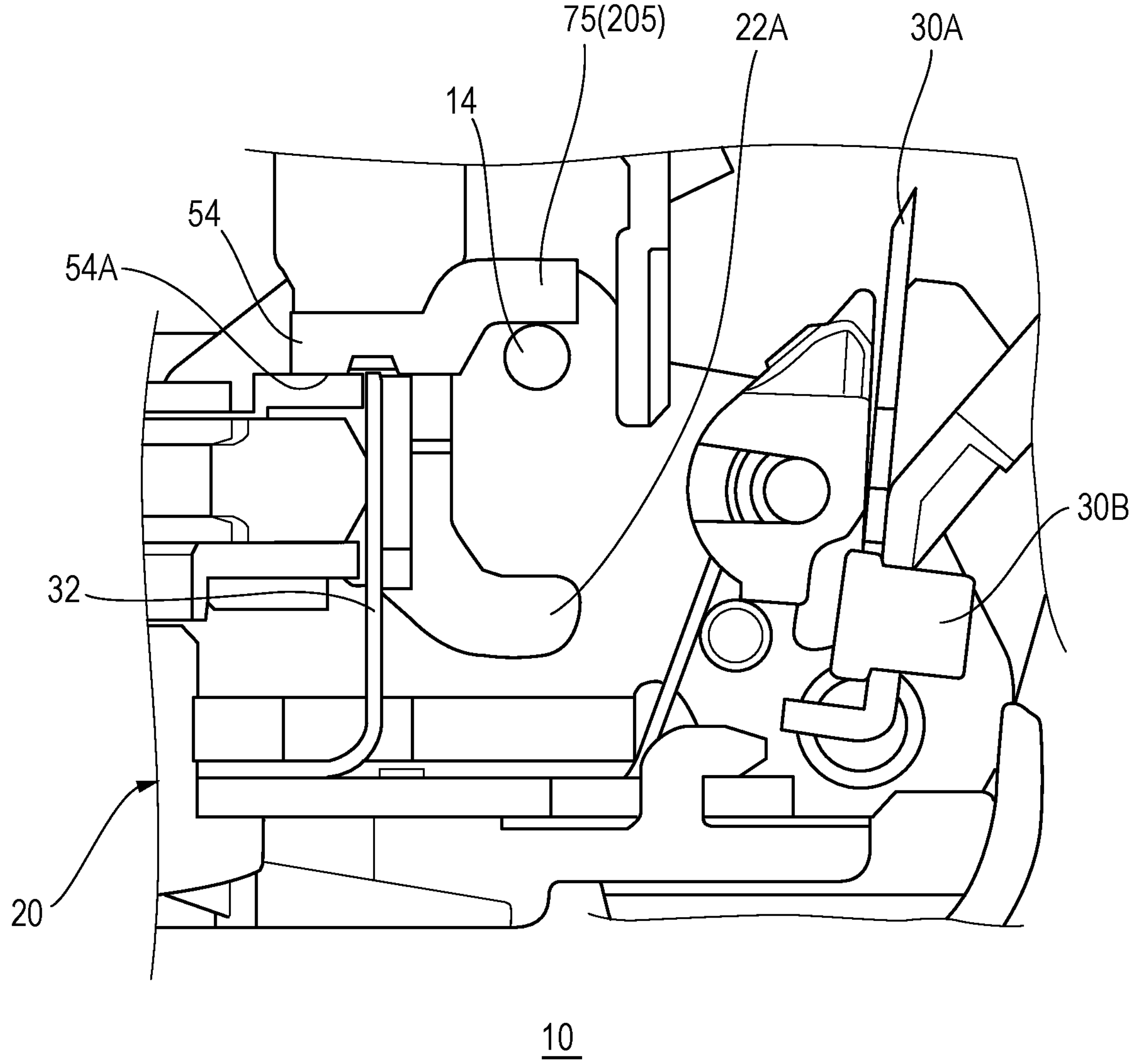
FIG. 56 is a cross-sectional view illustrating a regulating portion according to a third embodiment of the present invention.

FIG. 56 is a cross-sectional view illustrating a regulating portion 75 according to a third embodiment of the present invention. The third embodiment is different from the first embodiment in that the regulating portion 75 is a part of the clincher 54. As illustrated in FIG. 56, in the third embodiment, a part of the clincher 54 protrudes and abuts the main handle 20 (for example, the shaft portion 14) to regulate the movement amount δ of the clincher 54.

According to the third embodiment, similarly to the first embodiment, a load to be applied to the staple driver 32 can be limited by regulating the movement amount δ of the clincher 54. Since the clincher 54 and the regulating portion 75 are integrally formed, the regulating portion 75 is not displaced with respect to the clincher 54. A height of the clinch surface 54A can be regulated more accurately. Since the number of components is reduced, the manufacturing costs of the binding machine 10 can be reduced.

[Fourth Embodiment of Stopper Structure]

Figure 57:
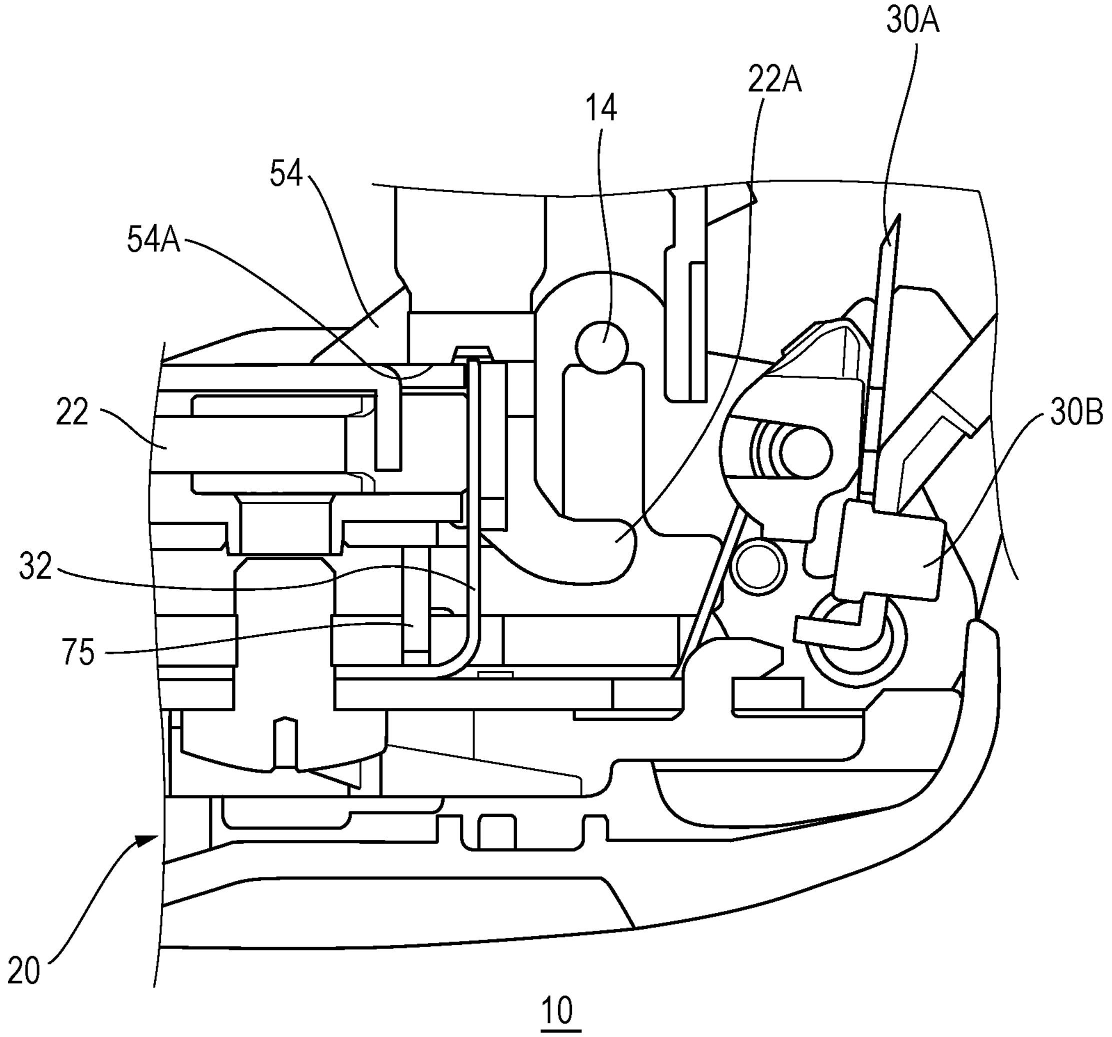
FIG. 57 is a cross-sectional view illustrating a regulating portion according to a fourth embodiment of the present invention.
Figure 58:
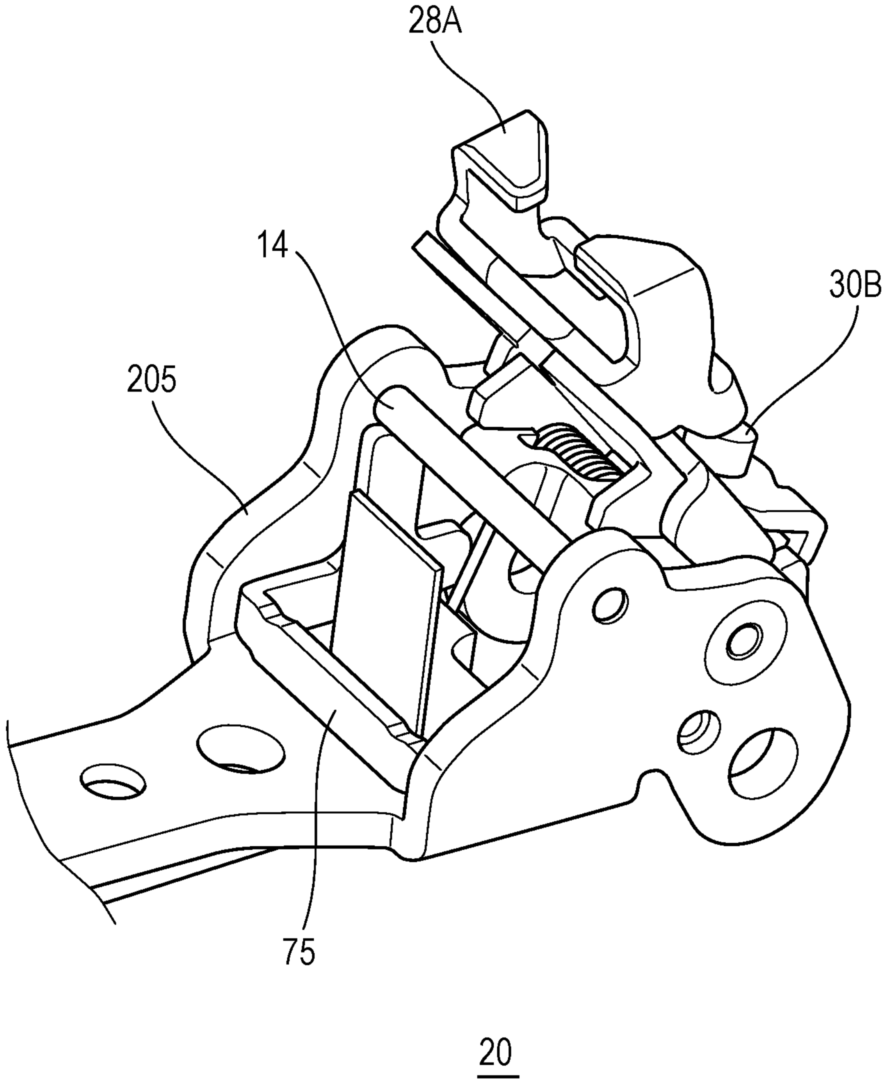
FIG. 58 is a perspective view of the regulating portion illustrated in FIG. 57 as viewed from a right rear side.

FIG. 57 is a cross-sectional view illustrating a regulating portion 75 according to a fourth embodiment of the present invention. FIG. 58 is a perspective view of the regulating portion 75 illustrated in FIG. 57 as viewed from a right rear side. The fourth embodiment is different from the first embodiment in that the regulating portion 75 abuts the clinch surface 54A of the clincher 54 via the staple magazine unit 22. Considering from a different angle, it can be said that the regulating portion 75 is configured by a combination of a first member 75 and a second member 22.

According to the fourth embodiment, similarly to the first embodiment, a load to be applied to the staple driver 32 can be limited by regulating the movement amount δ of the clincher 54. Since the regulating portion 75 does not directly abut the clinch surface 54A of the clincher 54, the degree of freedom in design of the binding machine 10 is improved.

On the other hand, since the regulating portion 75 does not directly abut the clincher 54, dimensional errors of other members interposed between the regulating portion 75 and the clincher 54 are included in the positioning accuracy of the clincher 54. Further, when the operation handle 70 is strongly gripped, the member sandwiched between the regulating portion 75 and the clincher 54 may be deformed.

[Fifth Embodiment of Stopper Structure]

Figure 59:
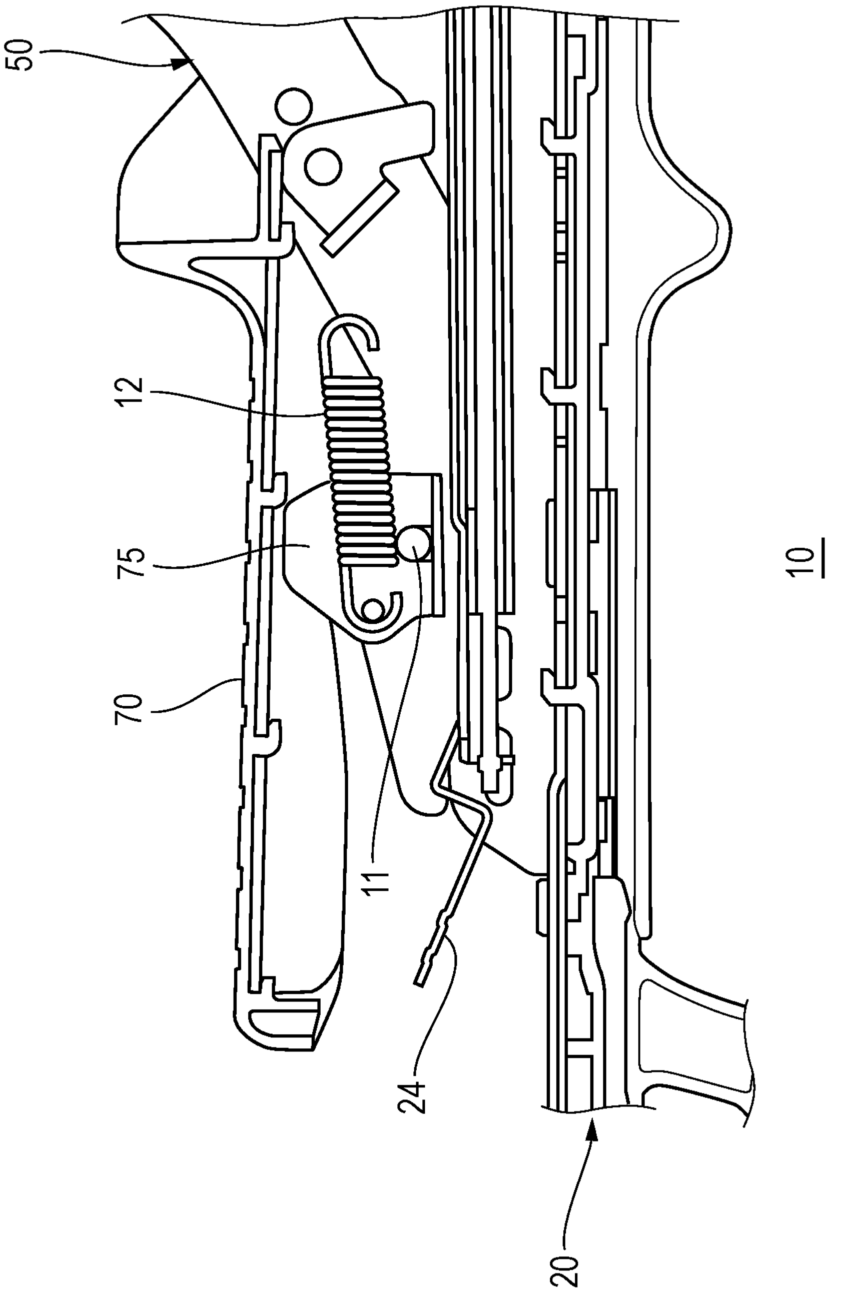
FIG. 59 is a cross-sectional view illustrating a regulating portion according to a fifth embodiment of the present invention.

FIG. 59 is a cross-sectional view illustrating a regulating portion 75 according to a fifth embodiment of the present invention. The fifth embodiment is different from the first to fourth embodiments described above in that the regulating portion 75 abuts the operation handle 70 or the main handle 20 at a portion that faces the operation handle 70 instead of abutting the clincher 54. When the regulating portion 75 abuts the operation handle 70 or the main handle 20, the handle cannot be further gripped. Since the rotation amount of the clincher arm 50 driven by the operation handle 70 is regulated, the movement amount δ of the clincher 54 is regulated.

According to the fifth embodiment, similarly to the first embodiment, a load to be applied to the staple driver 32 can be limited by regulating the movement amount δ of the clincher 54. Since the regulating portion 75 can be disposed on an operation handle 70 side with a margin in space, instead of being disposed at the tip portion 201 of the main handle 20 having strict restriction in space, the degree of freedom in design of the binding machine 10 is improved. On the other hand, since there is an error between a position of the operation handle 70 and a rotation amount of the clincher arm 50, it is difficult to accurately regulate the movement amount δ of the clincher 54 as compared with the first embodiment.

[Sixth Embodiment of Stopper Structure]

Figure 60:
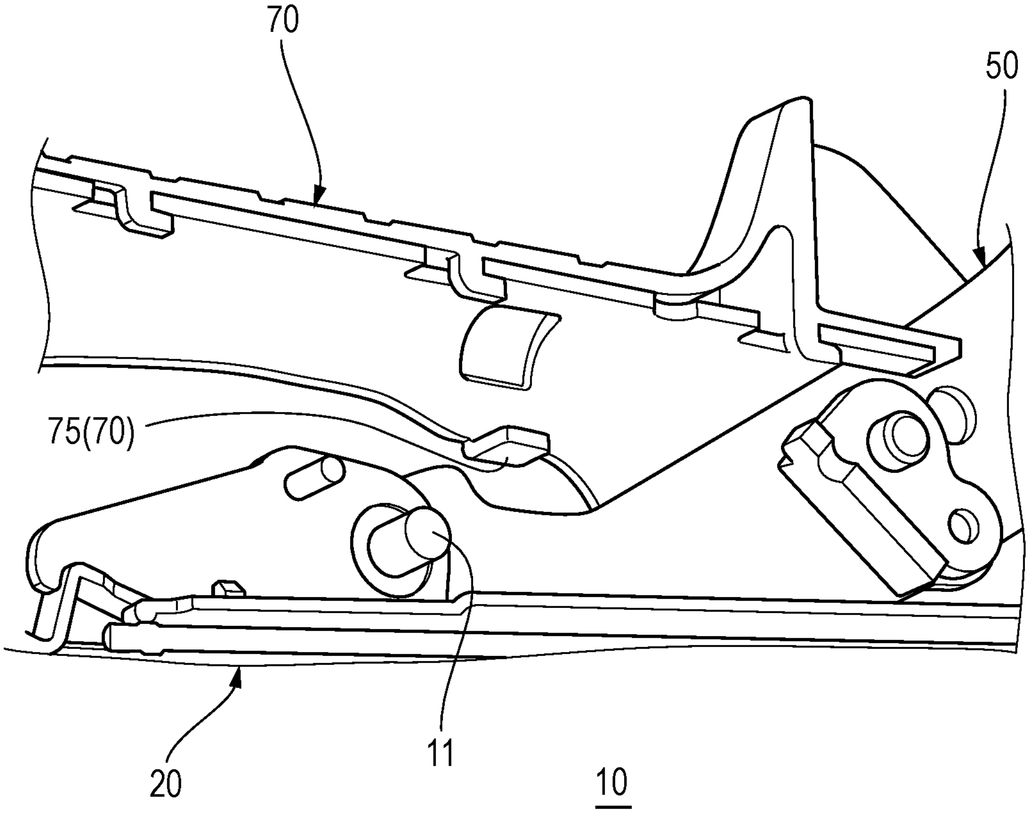
FIG. 60 is a cross-sectional view illustrating a regulating portion according to a sixth embodiment of the present invention.

FIG. 60 is a cross-sectional view illustrating a regulating portion 75 according to a sixth embodiment of the present invention. The sixth embodiment is different from the fifth embodiment in that the regulating portion 75 is formed integrally with the operation handle 70. According to the sixth embodiment, similarly to the fifth embodiment, a load to be applied to the staple driver 32 can be limited by regulating a rotation amount of the clincher arm 50.

If the operation handle 70 and the regulating portion 75 are formed integrally, the regulating portion 75 is not displaced with respect to the operation handle 70. If the main handle 20 and the regulating portion 75 are formed integrally, the position of the regulating portion 75 is not displaced with respect to the main handle 20. The rotation amount of the clincher arm 50 can be regulated more accurately. Since the number of components is reduced, the manufacturing costs of the binding machine 10 can be reduced.

Further, in the sixth embodiment, instead of causing the regulating portion 75 to abut the main handle 20, the regulating portion 75 may abut the clincher arm 50 so as to regulate the rotation amount of the clincher arm 50 and limit the load to be applied to the staple driver 32.

[Seventh Embodiment of Stopper Structure]

Figure 61:
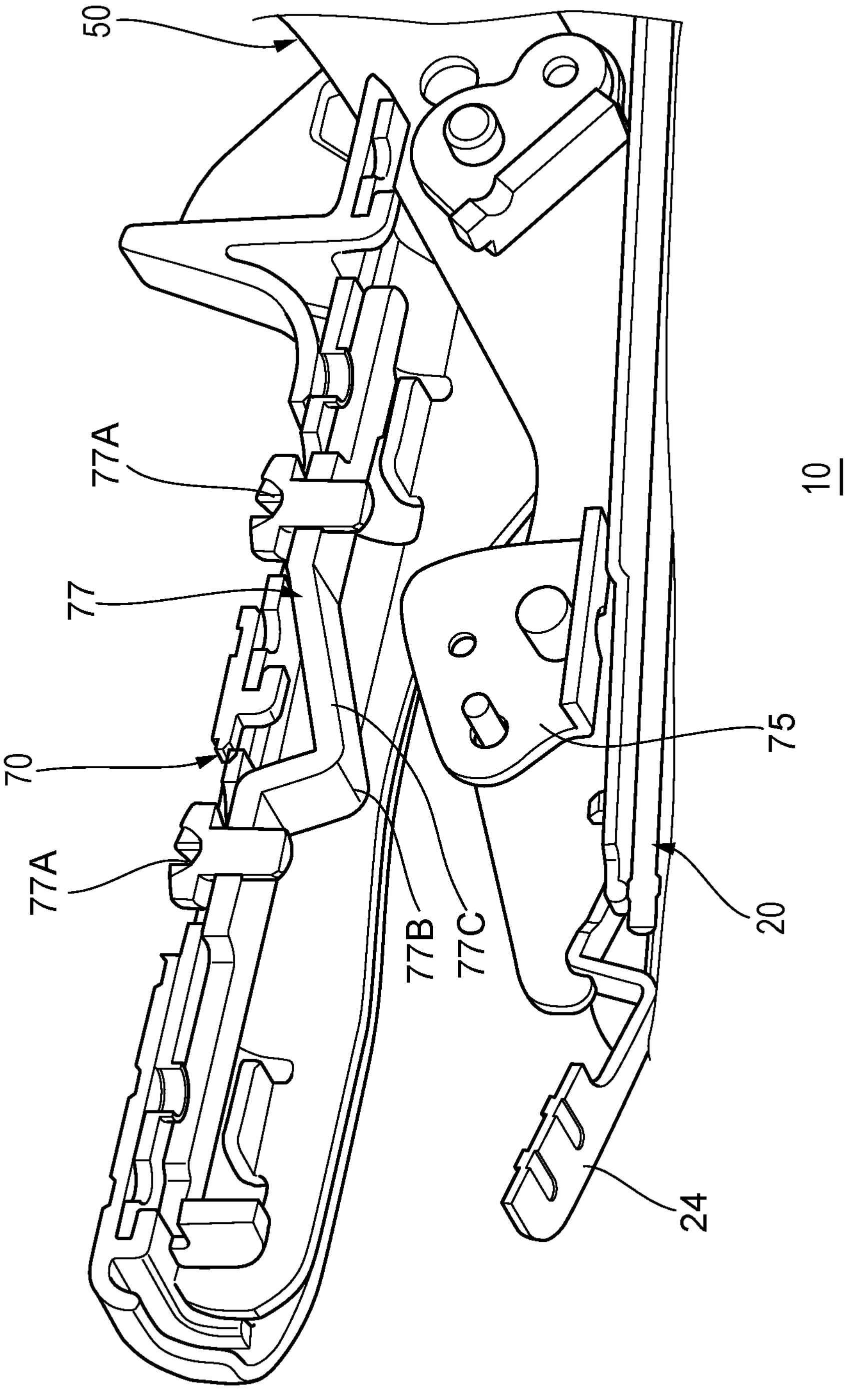
FIG. 61 is a cross-sectional view illustrating a regulating portion according to a seventh embodiment of the present invention.

FIG. 61 is a cross-sectional view illustrating a regulating portion 75 according to a seventh embodiment of the present invention. The seventh embodiment is different from the fifth embodiment in that a gap between the regulating portion 75 and an abutted portion 77 that the regulating portion 75 abuts is adjustable. Specifically, a screw member 77A is loosened to change a position of the abutted portion 77, and thereafter the screw member 77A is tightened, thereby changing a position of a protrusion 77B of the abutted portion 77. Accordingly, a gap between an inclined surface 77C of the abutted portion 77 and the regulating portion 75 is adjusted. According to the seventh embodiment, similarly to the fifth embodiment, a load to be applied to the staple driver 32 can be limited by regulating a rotation amount of the clincher arm 50.

In a case where the regulating portion 75 is disposed on the operation handle 70 or on the main handle 20 at a portion facing the operation handle 70, it is difficult to accurately regulate the movement amount δ of the clincher 54 due to an error between a position of the operation handle 70 and the rotation amount of the clincher arm 50, which is an individual difference of the binding machine 10. According to the seventh embodiment, since the error can be adjusted for each individual binding machine 10, the movement amount δ of the clincher 54 can be accurately regulated.

The present invention can be variously modified without departing from the gist thereof. For example, a part of the components in one embodiment may be added to another embodiment within the ordinary creativity of a person skilled in the art. Further, a part of the components in one embodiment can be replaced with corresponding components in another embodiment.

According to an aspect of the invention, binding machine, includes: an accommodating portion configured to accommodate a wound binding tape; a main handle configured to guide the binding tape accommodated in the accommodating portion such that a part of the binding tape is allowed to be pulled out from one end of the main handle; and a clincher arm rotatably provided to the main handle, the clincher arm including a holding portion configured to hold the part of the binding tape pulled out from the one end of the main handle, and a binding portion configured to wrap the part of the binding tape held by the holding portion around objects to be bound and bind the part of the binding tape. The accommodating portion includes, with the wound binding tape in an accommodated state, a side wall portion that faces a side surface of the binding tape, and a circumferential portion that is continuous with the side wall portion, faces a front surface of the binding tape, and is provided with an opening for accommodating the binding tape in a part of the circumferential portion.

According to another aspect of the invention, a binding machine, includes an accommodating portion that includes, with a wound binding tape being accommodated therein, a first inner wall surface that faces at least a part of a circular side surface of the binding tape, a second inner wall surface that faces at least a part of another circular side surface of the binding tape, and a third inner wall surface that connects the first inner wall surface and the second inner wall surface and that is provided with an opening for accommodating the binding tape.

The binding machine may further includes an engaging portion movable back and forth in an axial direction of the accommodating portion and configured to engage with the binding tape accommodated in the accommodating portion. The binding machine may further includes an abutting portion configured to press a part of the side surface of the binding tape accommodated in the accommodating portion. The binding machine may further includes a slit extending in a radial direction of the accommodating portion is provided in the accommodating portion. The binding machine may further includes a rib extending in a circumferential direction of the accommodating portion is provided on the accommodating portion. The binding machine may further includes a hook attaching tool. The hook attaching tool may include: a first attachment portion that has a first protrusion and a first recess and that is provided on one side surface facing an axial direction of the accommodating portion; and a second attachment portion that has a second protrusion having a same structure as the first protrusion and a second recess having a same structure as the first recess, and that is provided symmetrically with the first attachment portion on another side surface facing the axial direction of the accommodating portion.

According to another aspect of the invention, a binding machine, includes: an accommodating portion provided, in a side surface thereof, with an opening for accommodating a wound binding tape; and an engaging portion protruding from another side surface of the accommodating portion toward the opening and configured to engage with the binding tape.

APPENDIXES

Technical ideas that can be understood from the above-described embodiments and modifications thereof will be described below.

Appendix A

A1.

A binding machine, including: a staple magazine unit that accommodates a staple including a crown portion and a pair of leg portions;

- a staple driver that is provided at a position facing the crown portion;
- a clincher that is provided at a position facing tip portions of the leg portions and that is movable along an extending direction of the leg portions; and
- a regulating portion that regulates a movement amount of the clincher toward the leg portions, in which
- the clincher moves toward the leg portions along the extending direction to sandwich and bend the staple together with the staple driver.

A2.

The binding machine according to A1, in which the regulating portion abuts a clinch surface of the clincher to regulate the movement amount of the clincher.

A3.

The binding machine according to A1 or A2, further including: a clincher arm that is attached to a main handle, to which the staple magazine unit is attached, and that includes the clincher, in which the movement amount of the clincher is regulated by regulating a rotation amount of the clincher arm.

Appendix B

B1.

A binding machine, including: a main handle in which a staple is accommodated and to which a staple driver capable of driving the staple is attached; and

- a clincher arm that is rotatably attached to the main handle and includes a clincher configured to clinch the staple driven by the staple driver, in which
- the staple driver includes
  - a driving portion that extends in a direction of separating from the main handle and that drives the staple toward the clincher, and
  - an attachment portion with which the driving portion is attached to the main handle, in which
  - the attachment portion is configured to extend from a side edge of the driving portion in a longitudinal direction of the main handle.

B2.

The binding machine according to B1, in which the staple driver is attached to the main handle so as to be displaceable with respect to the main handle.

B3.

The binding machine according to B1 or B2, in which the clincher arm is provided such that when the clincher arm is rotated in a closing direction in which an angle between the clincher arm and the main handle is reduced, the staple driver is able to drive the staple, and the staple driver is attached to the main handle so as to be displaceable with respect to the main handle, so that an end portion of the driving portion, which is disposed on a main handle side, is located at a first position in a state where the clincher arm is rotated in the closing direction, and the end portion of the driving portion, which is disposed on the main handle side, is located at a second position closer to a tip portion of the main handle than the first position in a state where the clincher arm is rotated in an opening direction opposite the closing direction.

B4.

The binding machine according to any one of B1 to B3, further including: a washer member that is disposed between the staple driver and the main handle and has a surface on which the staple driver slides.

B5.

The binding machine according to any one of B1 to B4, further including: a biasing member that biases the staple driver in a first direction toward the tip portion of the main handle, and in a second direction of approaching the main handle.

Appendix C

C1.

A binding machine, including: a staple accommodating portion that includes a tip portion and a base end portion, and that is capable of accommodating at least in the tip portion a U-shaped staple having a crown portion and a pair of leg portions, with the crown portion being on a lower side;

a staple driver that is located below the tip portion of the staple accommodating portion, is configured to be movable relative to the staple accommodating portion from a lower side toward an upper side in the staple accommodating portion, and pushes out the staple located at the tip portion upwardly while pushing the crown portion of the staple by moving from the lower side toward the upper side;

a clincher that is provided at a position above the tip portion of the staple accommodating portion and facing the staple driver, and is configured to abut the pair of leg portions of the staple pushed out in a process of the staple driver moving from the lower side toward the upper side so as to bend the pair of leg portions; and a staple guide portion that is adjacent to the staple in the staple accommodating portion and supports the crown portion of the staple from a base end portion side in a process of the staple being pushed out.

C2.

The binding machine according to C1, in which the staple guide portion has an extension portion extending into the staple accommodating portion.

C3.

The binding machine according to C2, in which the staple accommodating portion has a bottom wall portion along the crown portion of the staple accommodated in the staple accommodating portion, and a pair of side wall portions extending from the bottom wall portion and along the pair of leg portions of the staple respectively, the staple guide portion is provided to stretch between the pair of side wall portions, and the extension portion is located between the pair of leg portions of the staple.

C4.

The binding machine according to C1, in which the staple driver includes a driving portion that abuts the crown portion of the staple to push out the staple, and the staple guide portion that extends from the driving portion and has a wall surface facing a rearward surface of a leading staple driven by the driving portion and separated from other staples.

C5.

The binding machine according to any one of C1 to C4, in which the staple accommodating portion is rotatably attached to a main handle, from a tip portion of which a tape is able to be pulled out, the staple driver is disposed between the staple accommodating portion and the main handle, and the clincher is attached to a clincher arm that is rotatably attached to the main handle.

C6.

The binding machine according to C5, in which the clincher arm includes a tape holding mechanism that holds a tape located at the tip portion of the main handle when a first rotation to approach the main handle is performed, and when a second rotation to approach the main handle again is performed, after the clincher arm is rotated to be separated from the main handle in a direction opposite to that in the first rotation in a state where the tape is held by performing the first rotation, the staple driver pushes out the staple from the staple accommodating portion and the clincher bends the pair of leg portions of the staple that is pushed out.

Appendix D

D1.

A binding machine that binds an object to be bound using a tape, the binding machine including:

a staple magazine unit that is capable of accommodating a plurality of staples arranged in a row;

a main handle to which the staple magazine unit is attached;

a clincher arm that is rotatably attached to the main handle so as to be capable of approaching a leading staple of the plurality of staples arranged in a row; and a clincher that is provided on the clincher arm, and is configured to bend the leading staple, which is driven from the staple magazine unit and penetrates overlapped portions of the tape, when the clincher arm is rotated to approach the leading staple, in which the clincher is formed, on a surface thereof, with a first groove that extends in an acute angle direction with respect to a rotation shaft direction of the clincher arm and has a first groove length and a first groove width, and a second groove that extends in an acute angle direction with respect to the rotation shaft direction of the clincher arm and has a second groove length and a second groove width, in which the second groove is disposed offset with respect to the first groove in a width direction.

D2.

The binding machine according to D1, further including: a guiding portion that is provided at a tip of the staple magazine unit, and that regulates a position of the clincher in the rotation shaft direction of the clincher arm in a state where the clincher is in close proximity to the staple magazine unit, in which the guiding portion has a pair of guide surfaces inclined such that a gap therebetween increases toward the clincher, the clincher has the first groove and the second groove, and a pair of surfaces to be guided that are located on opposite sides with the first groove and the second groove provided therebetween and that are inclined away from the staple magazine unit as getting away from the first groove and the second groove, and in a state where the clincher is in close proximity to the staple magazine unit, one of the surfaces to be guided faces one of the guide surfaces, and the other of the surfaces to be guided faces the other of the guide surfaces.

D3.

The binding machine according to D1 or D2, in which the second groove is disposed offset with respect to the first groove in a length direction.

D4.

The binding machine according to any one of D1 to D3, in which the first groove extends from a first end portion thereof to a second end portion thereof, being directed from an outer side on one side in the rotation shaft direction toward an inner side, and is formed such that a depth from the surface gradually increases as it gets away from the first end portion and a depth from the surface gradually decreases as it approaches the second end portion.

D5

The binding machine according to any one of D4, in which the second groove extends from a third end portion thereof to a fourth end portion thereof, being directed from an outer side on the other side in the rotation shaft direction toward an inner side, and is formed such that a depth from the surface gradually increases as it gets away from the third end portion and a depth from the surface gradually decreases as it approaches the fourth end portion.

D6.

The binding machine according to D5, in which a sum of the first groove length and the second groove length is larger than a length from the first end portion to the third end portion.

D7.

The binding machine according to D5 or D6, in which the first groove and the second groove are formed so as to communicate with each other in a region between the fourth end portion and the second end portion.

D8.

A binding method for binding an object to be bound using a tape, including using a binding machine to perform a step of winding the tape around the object to bound such that two portions spaced apart of the tape overlap with each other, a step of penetrating overlapped portions of the tape with at least a first leg portion of a staple, which includes a crown portion having a length greater than half a width of the tape, the first leg portion having a length greater than half the length of the crown portion and less than the length of the crown portion and extending from one end of the crown portion, and a second leg portion having a length greater than half the length of the crown portion and less than the length of the crown portion and extending from the other end of the crown portion, and a step of sandwiching the overlapped portions of the tape with the crown portion and the first leg portion by bending a first connection portion between the first leg portion and the crown portion such that a tip of the first leg portion is deviated from the crown portion, and sandwiching the overlapped portions of the tape with the crown portion and the second leg portion by bending a second connection portion between the second leg portion and the crown portion such that a tip of the second leg portion is deviated from the crown portion and is substantially in parallel to the first leg portion.

D9.

A binding machine that binds an object to be bound using a tape, the binding machine being configured to perform a step of winding the tape around the object to bound such that two portions spaced apart of the tape overlap with each other, a step of penetrating overlapped portions of the tape with at least a first leg portion of a staple, which includes a crown portion having a length greater than half a width of the tape, the first leg portion having a length greater than half the length of the crown portion and less than the length of the crown portion and extending from one end of the crown portion, and a second leg portion having a length greater than half the length of the crown portion and less than the length of the crown portion and extending from the other end of the crown portion, and a step of sandwiching the overlapped portions of the tape with the crown portion and the first leg portion by bending a first connection portion between the first leg portion and the crown portion such that a tip of the first leg portion is deviated from the crown portion, and sandwiching the overlapped portions of the tape with the crown portion and the second leg portion by bending a second connection portion between the second leg portion and the crown portion such that a tip of the second leg portion is deviated from the crown portion and is substantially in parallel to the first leg portion.

Appendix E

E1.

A binding machine, including: an accommodating portion that is capable of accommodating a tape reel, which at least has a tubular tube and a tape wound around an outer peripheral surface of the tube, in a form in which a part of the tape is pulled out;

a main handle that holds the tape pulled out from the accommodating portion; and a clincher arm that is attached to the main handle so as to be rotatable in a direction of approaching the main handle and in a direction of separating from the main handle, is rotated in the direction of approaching the main handle to hold the tape held by the main handle, and is rotated in the direction of separating from the main handle after holding the tape to further pull out the tape, in which the accommodating portion includes a side wall that faces a side surface of the accommodated tape reel, a first protrusion that protrudes from the side wall and is fitted to the tube of the accommodated tape reel so as to rotatably support the tape reel, and a second protrusion that protrudes from the side wall and abuts a side surface of the accommodated tape reel.

E2.

The binding machine according to E1, in which the second protrusion abuts an outer peripheral side region of the side surface of the tape reel.

E3.

The binding machine according to E1, in which the second protrusion includes an abutting member that abuts the side surface of the tape reel, and an elastic member that biases the abutting member toward the side surface of the tape reel.

E4.

The binding machine according to E1, in which the first protrusion is provided so as to be retractable in an axial direction of the accommodating portion.

E5.

The binding machine according to E1, in which the first protrusion includes an engaging portion that engages with the side surface of the tape reel.

Appendix F

F1.

A binding machine, including: a main handle;

a clincher arm that is rotatably attached to the main handle; and an operation handle that is rotatably attached to the clincher arm, in which when the main handle and the operation handle are gripped by a user so that the operation handle and the main handle approach each other, the clincher arm is rotated in a closing direction closer to approach the main handle, and the operation handle includes a handle made of a meal which has a link portion extending from a rotation shaft shared with the clincher arm in a direction of approaching the main handle and engaging with the main handle at an end portion thereof, and a lever portion extending from the rotation shaft shared with the clincher arm in a direction opposite to the direction of approaching the main handle of the link portion, a first cover made of a resin which is connected to the handle and is provided to cover the lever portion, and a second cover made of an elastomer resin that is provided to bind with the resin of the first cover so as to cover a part of a front surface of the first cover and has a smaller elastic modulus and a larger friction coefficient than the resin of the first cover.

F2.

The binding machine according to F1, in which the first cover are formed with a plurality of through-holes, and the second cover at least covers a region of the front surface of the first cover in which the plurality of through-holes are formed, and a part of the second cover is exposed to a back surface side of the first cover by being filled in the plurality of through-holes.

F3.

The binding machine according to F1, in which the elastomer resin includes polyvinyl chloride, polyurethane, or nitrile rubber.

F4.

The binding machine according to F1, in which the resin of the first cover includes nylon, polypropylene, or glass fiber reinforced polyamide.

F5.

The binding machine according to F2, in which the through-hole is formed such that a diameter thereof expands from a front surface where the elastomer resin is provided toward a back surface where the lever portion is provided.

An object corresponding to the above appendix A (Appendixes A1 to A3) is as follows.

JP-A-2017-222396 discloses a binding machine for gardening provided with a tape holding device capable of reliably holding a tape. FIGS. 21 and 22 of this literature illustrate a state where a staple 61 is driven by a staple driver 18 when an operation handle 50 is gripped to rotate a clincher arm 30 in a closing direction with respect to a main handle 11. Leg portions of the staple 61 are clinched by a clincher 33 of the clincher arm 30.

JP-A-2004-175377 discloses a binding machine for gardening in which a plate spring for preventing a tape from going backwards is provided. FIG. 3 of this literature illustrates a staple driver 11 which is disposed such that a tip thereof abuts a front wall of a staple magazine 7. Leg portions of a staple driven by the staple driver 11 are clinched by a clincher 12.

However, at the time of clinching the staple to perform a binding operation, a large load is applied to the staple driver from the clincher when the operation handle is excessively gripped. In order to prevent this, it is also conceivable to regulate the movement of the operation handle so as not to grip the operation handle more than necessary. However, when a dimensional tolerance of a product is taken into consideration, a tip of the staple driver may be greatly displaced from an expected clinch completion position. In that case, an excessive load is applied to the staple driver, which may result in damage to the staple driver.

Accordingly, the object of the invention described as appendix A is to provide a binding machine that can limit a load to be applied to a staple driver and can prevent damage to the staple driver.

An object corresponding to the above appendix B (appendixes B1 to B5) is as follows.

JP-A-2017-222403 discloses a binding machine for gardening capable of preventing a dimensional change of an ejection port of a staple magazine. FIG. 4 of this literature illustrates a plate-shaped driver 78 that drives a staple. The driver 78 includes a mechanical coupling portion (a portion attached to the binding machine) supported by a tape holder 44 laid along a longitudinal direction of a binding machine body 40 and a driving portion that is bent from the mechanical coupling portion and extends toward a staple magazine unit 60, so as to form an L shape.

However, in a case of a binding machine that performs binding using a binding tape, a load associated with an operation of causing the staple to penetrate the binding tape and sewing the binding tape is extremely small. Therefore, a force that acts on the staple driver from a clincher when an operator grips the operation handle is a load to be applied to the bent portion of the staple driver. Accordingly, the bent portion of the staple driver may be damaged.

Accordingly, the object of the invention described as appendix B is to provide a binding machine including a high-durability staple driver that is less likely to be damaged even when repeatedly used.

An object corresponding to the above appendix C (appendixes C1 to C6) is as follows.

According to the invention disclosed in the above JP-A-2017-222403, since an ejection port 62A is formed of the same component as that of a staple magazine body 62, it is possible to prevent the dimensional change of the ejection port 62A, and thus prevent problems such as the staple being caught and driving of two staples.

However, it is clear that problems such as the staple being caught may occur due to other reasons. For example, it is clear that when a binding method called "stapling" for firmly fixing a branch, an annealing wire or the like by tightening a loop of the binding tape, a problem of the staple being caught may occur.

When the binding tape is cut in a state where a strong tension is applied by stapling or the like, the binding tape moves forward with a cutting blade. Along with the forward movement of the binding tape, a staple that is supposed to travel directly above the staple driver is inclined forward, and as a result, a problem of the staple being caught between the clincher and the staple driver may occur.

Accordingly, the object of the invention described as appendix C is to provide a binding machine capable of preventing the staple from overturning at the time of staple driving.

An object corresponding to the above appendix D (appendixes D1 to D9) is as follows.

According to the invention disclosed in the above JP-A-2017-222403, since the ejection port 62A is formed of the same component as that of the staple magazine body 62, it is possible to prevent the dimensional change of the ejection port 62A, and thus prevent problems such as the staple being caught and driving of two staples.

JP-A-2004-224412 discloses a binding machine for gardening capable of accurately pulling out a binding tape and continuously performing binding operations. FIG. 6 of this literature illustrates a state where the binding tape is cut cleanly by inserting a cutting cutter 8 between a pressing piece 63 restraining the binding tape and a pressing plate 637.

However, since the binding tape is displaced to the left and right due to a posture or the like at the time of binding, the staple may be displaced with respect to the binding tape. Since the binding tape cannot be sufficiently held when the staple is displaced, the binding tape that should have been bound may come off later. When a width of the binding tape is increased, which serves as a measure for avoiding such a situation, the cost of the binding tape is increased. Alternatively, when a crown width of the staple is reduced, legs of the staple need to be shortened. When the legs of the staple are shortened, moment for bending the legs is reduced, which deteriorates the workability.

Accordingly, the object of the invention described as appendix D is to provide a binding machine with which the bound tape is less likely to come off from vines or stems of a plant even when the staple is displaced.

An object corresponding to the above appendix E (appendixes E1 to E5) is as follows.

JP-A-2017-221149 discloses a binding machine for gardening capable of preventing a binding tape from returning even in cases of tape reels having different inner diameters. FIG. 9 of this literatures a lever member 86 provided in a tape magazine portion 80 of the binding machine. By bringing different portions of the lever member 86 into contact with an inner diameter portion of the tape reel, an appropriate braking force can be applied to both small-diameter and large-diameter tape reels.

JP-A-2005-224197 discloses that a U-shaped protrusion 25 elastically abuts an inner peripheral surface of a tape hub support boss 22 to push and expand the tape hub support boss 22 radially outward, and thus reverse rotation of the tape reel can be prevented.

However, since a clincher arm is always biased in a direction of separating from a main handle by a tension spring, when a user reduces a force of gripping an operation handle, a binding tape may be largely pulled out due to a biasing force of the tension spring, and a tape reel may continue to rotate normally due to inertia. In particular, when the tape is excessively pulled out in a case where a remaining amount of the tape is large, the tape may burst out of a tape magazine unit and may be caught by branches or leaves.

Accordingly, the object of the invention described as appendix E is to provide a binding machine capable of preventing excessive normal rotation of a wound binding tape at the time of pulling out the binding tape in a binding operation.

An object corresponding to the above appendix F (appendixes F1 to F5) is as follows.

JP-A-2017-222399 discloses a binding machine including an operation handle provided with a cover that covers a link portion engaging with a main handle in order to prevent attachment of dust to a periphery of an engagement portion between the operation handle and the main handle.

However, a cover that is made of a hard and strong material so as to enhance durability thereof generally has a small friction coefficient. For this reason, when a user grips the handles, slipping may occur. In particular, since a grip force of the user decreases when a large number of gripping and binding operations are repeated, slipping is likely to occur.

On the other hand, a dip coating technique is known in which a resin is coated on a sheet metal portion by dipping the sheet metal portion of the operation handle in a liquid resin.

However, since the resin is coated to wrap around edges of the sheet metal portion, the resin may be torn from the edge portions due to stress concentration during use.

Accordingly, the object of the invention described as appendix F is to provide a binding machine including an operation handle that has high durability and that is less likely to allow slipping from occurring.

What is claimed is:

1. A binding machine, comprising:

an accommodating portion configured to accommodate a wound binding tape;

a main handle configured to guide the binding tape accommodated in the accommodating portion such that a part of the binding tape is allowed to be pulled out from one end of the main handle; and a clincher arm rotatably provided to the main handle, the clincher arm including a holding portion including at least a lock plate and a tape catch and configured to hold the part of the binding tape pulled out from the one end of the main handle, and a clincher configured to wrap the part of the binding tape held by the holding portion around objects to be bound and bind the part of the binding tape, wherein the accommodating portion includes, with the wound binding tape in an accommodated state, a side wall portion that faces a side surface of the binding tape in an axial direction of the accommodating portion; and a circumferential portion that is continuous with the side wall portion, the circumferential portion facing a front surface of the binding tape, wherein a part of the side wall portion has a cutout that allows a part of the side surface of the binding tape to be exposed, and wherein the circumferential portion has an opening portion, which is continuous with the cutout of the side wall portion, through which the binding tape is movable in a direction perpendicular to the axial direction of the accommodating portion, for accommodating the binding tape in a part of the circumferential portion.

2. The binding machine according to claim 1, further comprising:

an engaging portion movable back and forth in the axial direction of the accommodating portion and configured to engage with the binding tape accommodated in the accommodating portion.

3. The binding machine according to claim 1, further comprising:

an abutting portion configured to press a part of the side surface of the binding tape accommodated in the accommodating portion.

4. The binding machine according to claim 1, wherein a slit extending in a radial direction of the accommodating portion is provided in the accommodating portion.

5. The binding machine according to claim 1, wherein a rib extending in a circumferential direction of the accommodating portion is provided at least on the side wall portion of the accommodating portion.

6. The binding machine according to claim 1, further comprising:

a hook attaching tool, wherein the hook attaching tool includes:

a first attachment portion that has a first protrusion and a first recess and that is provided on one side surface facing the axial direction of the accommodating portion; and a second attachment portion that has a second protrusion having a same structure as the first protrusion and a second recess having a same structure as the first recess, and that is provided symmetrically with the first attachment portion on another side surface facing the axial direction of the accommodating portion.

7. A tape reel including a binding tape used for the binding machine according to claim 1 and a tubular bobbin around which the binding tape is wound, and capable of being accommodated in the accommodating portion of the binding machine, the tape reel comprising:

a film attached to one of side surfaces of the binding tape that is wound around the bobbin in a stacked manner, wherein the film includes a portion that protrudes inward from an inner diameter portion of the bobbin.

8. The tape reel according to claim 7, wherein the film is provided with a hole, the hole is disposed inner side of the bobbin, an inner diameter of the hole is smaller than that of the bobbin, and an inner periphery of the hole protrudes inward from the inner diameter portion of the bobbin.

9. The tape reel according to claim 7, wherein the portion of the film that protrudes inward from an inner diameter portion of the bobbin is configured to engage with an engaging portion that is provided movably back and forth in an axial direction of the accommodating portion when the tape reel is accommodated in the accommodating portion.

10. The binding machine according to claim 1, wherein the accommodating portion is configured to accommodate a tape reel, the tape reel including a tubular bobbin, the binding tape wound around the bobbin, and a film attached to one of side surfaces of the binding tape that is wound around the bobbin in a stacked manner and including a portion that protrudes inward from an inner diameter portion of the bobbin, and the accommodating portion includes an engaging portion provided movably back and forth in the axial direction of the accommodating portion and configured to engage with the portion of the film of the tape reel that protrudes inward from an inner diameter portion of the bobbin.

11. A binding machine, comprising:

an accommodating portion configured to accommodate a wound binding tape;

a main handle configured to guide the binding tape accommodated in the accommodating portion such that a part of the binding tape is allowed to be pulled out from one end of the main handle; and a clincher arm rotatably provided to the main handle, the clincher arm including a holding portion including at least a lock plate and a tape catch and configured to hold the part of the binding tape pulled out from the one end of the main handle, and a clincher configured to wrap the part of the binding tape held by the holding portion around objects to be bound and bind the part of the binding tape, wherein the accommodating portion includes, with the wound binding tape being accommodated therein, a first inner wall surface that faces at least a part of a circular side surface of the binding tape, wherein a part of the first inner wall surface includes a cutout to allow a part of the side surface of the binding tape to be exposed, a second inner wall surface that faces at least a part of another circular side surface of the binding tape, and a third inner wall surface that connects the first inner wall surface and the second inner wall surface, which face each other in an axial direction of the accommodating portion, the third inner wall surface has an opening portion, which is continuous with the cutout of the first inner wall surface, through which the binding tape is movable in a direction perpendicular to the axial direction of the accommodating portion, for accommodating the binding tape.

12. The binding machine according to claim 11, further comprising:

an engaging portion movable back and forth in the axial direction of the accommodating portion and configured to engage with the binding tape accommodated in the accommodating portion.

13. The binding machine according to claim 11, further comprising:

an abutting portion configured to press a part of the circular side surface of the binding tape.

14. The binding machine according to claim 11, wherein a slit extending in a radial direction of the accommodating portion is provided in the accommodating portion.

15. The binding machine according to claim 11, wherein a rib extending in a circumferential direction of the accommodating portion is provided at least on the first inner wall surface of the accommodating portion.

16. The binding machine according to claim 11, further comprising:

a hook attaching tool, wherein the hook attaching tool includes: a first attachment portion that has a first protrusion and a first recess and that is provided on one side surface facing the axial direction of the accommodating portion; and a second attachment portion that has a second protrusion having a same structure as the first protrusion and a second recess having a same structure as the first recess, and that is provided symmetrically with the first attachment portion on the other side surface facing the axial direction of the accommodating portion.

17. A tape reel including a binding tape used for the binding machine according to claim 11 and a tubular bobbin around which the binding tape is wound, and capable of being accommodated in the accommodating portion of the binding machine, the tape reel comprising:

a film attached to one of side surfaces of the binding tape that is wound around the bobbin in a stacked manner, wherein the film includes a portion that protrudes inward from an inner diameter portion of the bobbin.

18. The tape reel according to claim 17, wherein the film is provided with a hole, the hole is disposed inner side of the bobbin, an inner diameter of the hole is smaller than that of the bobbin, and an inner periphery of the hole protrudes inward from the inner diameter portion of the bobbin.

19. A binding machine, comprising:

an accommodating portion that includes an opening, which opens to an outside, at a side portion of the accommodating portion for accommodating a wound binding tape; and an engaging portion protruding from another side portion of the accommodating portion toward the opening and configured to engage with the binding tape, the side portion of the accommodating portion being opened to the outside both in a first state where the engaging portion engages with the binding tape and in a second state where engagement between the engaging portion and the binding tape is released, when the binding machine is in an in-use state.

20. The binding machine of claim 1, wherein the lock plate is rotatable.

* * * * *